(12) United States Patent  
Schlintz

(10) Patent No.: US 10,906,759 B2  
(45) Date of Patent: Feb. 2, 2021

(54) LOADING DOCK VEHICLE RESTRAINT SYSTEM

(71) Applicant: Systems, LLC, Germantown, WI (US)

(72) Inventor: John Schlintz, Mequon, WI (US)

(73) Assignee: Systems, LLC, Germantown, WI (US)

( * ) Notice: Subject to any disclaimer, the term of this patent is extended or adjusted under 35 U.S.C. 154(b) by 0 days.

(21) Appl. No.: 16/228,268

(22) Filed: Dec. 20, 2018

(65) Prior Publication Data

US 2019/0119055 A1 Apr. 25, 2019

Related U.S. Application Data

(63) Continuation-in-part of application No. 16/022,236, filed on Jun. 28, 2018, now Pat. No. 10,745,220.

(60) Provisional application No. 62/526,112, filed on Jun. 28, 2017.

(51) Int. Cl.  
*B65G 69/00* (2006.01)

(52) U.S. Cl.  
CPC .................. *B65G 69/003* (2013.01)

(58) Field of Classification Search  
CPC .................................... B65G 69/003  
See application file for complete search history.

(56) References Cited

U.S. PATENT DOCUMENTS

| | | |
|---|---|---|
| 2,889,565 A | 6/1959 | Harty |
| 4,010,571 A | 3/1977 | McGuire |
| 4,207,019 A | 6/1980 | Cone |
| 4,282,621 A | 8/1981 | Anthony |
| 4,364,137 A | 12/1982 | Hahn |
| 4,472,099 A | 9/1984 | Hahn |
| 4,555,211 A | 11/1985 | Metz |
| 4,560,315 A | 12/1985 | Hahn |
| 4,630,989 A | 12/1986 | Davey |
| 4,634,334 A | 1/1987 | Hahn |

(Continued)

FOREIGN PATENT DOCUMENTS

| | | |
|---|---|---|
| CA | 1114566 | 12/1981 |
| CA | 1273458 | 9/1990 |

(Continued)

OTHER PUBLICATIONS

U.S. Final Office Action dated Oct. 2, 2019, U.S. Appl. No. 15/299,670, (Continued)

*Primary Examiner* — Glenn F Myers  
(74) *Attorney, Agent, or Firm* — Fitch, Even, Tabin & Flannery LLP

(57) ABSTRACT

A vehicle restraint system and a control system configured to manipulate an orientation of a vehicle restraint relative to a carriage that supports the restraint such that the hook is moveable between an engaged or extended position wherein the hook interferes with translation of vehicle relative to the vehicle restraint system and a disengaged or retracted position wherein the vehicle can be associated with or removed from interaction with the vehicle restraint system. The control system includes a single indicia whose output is manipulated such that a characteristic of the output of the indicia, rather that strictly operation thereof, indicates a secured or less than secured condition associated with operation of the restraint relative to a vehicle.

40 Claims, 39 Drawing Sheets

(56) References Cited

U.S. PATENT DOCUMENTS

| | | |
|---|---|---|
| 4,648,781 A | 3/1987 | Sikora |
| 4,674,941 A | 6/1987 | Hageman |
| 4,692,755 A | 9/1987 | Hahn |
| 4,695,216 A | 9/1987 | Erlandsson |
| 4,744,121 A | 5/1988 | Swessel |
| 4,759,678 A | 7/1988 | Hageman |
| 4,767,254 A | 8/1988 | Kovach |
| 4,776,052 A | 10/1988 | Delgado |
| 4,815,918 A | 3/1989 | Bennett |
| 4,830,563 A | 5/1989 | Yeakle |
| 4,843,373 A | 6/1989 | Trickle |
| 4,861,217 A | 8/1989 | Erlandsson |
| 4,865,508 A | 9/1989 | Carlson |
| 4,887,954 A | 12/1989 | Gregerson |
| 4,915,568 A | 4/1990 | West |
| 4,920,598 A | 5/1990 | Hahn |
| 4,938,647 A | 7/1990 | Erlandsson |
| 4,938,648 A | 7/1990 | Horan |
| 4,946,330 A | 8/1990 | Pedersen |
| 4,950,118 A | 8/1990 | Mueller |
| 4,963,068 A | 10/1990 | Gelder |
| 4,964,777 A | 10/1990 | Kleynjans |
| 4,973,213 A | 11/1990 | Erlandsson |
| 4,988,254 A | 1/1991 | Alexander |
| 5,026,242 A | 6/1991 | Alexander |
| 5,040,258 A | 8/1991 | Hahn |
| 5,047,748 A | 9/1991 | Trickle |
| 5,071,306 A | 12/1991 | Alexander |
| 5,096,359 A | 3/1992 | Alexander |
| 5,117,526 A | 6/1992 | Alexander |
| 5,120,181 A | 6/1992 | Alexander |
| 5,168,267 A | 12/1992 | Trickle |
| 5,186,267 A | 2/1993 | White |
| 5,212,846 A | 5/1993 | Hahn |
| 5,259,718 A | 11/1993 | Alexander |
| 5,297,921 A | 3/1994 | Springer |
| 5,299,386 A | 4/1994 | Naegelli |
| 5,312,213 A | 5/1994 | Winsor |
| 5,346,353 A | 9/1994 | Alexander |
| 5,348,437 A | 9/1994 | Krupke |
| 5,388,947 A | 2/1995 | Ancel |
| 5,396,676 A | 3/1995 | Alexander |
| 5,449,267 A | 9/1995 | Ablabutyan |
| 5,453,735 A | 9/1995 | Hahn |
| 5,454,682 A | 10/1995 | Alexander |
| 5,459,963 A | 10/1995 | Alexander |
| 5,522,108 A | 6/1996 | Massey |
| 5,564,238 A | 10/1996 | Ellis |
| 5,586,355 A | 12/1996 | Metz |
| 5,683,219 A | 11/1997 | Gilles, Jr. |
| 5,683,221 A | 11/1997 | Ablabutyan |
| 5,702,223 A | 12/1997 | Hahn |
| 5,709,458 A | 1/1998 | Metz |
| 5,762,459 A | 6/1998 | Springer |
| 5,831,540 A | 11/1998 | Sullivan |
| 5,882,167 A | 3/1999 | Hahn |
| 5,964,572 A | 10/1999 | Hahn |
| 6,006,389 A | 12/1999 | Alexander |
| 6,010,297 A | 1/2000 | Hahn |
| 6,033,174 A | 3/2000 | Alexander |
| 6,035,475 A | 3/2000 | Alexander |
| 6,062,796 A | 5/2000 | Alexander |
| 6,065,172 A | 5/2000 | Swessel |
| 6,074,157 A | 6/2000 | Hahn |
| 6,092,970 A | 7/2000 | Hahn |
| 6,106,212 A | 8/2000 | Hahn |
| 6,113,337 A | 9/2000 | Massey |
| 6,116,839 A | 9/2000 | Bender |
| 6,125,491 A | 10/2000 | Alexander |
| 6,139,242 A | 10/2000 | Alexander |
| 6,162,005 A | 12/2000 | Fritz |
| 6,190,108 B1 | 2/2001 | Alexander |
| 6,190,109 B1 | 2/2001 | Bender |
| 6,204,762 B1 | 3/2001 | Dering |
| 6,218,956 B1 | 4/2001 | Davis |
| 6,220,809 B1 | 4/2001 | Hahn |
| 6,232,887 B1 | 5/2001 | Carson |
| 6,236,911 B1 | 5/2001 | Kruger |
| 6,240,587 B1 | 6/2001 | Meichtry et al. |
| 6,279,276 B1 | 8/2001 | Knoll |
| 6,322,310 B1 | 11/2001 | Bender |
| 6,322,311 B1 | 11/2001 | Alexander |
| 6,329,931 B1 | 12/2001 | Gunton |
| RE37,570 E | 3/2002 | Springer et al. |
| 6,360,393 B1 | 3/2002 | Fritz |
| 6,367,941 B1 | 4/2002 | Lea |
| 6,371,714 B1 | 4/2002 | Sherard |
| 6,385,537 B2 | 5/2002 | Gaspard, II |
| 6,405,397 B1 | 6/2002 | Alexander |
| 6,409,452 B1 | 6/2002 | Zibella |
| 6,411,054 B1 | 6/2002 | Van Wiemeersch |
| 6,431,819 B1 | 8/2002 | Hahn |
| 6,437,702 B1 | 8/2002 | Ragland |
| 6,439,823 B1 | 8/2002 | Lambert |
| 6,442,783 B1 | 9/2002 | Yoon |
| 6,476,572 B2 | 11/2002 | Lounsbury |
| 6,490,443 B1 | 12/2002 | Freeny, Jr. |
| 6,502,268 B2 | 1/2003 | Ashelin |
| 6,518,878 B1 | 2/2003 | Skoff |
| 6,524,053 B2 | 2/2003 | Hahn |
| 6,542,856 B2 | 4/2003 | Frantz |
| 6,594,842 B2 | 7/2003 | Alexander |
| 6,634,139 B1 | 10/2003 | Metz |
| 6,687,609 B2 | 2/2004 | Hsiao |
| 6,698,052 B2 | 3/2004 | Stolk |
| 6,726,432 B2 | 4/2004 | Kish |
| 6,763,768 B2 | 7/2004 | Hart |
| 6,773,221 B2 | 8/2004 | Belongia |
| 6,781,516 B2 | 8/2004 | Reynard |
| 6,792,321 B2 | 9/2004 | Sepe, Jr. |
| 6,792,716 B1 | 9/2004 | Luster |
| 6,804,850 B2 | 10/2004 | Alexander |
| 6,812,849 B1 | 11/2004 | Ancel |
| 6,834,409 B2 | 12/2004 | Gleason |
| 6,883,198 B2 | 4/2005 | Alexander |
| 6,918,151 B2 | 7/2005 | Massey |
| 6,931,686 B2 | 8/2005 | Hoofard |
| 6,975,226 B2 | 12/2005 | Reynard |
| 7,013,519 B2 | 3/2006 | Gleason |
| 7,017,643 B2 | 3/2006 | Leum |
| 7,056,077 B2 | 6/2006 | Pedersen |
| 7,062,814 B2 | 6/2006 | Bender |
| 7,119,673 B2 | 10/2006 | Eager |
| 7,134,159 B2 | 11/2006 | Muhl |
| 7,162,762 B1 | 1/2007 | Gleason |
| 7,165,486 B2 | 1/2007 | Alexander |
| 7,181,369 B2 | 2/2007 | Kanki |
| 7,207,370 B2 | 4/2007 | Snyder |
| 7,216,392 B2 | 5/2007 | Hoofard |
| 7,226,265 B2 | 6/2007 | Wilson |
| 7,237,591 B2 | 7/2007 | Snyder |
| 7,256,703 B2 | 8/2007 | Duvernell |
| 7,264,092 B2 | 9/2007 | Jette |
| 7,274,300 B2 | 9/2007 | Duvernell |
| 7,337,822 B2 | 3/2008 | Snyder |
| 7,363,670 B2 | 4/2008 | Mitchell |
| 7,380,375 B2 | 6/2008 | Maly |
| 7,384,229 B2 | 6/2008 | Gleason |
| 7,407,584 B2 | 8/2008 | Lemoine |
| 7,546,655 B2 | 6/2009 | Mitchell |
| 7,600,282 B2 | 10/2009 | Grunewald |
| 7,739,834 B2 | 6/2010 | Stoffels |
| 7,752,696 B2 | 7/2010 | Grunewald |
| 7,775,252 B2 | 8/2010 | Snyder |
| 7,823,239 B2 | 11/2010 | Hochstein |
| 7,832,451 B2 | 11/2010 | Miller |
| 7,841,823 B2 | 11/2010 | Sveum |
| 7,956,718 B2 | 6/2011 | Murphy |
| 8,006,811 B2 | 8/2011 | Andersen |
| 8,046,857 B2 | 11/2011 | Whitley et al. |
| 8,047,751 B2 | 11/2011 | Powers |
| 8,087,443 B2 | 1/2012 | Snyder |
| 8,112,949 B2 | 2/2012 | Eungard |
| 8,136,964 B2 | 3/2012 | Hudson |

(56) References Cited

U.S. PATENT DOCUMENTS

| | | |
|---|---|---|
| 8,141,189 B2 | 3/2012 | Mitchell |
| 8,181,401 B2 | 5/2012 | Eungard |
| 8,191,194 B2 | 6/2012 | Belongia |
| 8,245,617 B2 | 8/2012 | Martinez |
| 8,286,757 B2 | 10/2012 | Nelson |
| 8,287,223 B2 | 10/2012 | Andersen |
| 8,303,235 B2 | 11/2012 | Sander |
| 8,307,956 B2 | 11/2012 | Andersen |
| 8,308,393 B2 | 11/2012 | Jette |
| 8,366,301 B2 | 2/2013 | Hudson |
| 8,407,842 B2 | 4/2013 | Story |
| 8,453,705 B2 | 6/2013 | Miller |
| 8,464,384 B2 | 6/2013 | Belongia |
| 8,464,846 B2 | 6/2013 | Andersen |
| 8,465,245 B2 | 6/2013 | Manone |
| 8,490,668 B2 | 7/2013 | Snyder |
| 8,497,761 B2 | 7/2013 | McNeill |
| 8,499,897 B2 | 8/2013 | Brooks |
| 8,529,183 B2 | 9/2013 | Ion |
| 8,532,816 B2 | 9/2013 | Ion |
| 8,547,234 B2 | 10/2013 | Maly |
| 8,590,087 B2 | 11/2013 | Swessel |
| 8,590,673 B2 | 11/2013 | Andersen |
| 8,590,674 B2 | 11/2013 | Jette |
| 8,596,949 B2 | 12/2013 | Harrington |
| 8,616,826 B2 | 12/2013 | Cotton |
| 8,627,529 B1 | 1/2014 | Palmersheim |
| 8,657,551 B2 | 2/2014 | Andersen |
| 8,662,535 B2 | 3/2014 | Andersen |
| 8,678,736 B2 | 3/2014 | Andersen |
| 8,826,963 B2 | 9/2014 | Wiegel |
| 8,838,279 B2 | 9/2014 | Blackwell |
| 8,869,948 B2 | 10/2014 | Saliger |
| 8,905,198 B2 | 12/2014 | Brooks |
| 8,915,029 B2 | 12/2014 | Digmann |
| 8,994,496 B2 | 3/2015 | Freese |
| 9,010,501 B2 | 4/2015 | Brooks |
| 9,051,136 B2 | 6/2015 | Leum |
| 9,096,170 B2 | 8/2015 | Swessel |
| 9,096,397 B2 | 8/2015 | Brooks |
| 9,126,775 B2 | 9/2015 | Brooks |
| 9,139,384 B2 | 9/2015 | Brooks, IV |
| 9,145,273 B2 | 9/2015 | Brooks |
| 9,150,367 B2 | 10/2015 | Brooks |
| 9,150,369 B1 | 10/2015 | Leum |
| 9,174,811 B2 | 11/2015 | Proffitt |
| 9,227,799 B2 | 1/2016 | Brooks |
| 9,230,419 B2 | 1/2016 | Beggs |
| 9,255,699 B2 | 2/2016 | Wiegel |
| 9,272,854 B2 | 3/2016 | Lessard |
| 9,273,512 B2 | 3/2016 | Digmann |
| 9,284,764 B2 | 3/2016 | Hudson |
| 9,428,349 B2 | 8/2016 | Muhl |
| 9,481,531 B2 | 11/2016 | Stone |
| 9,542,824 B2 | 1/2017 | Beggs |
| 9,547,969 B2 | 1/2017 | Beggs |
| 9,564,072 B2 | 2/2017 | Senfleben |
| 9,586,771 B2 | 3/2017 | Brooks |
| 9,728,020 B2 | 8/2017 | Freese |
| 9,777,529 B2 | 10/2017 | McNeill |
| 10,569,978 B2 * | 2/2020 | Gleason .......... B65G 69/003 |
| 2002/0017127 A1 | 2/2002 | Nakano |
| 2002/0057204 A1 | 5/2002 | Bligh |
| 2002/0078639 A1 | 6/2002 | Venegas |
| 2002/0140390 A1 | 10/2002 | Lounsbury |
| 2002/0141852 A1 | 10/2002 | Hahn |
| 2002/0157195 A1 | 10/2002 | Alexander |
| 2003/0023333 A1 | 1/2003 | Birkle |
| 2003/0151912 A1 | 8/2003 | Ancel |
| 2003/0197622 A1 | 10/2003 | Reynard |
| 2003/0199996 A1 | 10/2003 | Reynard |
| 2003/0204921 A1 | 11/2003 | Bender |
| 2003/0213073 A1 | 11/2003 | Alexander |
| 2003/0226494 A1 | 12/2003 | Sunaga |
| 2004/0004547 A1 | 1/2004 | Appelt |
| 2004/0005210 A1 | 1/2004 | Alexander |
| 2004/0062628 A1 | 4/2004 | Alexander |
| 2004/0117927 A1 | 6/2004 | Gleason |
| 2004/0118314 A1 | 6/2004 | Hart |
| 2004/0231806 A1 | 11/2004 | Leum |
| 2005/0001728 A1 | 1/2005 | Appelt |
| 2005/0046562 A1 | 3/2005 | Stigall |
| 2005/0091766 A1 | 5/2005 | Gleason |
| 2005/0102041 A1 | 5/2005 | Duvernell |
| 2005/0102042 A1 | 5/2005 | Reynard |
| 2005/0150952 A1 | 7/2005 | Chung |
| 2005/0168999 A1 | 8/2005 | Sommers |
| 2005/0196255 A1 | 9/2005 | Sveum |
| 2005/0254249 A1 | 11/2005 | Robbins, III |
| 2005/0261786 A1 | 11/2005 | Eager |
| 2006/0051196 A1 | 3/2006 | McDonald |
| 2006/0091297 A1 | 5/2006 | Anderson |
| 2006/0097857 A1 | 5/2006 | Osaka |
| 2006/0132284 A1 | 6/2006 | Murphy |
| 2006/0137261 A1 | 6/2006 | Maly |
| 2006/0181391 A1 | 8/2006 | McNeill |
| 2006/0182559 A1 | 8/2006 | Gleason |
| 2006/0254003 A1 | 11/2006 | Grunewald |
| 2006/0266275 A1 | 11/2006 | Dibiase |
| 2007/0031124 A1 | 2/2007 | Kim |
| 2007/0248440 A1 | 10/2007 | Andersen |
| 2008/0000156 A1 | 1/2008 | Stoffels |
| 2008/0010748 A1 | 1/2008 | Menkedick |
| 2008/0042865 A1 | 2/2008 | Shephard |
| 2008/0095598 A1 | 4/2008 | Cotton |
| 2008/0124203 A1 | 5/2008 | McDonald |
| 2008/0127435 A1 | 6/2008 | Maly |
| 2009/0155030 A1 | 6/2009 | Andersen |
| 2010/0114405 A1 | 5/2010 | Elston |
| 2010/0146719 A1 | 6/2010 | Swessel |
| 2010/0170754 A1 | 7/2010 | Brooks |
| 2010/0263281 A1 | 10/2010 | Stoffels |
| 2010/0263803 A1 | 10/2010 | Kniese |
| 2010/0266375 A1 | 10/2010 | Ion |
| 2010/0269273 A1 | 10/2010 | Proffitt |
| 2011/0006917 A1 | 1/2011 | Taniguchi |
| 2011/0075441 A1 | 3/2011 | Swessel |
| 2011/0203059 A1 | 8/2011 | Whitley |
| 2011/0222962 A1 | 9/2011 | Jette |
| 2011/0234367 A1 | 9/2011 | Murphy |
| 2011/0238231 A1 | 9/2011 | Blackwell |
| 2011/0240416 A1 | 10/2011 | Brooks |
| 2011/0258788 A1 | 10/2011 | Ion |
| 2011/0290596 A1 | 12/2011 | Perkins |
| 2012/0011774 A1 | 1/2012 | Arnaud |
| 2012/0025964 A1 | 2/2012 | Beggs |
| 2012/0131755 A1 | 5/2012 | Luu |
| 2013/0017045 A1 * | 1/2013 | Brooks .......... B65G 69/003 414/401 |
| 2013/0291455 A1 | 11/2013 | Wiegel |
| 2013/0292214 A1 | 11/2013 | Brooks |
| 2013/0332217 A1 | 12/2013 | McNeill |
| 2014/0062691 A1 | 3/2014 | Graham |
| 2014/0064891 A1 | 3/2014 | Brooks |
| 2014/0064892 A1 | 3/2014 | Proffitt |
| 2014/0071661 A1 | 3/2014 | Zealer |
| 2014/0075842 A1 | 3/2014 | McNeill |
| 2014/0225509 A1 | 8/2014 | Wiegel |
| 2014/0255134 A1 | 9/2014 | Brooks, IV |
| 2015/0009046 A1 | 1/2015 | Senfleben |
| 2015/0013083 A1 | 1/2015 | Palmersheim |
| 2015/0047132 A1 | 2/2015 | Sveum |
| 2015/0052833 A1 | 2/2015 | Digmann |
| 2015/0127222 A1 | 5/2015 | Cunningham, III |
| 2015/0138002 A1 | 5/2015 | Beggs |
| 2015/0145661 A1 | 5/2015 | Beggs |
| 2015/0145700 A1 | 5/2015 | Beggs |
| 2015/0145701 A1 | 5/2015 | Beggs |
| 2015/0158428 A1 | 6/2015 | Beggs |
| 2015/0170493 A1 | 6/2015 | Beggs |
| 2015/0170498 A1 | 6/2015 | Beggs |
| 2015/0191319 A1 | 7/2015 | Muhl |
| 2015/0210487 A1 | 7/2015 | Brooks |

(56) References Cited

U.S. PATENT DOCUMENTS

| | | | |
|---|---|---|---|
| 2015/0217951 A1* | 8/2015 | Lessard | B65G 69/28 |
| | | | 414/401 |
| 2015/0239686 A1 | 8/2015 | Stone | |
| 2015/0375947 A1 | 12/2015 | Hochstein | |
| 2016/0009177 A1 | 1/2016 | Brooks | |
| 2016/0075526 A1 | 3/2016 | Avalos | |
| 2016/0104364 A1 | 4/2016 | Brooks | |
| 2016/0311635 A1 | 10/2016 | Stone | |
| 2016/0369876 A1 | 12/2016 | Muhl | |
| 2017/0008711 A1 | 1/2017 | Stone | |
| 2017/0043967 A1 | 2/2017 | Walford | |
| 2017/0044817 A1 | 2/2017 | McNeill | |
| 2017/0045400 A1 | 2/2017 | Stone | |
| 2017/0066607 A1 | 3/2017 | Muhl | |
| 2017/0137239 A1 | 5/2017 | Kimener | |
| 2017/0144847 A1 | 5/2017 | Gadbois | |
| 2017/0320685 A1 | 11/2017 | Hoofard | |
| 2019/0009999 A1 | 1/2019 | Schlintz | |

FOREIGN PATENT DOCUMENTS

| | | |
|---|---|---|
| CA | 1313439 | 2/1993 |
| CA | 2138890 | 6/1995 |
| CA | 2272808 | 12/1999 |
| CA | 2348289 | 5/2000 |
| CA | 2344537 | 10/2001 |
| CA | 2484931 | 11/2003 |
| CA | 2536978 | 3/2005 |
| CA | 2561113 | 10/2005 |
| CA | 2657374 | 1/2008 |
| CA | 2691426 | 1/2009 |
| CA | 2691487 | 1/2009 |
| CA | 2778804 | 1/2009 |
| CA | 2638717 | 2/2009 |
| CA | 2705359 | 6/2009 |
| CA | 2744950 | 7/2010 |
| CA | 2657744 | 9/2010 |
| CA | 2700816 | 9/2010 |
| CA | 2699135 | 10/2010 |
| CA | 2732333 | 8/2011 |
| CA | 2737723 | 10/2011 |
| CA | 2806320 | 2/2012 |
| CA | 2877984 | 7/2015 |
| CN | 1956669 | 5/2007 |
| CN | 101076838 | 11/2007 |
| CN | 101688424 | 3/2010 |
| CN | 101839110 | 9/2010 |
| CN | 103382754 | 11/2013 |
| DE | 68909886 | 5/1994 |
| DE | 60312316 | 11/2007 |
| EP | 0012386 | 6/1980 |
| EP | 0366887 | 5/1990 |
| EP | 369106 | 5/1990 |
| EP | 1478817 | 8/2003 |
| EP | 1498548 | 1/2005 |
| EP | 1501753 | 2/2005 |
| EP | 1594783 | 11/2005 |
| EP | 1732418 | 12/2006 |
| EP | 1764322 | 3/2007 |
| EP | 1825447 | 8/2007 |
| EP | 1836541 | 9/2007 |
| EP | 2041007 | 4/2009 |
| EP | 2176489 | 4/2010 |
| EP | 2215612 | 8/2010 |
| EP | 18525447 | 7/2011 |
| EP | 2380834 | 10/2011 |
| EP | 2598376 | 6/2013 |
| EP | 2660170 | 11/2013 |
| EP | 2840564 | 2/2015 |
| EP | 2886497 | 6/2015 |
| EP | 2902347 | 8/2015 |
| WO | 1990011561 | 10/1990 |
| WO | 1999035067 | 7/1999 |
| WO | 2000024658 | 5/2000 |
| WO | 0063613 | 10/2000 |
| WO | 03067000 | 8/2003 |
| WO | 2003093150 | 11/2003 |
| WO | 2004069703 | 8/2004 |
| WO | 2005095848 | 10/2005 |
| WO | 2006066013 | 6/2006 |
| WO | 2006091900 | 8/2006 |
| WO | 2008008698 | 1/2008 |
| WO | 2009005931 | 1/2009 |
| WO | 2009070509 | 6/2009 |
| WO | 2010077977 | 7/2010 |
| WO | 2012009647 | 1/2012 |
| WO | 2012015752 | 2/2012 |
| WO | 2014116975 | 7/2014 |
| WO | 2015084167 | 6/2015 |
| WO | 2015166339 | 11/2015 |
| WO | 2016007321 | 1/2016 |
| WO | 2016044327 | 3/2016 |

OTHER PUBLICATIONS

U.S. Non-Final Office Action dated Nov. 27, 2019; U.S. Appl. No. 16/022,236.

USPTO, Non-Final Office Action dated Mar. 29, 2019, U.S. Appl. No. 15/299,670, 9 pages.

U.S. Appl. No. 16/022,236, filed Jun. 28, 2018, Schlintz John.

U.S. Appl. No. 16/228,268, filed Dec. 12, 2018, Schlintz John.

* cited by examiner

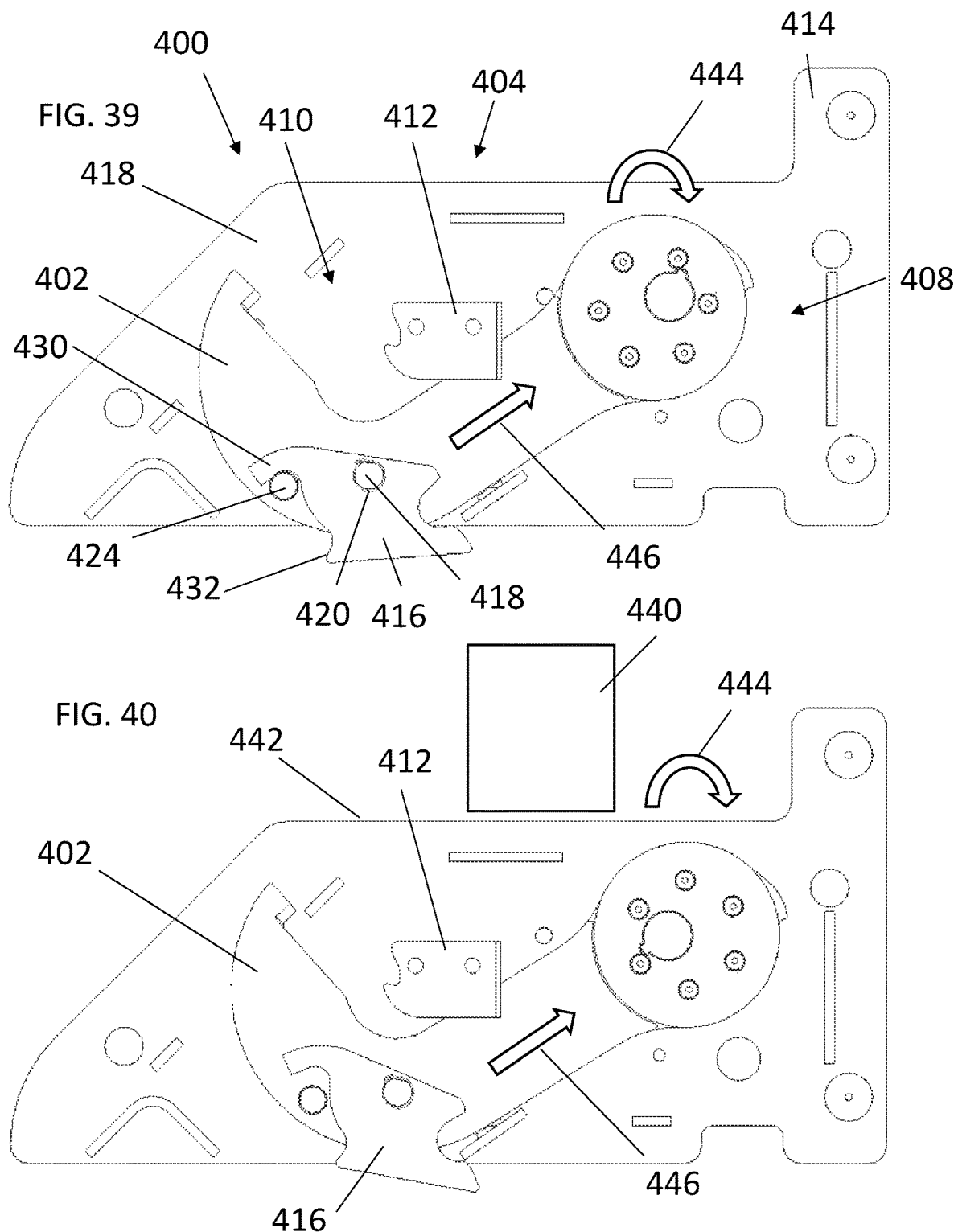

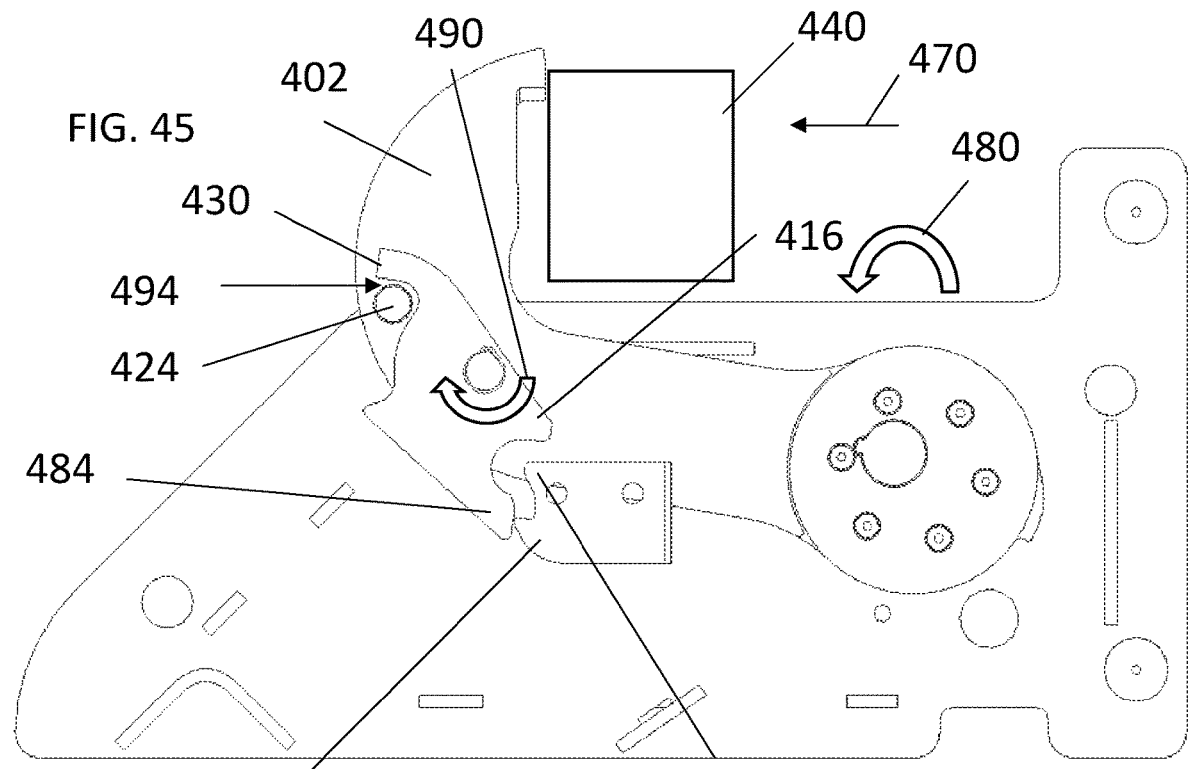
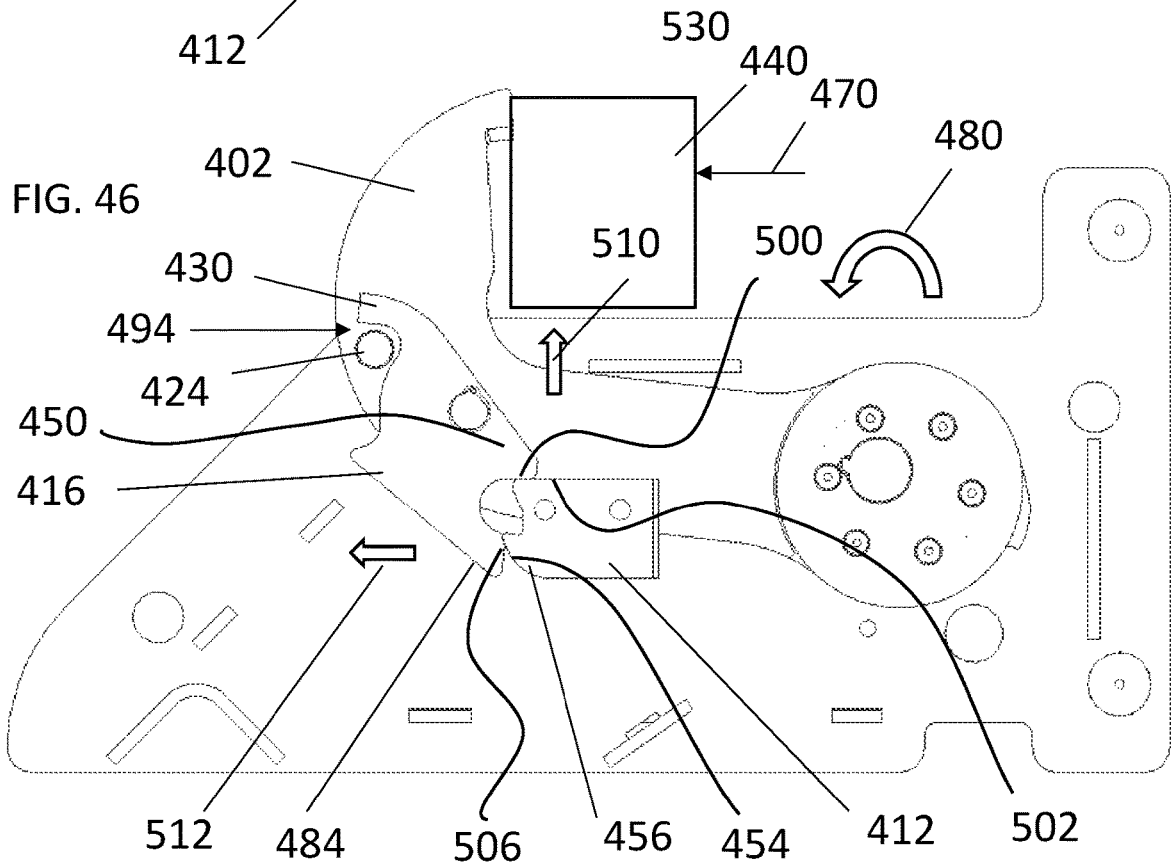

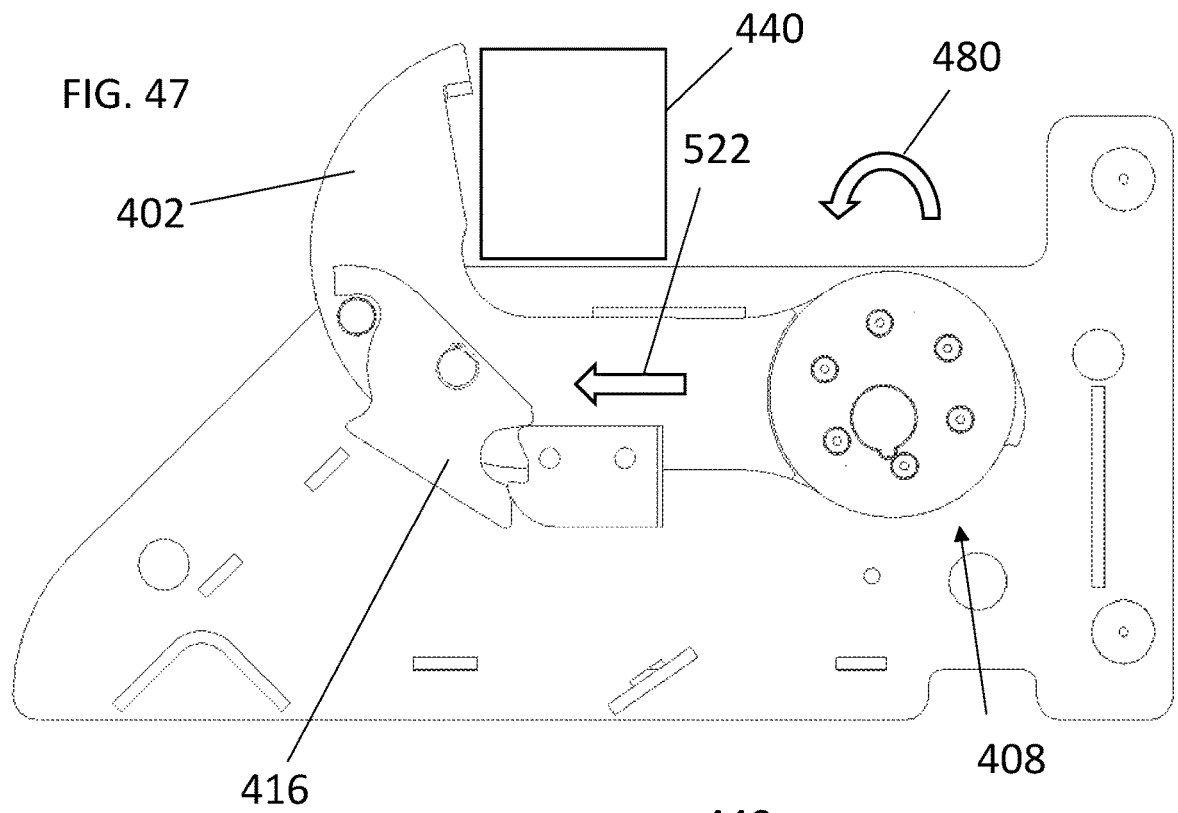
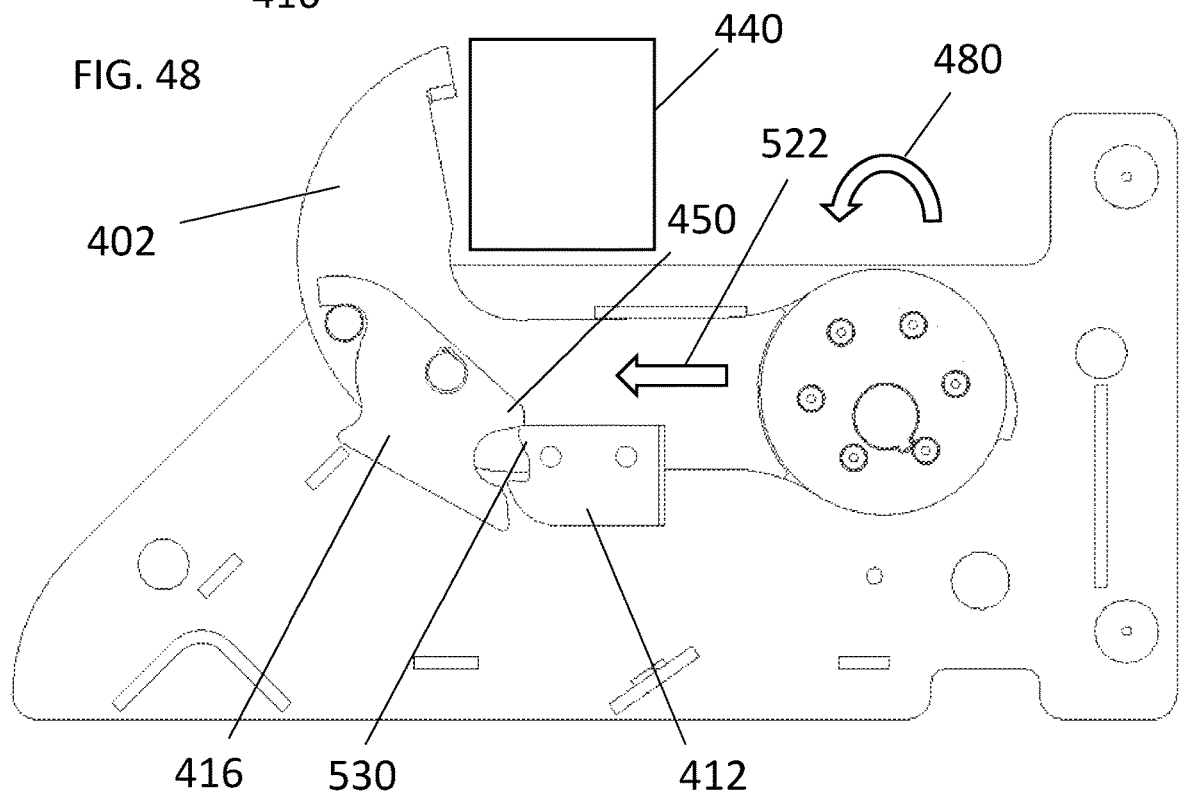

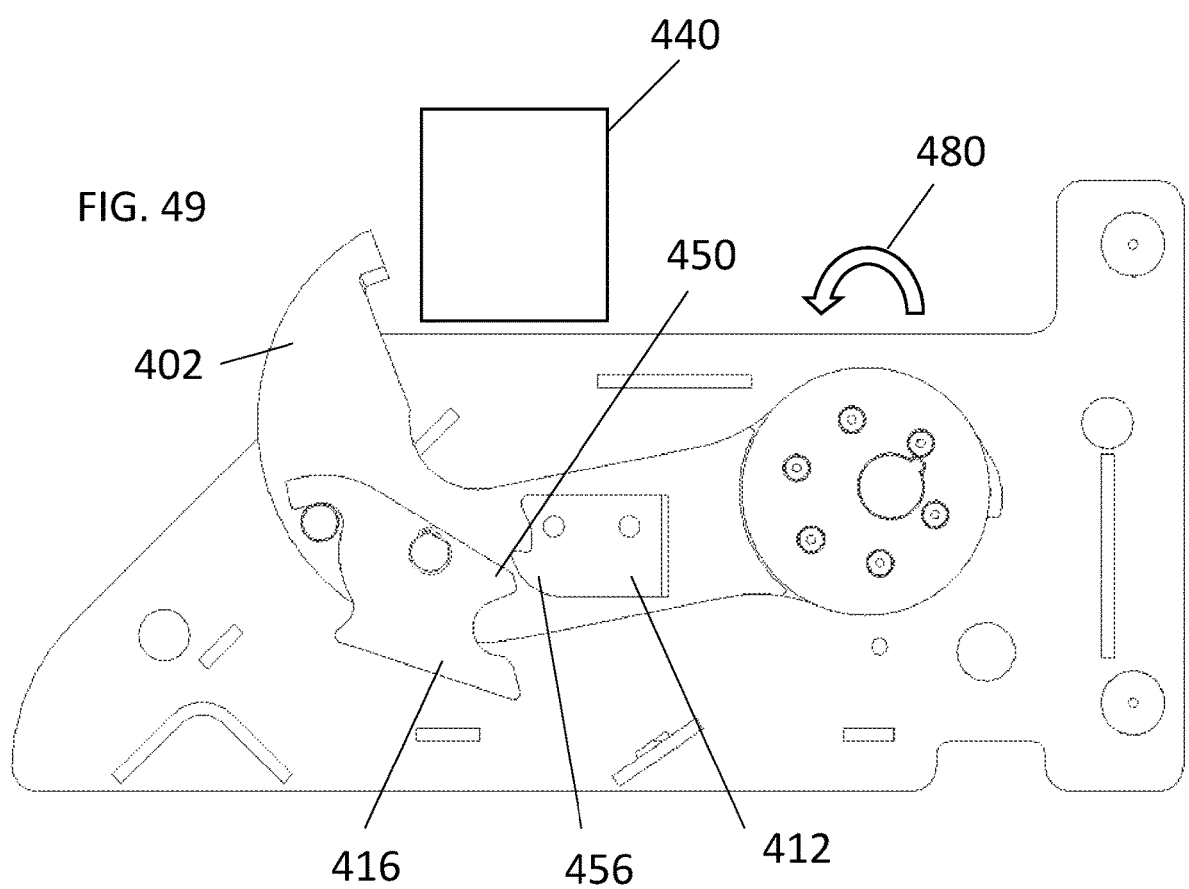

LOADING DOCK VEHICLE RESTRAINT SYSTEM

CROSS REFERENCE TO RELATED APPLICATIONS

This is a continuation-in-part of U.S. patent application Ser. No. 16/022,236, Filed Jun. 28, 2018, entitled DOCK RESTRAINT HOOK AND CONTROL SYSTEMS, which application claims the benefit of U.S. Provisional Patent Application No. 62/526,112, filed Jun. 28, 2017, which are all incorporated by reference herein in their entireties.

FIELD

The present disclosure relates to dock restraint systems used to secure vehicles, such as semitrailers, proximate a loading dock. More specifically, the present disclosure relates to a status indicator and hook control system and hook assembly used with dock restraint systems.

BACKGROUND

Vehicle restraint systems are commonly used to secure a vehicle, such as a semitrailer relative to a loading dock. When engaged, such restraint systems prevent translation of the vehicle relative to the loading dock and/or a dock plate. As commonly understood by those skilled in the art, a dock plate is a ramp or the like that provides a transition from dock areas to the load space associated with the vehicle. Preferably, the vehicle is secured such that the bed of the vehicle's storage area can be conveniently accessed by personnel and/or equipment associated with loading and unloading operations while the position of the vehicle is maintained relative to the dock or dock area. This allows the contents of the storage area to be quickly and efficiently exchanged between the facility and over the road transport vehicles without fear of the formation of a gap between the dock and the vehicle and/or the load area or bed of the transport vehicle. U.S. Pat. No. 6,190,109, which is incorporated herein by reference, discloses one such dock plate or leveler and a dock restraint system associated therewith.

In many dock restraint systems, the vehicle restraint device or system includes a carriage that is adjustably mounted to a mounting plate connected to a wall adjacent to the dock. The carriage is commonly configured to slideably cooperate with the underside of an underride or rear impact guard that is associated with the frame of the load vehicle. Commonly, the restraining member is pivotably supported by the carriage such that the restraint can be selectively engaged and disengaged from interaction with the rear impact guard. User interaction with the restraint assembly is commonly effectuated via a control panel. The control panel is commonly configured to receive input signals from loading personnel to effectuate a desired "secure" or "release" operation of the associated restraint relative to an underlying vehicle. The control system is further commonly configured to provide a restraint status indicator to the vehicle operator as well as surrounding personal to provide an indication that the restraint has achieved a desired orientation relative to the underlying vehicle to achieve the desired "secure" or "released", or "engaged or "disengaged" status of the restraint relative to the underlying vehicle.

Translation of the vehicle during loading and unloading operations can result in "jamming" of the restraining member and/or undesired interference of the restraining member with the vehicle guard. This undesired interference or "jamming" of the restraint system with the underlying vehicle can result in the inability to engage or disengage the restraining member from interaction with the vehicle guard when desired. Generally, the inability to achieve the desired engagement or disengagement of the restraining member or dock hook from the vehicle must be resolved by physically moving the vehicle relative to the carriage and/or restraint to effectuate the desired engagement and/or disengagement of the restraining member from the vehicle or trailer associated with the loading dock. Such undesired interaction proves problematic when trailers are left in a loading dock without an associated power vehicle such as a tug, tractor, or semi-tractor or operators or drivers are unavailable to operate the vehicle being loaded.

Commonly, the control system associated with operation of the underlying restraint system includes a plurality of discrete indicators that designate the respective status of the underlying restraint system. One common methodology includes providing a plurality of light elements, commonly of different colors and/or positioned at different locations, that designate the discrete condition of the underlying restraint system as being one or more of engaged and secure, engaged but non-secure, disengaged, and/or disengaged and fully retracted. The various locations and/or different color indications or designations associated with the various discrete conditions associated with operation of the underlying restraint system can leave personnel and/or vehicle operators unclear or confused as to a current condition associated with a discrete vehicle restraint system. Such confusion or misinterpretation can be exacerbated by the various different presentation methodologies associated with assessing the status of the discrete vehicle restraint systems when discrete facilities are equipped with restraint status, indicia, or indicator systems.

Accordingly, there is a need for a vehicle restraint system which can be selectively engaged and disengaged from discrete vehicles having various vehicle frame configurations and which provides a more readily discernable restraint condition or status indicia.

BRIEF DESCRIPTION OF THE DRAWINGS

The drawings illustrate various views of restraint systems and alternate embodiments of hook assemblies associated with a vehicle dock restraints or restraint systems.

In the drawings:

FIG. 39 is a side elevational view of a portion of a vehicle restraint assembly showing a hook of the vehicle restraint assembly at rest in a retracted position relative to a carriage of the vehicle restraint assembly;

FIG. 40 is a view similar to FIG. 39 showing the hook shifting laterally as a drive shaft of an eccentric mount of the vehicle restraint assembly turns;

FIG. 45 is a view similar to FIG. 44 showing the latch contacting the stop and a front projection of the latch lifting off of a catch of the hook;

FIG. 46 is a view similar to FIG. 45 showing an rear upper projection and a rear lower projection of the latch contacting the stop and resisting movement of the hook toward the retracted position which retains the underride guard in the vehicle restraint assembly;

FIG. 47 is a view similar to FIG. 46 showing the drive shaft of the eccentric mount turning in a reverse direction and the hook shifting laterally to a direction opposite the direction shown in FIG. 40;

FIG. 48 is a view similar to FIG. 47 showing the rear upper projection of the catch sliding off of the front upper projection of the stop as the drive shaft shifts laterally;

FIG. 49 is a view similar to FIG. 48 showing the hook continuing to shift laterally and rotate downward such that the rear upper projection of the catch slides off of the rear upper projection of the stop;

DETAILED DESCRIPTION

Figure 1:
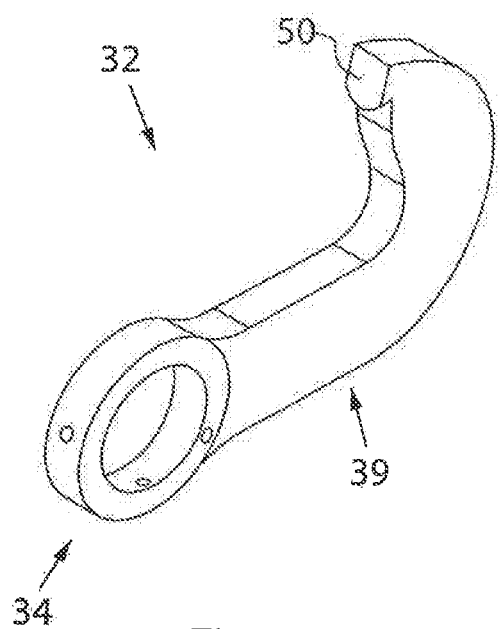
FIG. 1 is a perspective view of a vehicle restraint hook or restraint according to one embodiment.
Figure 2:
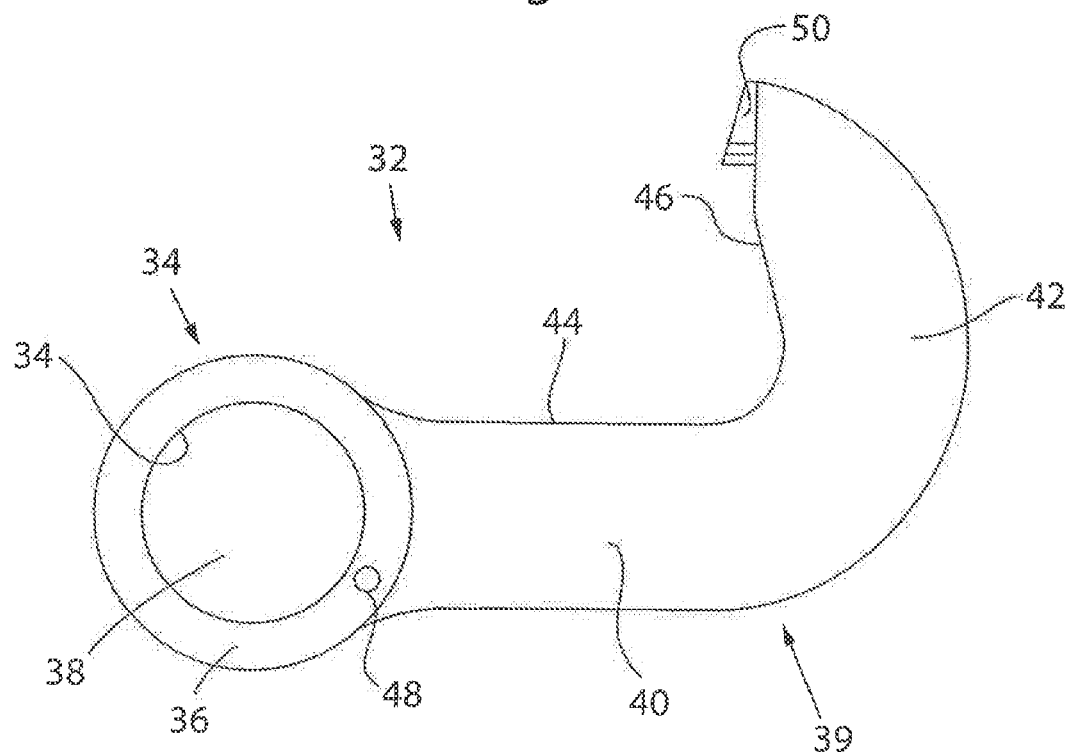
FIG. 2 is a plan view of the restraint shown in FIG. 1.

FIGS. 1 and 2 show an exemplary restraint or hook 32 that forms a portion of a vehicle restraining or vehicle restraint system 100 (FIG. 15) whose operation is configured to be manipulated by the control system as disclosed further below according to a first embodiment of the present disclosure. As disclosed further below with respect to FIGS. 3-14, a hook assembly 30 includes hook 32 that is constructed to cooperate with a cam or an insert 60 and a cover 80 such that hook assembly 30 can be secured to a carriage associated with vehicle restraint system 100 such that hook 32 is movable between an engaged position and a retracted position. When in an "engaged" position, hook assembly 30 interacts with a vehicle frame member, such as an underride guard or the like, such that the vehicle is restrained relative to the restraint system 100, and adjacent structure such as a loading dock area, dock plate, or the like, to facilitate secure interaction with the vehicle being loaded and/or unloaded. When "disengaged" or retracted, vehicles can be readily associated with or removed from restraint system 100.

Referring to FIGS. 1 and 2, hook 32 includes a generally circular base portion 34, a body 39, and a tooth 50 disposed at a distal end thereof generally opposite the generally circular base portion 34. The generally circular base portion 34 comprises an outer rim 36 with an opening 38 located therein. As disclosed further below, opening 38 is constructed to cooperate with an insert that is constructed to accommodate rotational securing of hook 32 relative to a carriage associated with the vehicle restraint system 100. The circular base portion 34 may include a dowel pin opening 48 that extends through outer rim 36. Body 39 of hook 32 extends from the outer rim 36 initially laterally into a shank 40 before turning at a generally 90 degree angle into a crown 42. Shank 40 of body 39 has an upper surface 44 and crown 42 has a side surface 46. Both upper surface 44 of shank 40 and side surface 46 of crown 42 are configured to preferably contact a portion of a vehicle or underride guard 92 as described below. As disclosed further below, in some vehicle configuration, a distal face 93 of tooth 50 may contact the structure of an underlying vehicle and effectuate the securing operation associated with the "engaged" orientation of hook 32. As shown in FIGS. 1 and 2, tooth 50 extends generally perpendicular to crown 42 of hook 32 at the edge of the crown 42 that is generally opposite the bend.

As disclosed further below, for those vehicles having generally open underride guard constructions, tooth 50 defines a lip 95 that engages a top-facing portion of the vehicle or vehicle guard 92 when the hook assembly 30 is in use. When used with vehicles having more closed or panel shaped underride guard constructions, face 93 of tooth 50 may engage the vehicle facing side of such frame structures and the cooperation of hook 32 with the underlying carriage provides a secure interaction between hook 32 and the vehicle underride guard structure as disclosed further below with respect to FIGS. 24 and 25.

Referring back to FIGS. 3-5, an insert 60 is configured to cooperate with opening 38 defined by body 39 of hook 32. Insert 60 includes a base 62 that is generally flat and a shaft 64 that extends in a crossing direction away from base 62. Base 62 and shaft 64 of insert 60 are generally concentric with respect to one another with shaft 64 having a smaller diameter than base 62. Such a construction defines a shoulder 66 that is formed by the outward radial extension of base 62 beyond a radially oriented exterior surface of shaft 64. A diameter of shaft 64 is slightly smaller than a diameter of opening 38 associated with outer rim 36 of hook 32 such that shaft 64 may be inserted into opening 38. A height of the shaft 64 is preferably substantially similar to the width of opening 38. Preferably, the diameter of shaft 64 is dimensioned within machine operation and assembly tolerances associated with the axially slideable interaction between shaft 64 and hook 32 during assembly of hook assembly 30.

Figure 3:
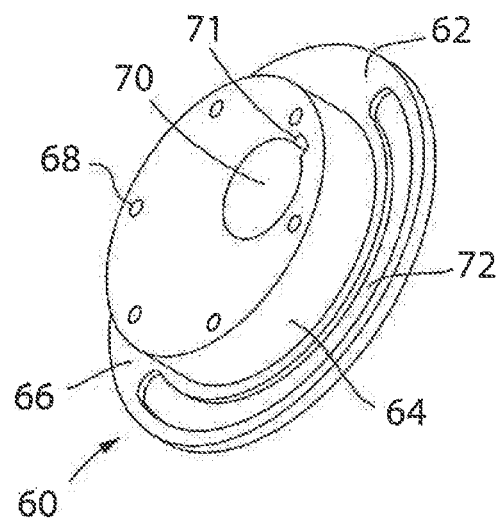
FIG. 3 is a perspective view of an insert that is constructed to cooperate with the restraint shown in FIG. 1.
Figure 5:
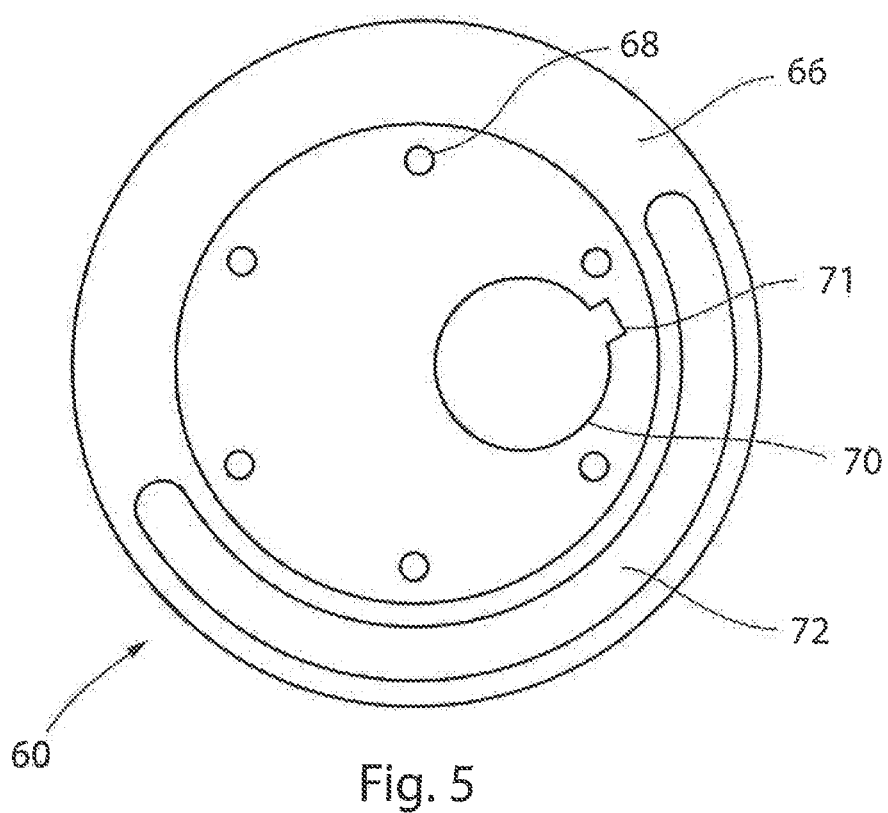
FIG. 5 is a lateral side elevation view of the insert shown in FIG. 3.

As shown in FIGS. 3 and 5, insert 60 has a number of openings. First, a series of blind holes or fastener openings 68 are formed on an end face of shaft 64 and are configured to receive screws, bolts, pins, or other attachment devices associated with securing cover 80 to insert 60 such that outer rim 36 of hook 32 is captured between shoulder 66 associated with base 62 and cover 80 when hook assembly 30 is assembled. Insert 60 preferably includes an insert pivot opening or pivot hole 70 that extends through the height of insert 60 including base 62 and shaft 64. Insert pivot hole 70 is generally circular with a key, keyhole 71, or other means to prevent relative rotation between a mating shaft and pivot hole 70. As disclosed further below, insert pivot hole 70 is configured to receive a driving member or drive shaft 143 (FIG. 16) associated with facilitating the desired rotation of insert 60, cover 80, and hook 32 during rotation of the drive shaft. As shown in FIG. 5, insert pivot hole 70 is offset from the center of the insert 60. That is, insert pivot hole 70 is eccentric relative to the center axis of insert 60 and is thereby eccentrically oriented relative to hook 32. As disclosed further below, the eccentric orientation of the drive member relative to hook 32 provides lateral translation of hook 32 relative to an underlying carriage during selected portions of the range of travel associated with operation of hook 32.

Figure 4:
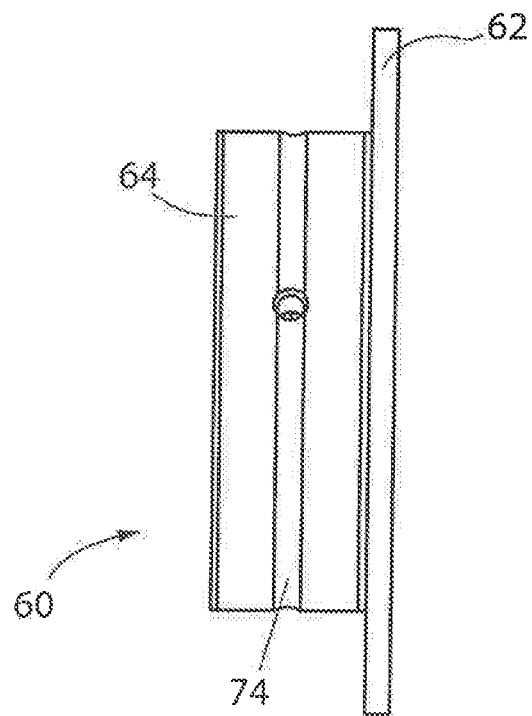
FIG. 4 is a side elevation view of the insert shown in FIG. 3.

Base 62 of insert 60 additionally has a groove or slot 72 that is formed in shoulder 66. As shown, slot 72 extends at least approximately halfway around a circumference of insert 60, more preferably greater than 180 degrees, and more preferably approximately 210 degrees of the circumference of insert 60. Preferably, as disclosed further below, the rotational association between insert 60 and hook 32 allows relative rotation therebetween to achieve an over-center orientation between the axis of rotation associated with pivot hole 70 associated with insert 60 and the axis of rotation associated with hook 32 such that hook 32 can resist rotation of hook 32 relative to insert 60 in response to lateral forces imparted to crown 42 of hook 32 when hook 32 is engaged with a vehicle during vehicle loading and unloading operations. Slot 72 is preferably located directly adjacent outer rim 36 of hook 32 when shaft 64 of insert 60 is associated with opening 38 of hook 32. As shown in FIG. 4, a groove 74 is formed in shaft 64 and extends in a generally circumferential direction about a radially exterior surface of shaft 64. Groove 74 is constructed to accommodate the communication of lubrication or dispersal of grease or the like along the interface between shaft 64 of insert 60 and inner wall 37 of outer rim 36 of hook 32. As described below, such a construction allows insert 60 to rotate relative to the outer rim 36 of hook 32 with reduced frictional interaction, damage, degradation, or wear between the movable relative surfaces of insert 60 and hook 32.

Figure 6:
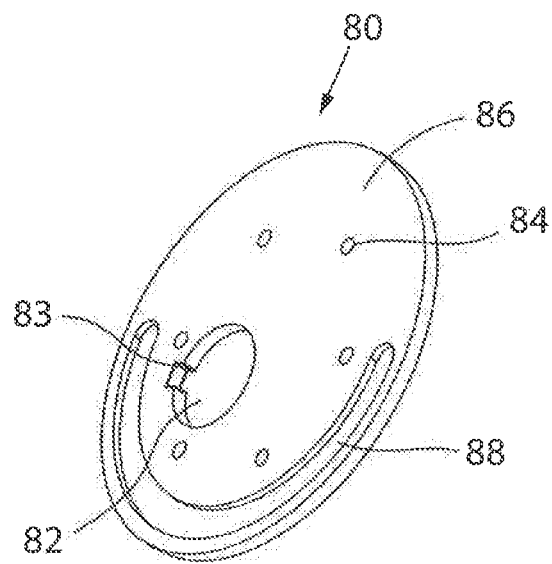
FIG. 6 is a perspective side view of a cover constructed to cooperate with the restraint and the insert shown in FIGS. 1 and 3.
Figure 7:
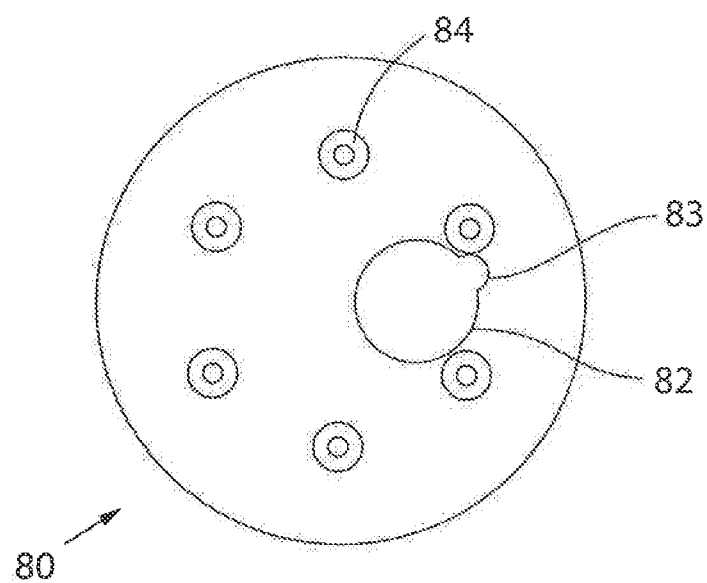
FIG. 7 is a laterally outboard side elevation view of the cover shown in FIG. 6.

FIGS. 6-7 show a cover 80 that is constructed to cooperate with hook 32 and insert 60 at an opposite lateral side of hook assembly 30. As used herein, the opposite lateral sides of hook assembly 30 are those sides that face in generally opposite lateral directions and are oriented normal to the axis of rotation defined by the curvilinear surfaces of shaft 64 and insert pivot hole 70. Cover 80 has a number of features that generally mirror or are complimentary to the features of insert 60. For instance, cover 80 has a cover pivot hole 82 that extends through cover 80. Cover pivot hole 82 is offset or eccentric from the center of the cover 80, is generally circular, and also includes a keyway, keyhole or other means to prevent the mating or drive shaft from rotating within cover pivot hole 83. Cover 80 includes a series of fastener holes 84 that extend through cover 80 and correspond to holes or openings 68 associated with insert 60. Finally, a laterally inboard facing side or underside 86 of cover 80 features a groove or slot 88 that extends approximately at least halfway around a circumference the cover 80, approximately greater than 180 degrees, and more preferably approximately 210 degrees of the circumference of cover 80.

Figure 8:
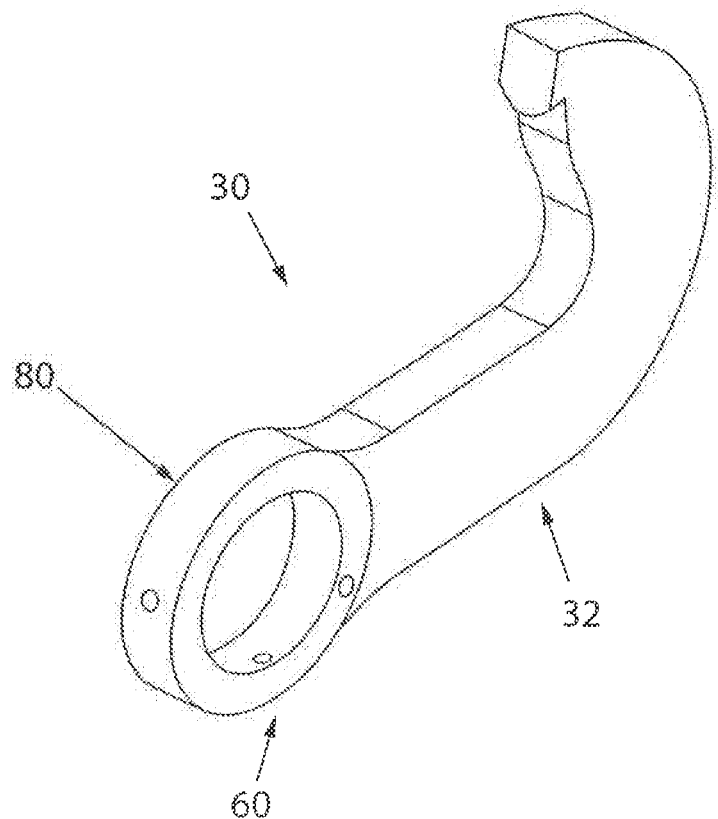
FIG. 8 is a perspective view of the restraint shown in FIG. 1 with the insert shown in FIG. 3 and the cover shown in FIG. 6 associated therewith.

During assembly of the restraint hook assembly 30 associated with hook 32, insert 60, and cover 80; shaft 64 of insert 60 is inserted into opening 38 of hook 32. Shaft 64 is inserted into hook 32 until shoulder 66 of base 62 is adjacent to, abuts, or impinges upon outer rim 36 of hook 32. During assembly, insert pivot hole 70 is then aligned with cover pivot hole 82. One or more fasteners, such as screws, bolts, or other attachment devices are then inserted into the fastener holes 84 of cover 80 and into operative engagement with fastener openings 68 associated with insert 60. Thereafter, outer rim 36 of hook 32 is located or captured between insert 60 and cover 80, as shown in FIG. 8.

Once assembled, hook assembly 30 can be slideably associated with a drive or pivot shaft (FIG. 18) associated with the vehicle restraint system as the drive shaft extends through the insert pivot hole 70 and the cover pivot hole 82 and can be keyed relative thereto. As disclosed further below, rotational operation of the drive shaft effectuates selective translation of the hook assembly 30 relative to the underlying carriage assembly and facilitates selective interaction of hook 32 with a vehicle associated with vehicle restraint system 100. The eccentric association of hook 32 with pivot hole 70 associated with insert 60 allows hook assembly 30 to translate in an eccentric rotational manner about a pivot axis defined by the pivot shaft. Additionally, as insert 60 and cover 80 are connected to but physically separate from hook 32, insert 60 and cover 80 can additionally eccentrically rotate relative to outer rim 36 of hook 32. The rotational movement of insert 60 and cover 80 relative to hook 32 can be limited as disclosed further below.

Figure 9:
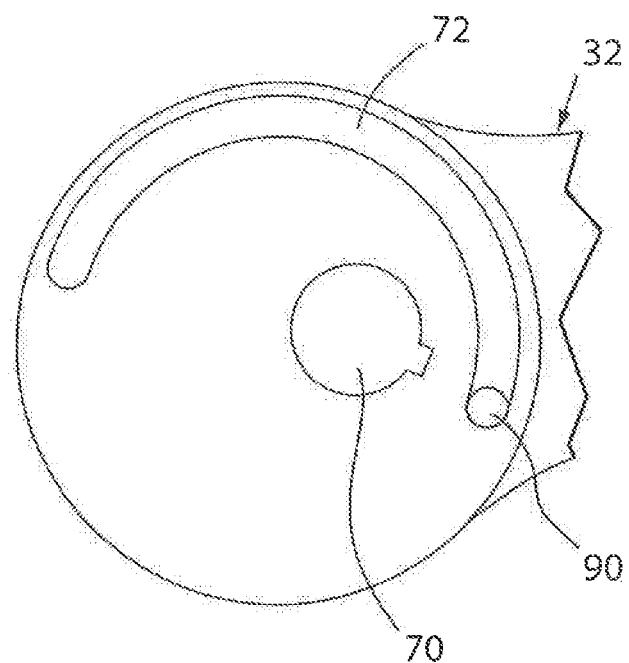
FIG. 9 is an elevation section view of a portion of the restraint and insert taken along line 9-9 shown in FIG. 8.
Figure 11:
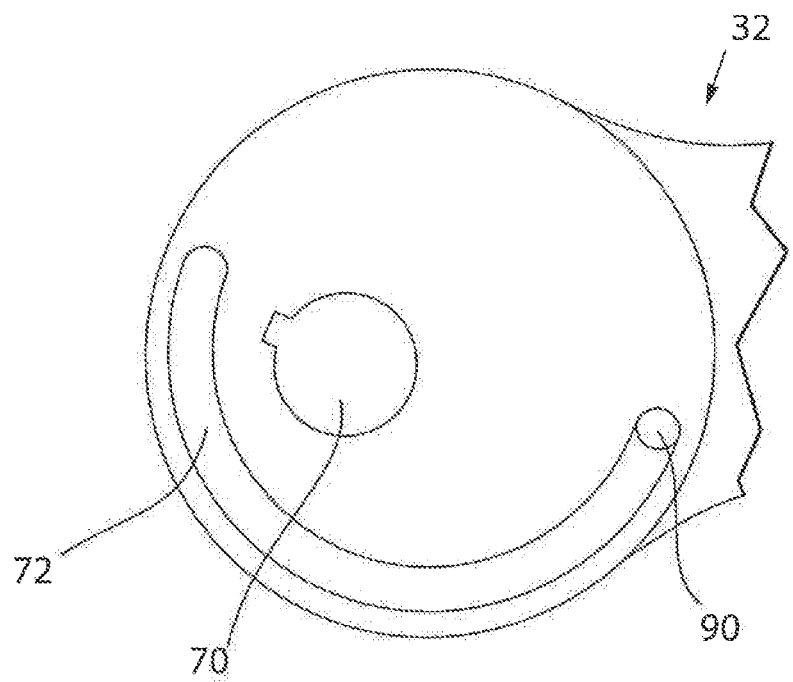
FIG. 11 is a view similar to FIG. 9 with the insert in a second orientation relative to the restraint.

Referring to FIGS. 1, 9, and 11, hook assembly 30 preferably includes a dowel pin 90 that passes through dowel pin opening 48 of hook 32. The generally opposite longitudinal ends of pin 90 slideably cooperate with slot 72 associated with laterally inboard facing side of insert 60 and slot 88 associated the laterally inboard facing side of cover 80. That is, dowel pin 90 has a longitudinal length that is slightly longer than a lateral width of outer rim 36 of body 39 of hook 32. Consequently, dowel pin 90 protrudes into both insert slot 72 and the cover slot 88. Such cooperation allows insert 60 and cover 80 to rotate relative to circular base portion 34 along the length of the slots 72, 88. Put another way, the cooperation of pin 90 with slots 72, 88 limits the degree of relative rotation between hook 32 and insert 60.

Although shown as being oriented radially inboard relative to an outer radial surface associated with base portion 34 of hook 32, it is appreciated that the function associated with the pin could be provided in other methodologies. For instance, the outer radial surface of base portion 34 of hook 32 could be provided with a contour such as a lobe or the like that is constructed to cooperate with a projection or pin that extends in an inboard lateral direction relative to the insert 60 and/or cover 80 to provide the desired cooperation between insert 60, cover 80, and hook 32 that facilitates the selective rotational association between insert 60 and cover 80 and hook 32. Said in another way, it is appreciated that various configurations could be provided between hook 32 and insert 60 and/or cover 80 wherein a first portion of the range of rotation of insert 60 causes only generally lateral translation of hook 32 relative to an underlying carriage and a second portion of the range of rotation of insert 60 relative to hook 32 causes eccentric rotation of hook 32 relative to the underlying carriage. Regardless of the configuration of the specific physical interference between hook 32 and insert 60, the selective rotational interaction between the eccentric pivot assembly and hook 32 is selectively operable in reverse rotational directions associated with operation of the drive shaft associated with shaft opening 70.

FIG. 9 illustrates a cross section of the hook assembly 30 when the dowel pin 90 is located at a first end of insert slot 72 and cover slot 88. Insert 60 and cover 80 are rotatable relative to hook 32 as pin 90 travels between the first end of the slots 72, 88 and the second end of the slots 72, 88 as shown in FIG. 11. Thus, as noted previously, the configuration of the slots 72, 78 limits movement of insert 60 and cover 80 around the circular base portion 34 of hook 32 to those positions shown in FIGS. 9 and 11 and any positions therebetween.

Referring to FIGS. 10-13, when in use, hook 32 is used to generally engage a portion of the vehicle or vehicle frame member, such as a vehicle guard or an underride guard 92. Such underride guards are normally generally horizontally oriented and disposed near the rear portion of a vehicle. The hook 32 can be moved relative to the underride guard 92 of a truck via operation of the vehicle restraint device that effectuates rotation of the shaft associated with pivot hole 70. The underride guard 92 may slide in a horizontal direction along the upper surface 44 of the shank 40 and in a limited vertical direction along the side surface 46 associated with the crown 42. Ultimately, when engaged with a generally open tubular structured underride guard, tooth 50 associated with hook 32 cooperates with an upward facing surface of underride guard 92 to secure the vehicle relative to the loading dock, as can best be seen in FIG. 10. If the tooth 50 is initially loosely engaged with the guard 92, continued rotation of the hook in a generally upward direction toward a dock area results in vehicle restraint device more tightly engaging the underride guard 92.

Figure 10:
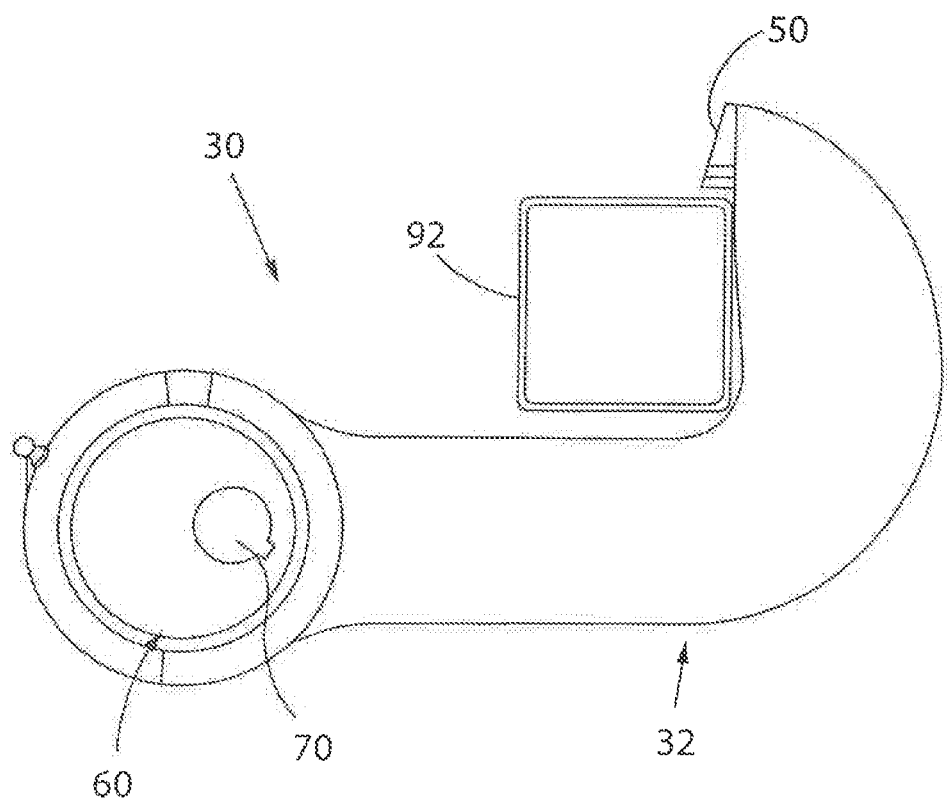
FIG. 10 is a side elevation view of the restraint, insert, and cover shown in FIG. 8 with a vehicle frame member or underride guard associated therewith and the restraint oriented in an engaged orientation relative to the restraint.

Referring to FIG. 9, hook assembly 30, and more specifically dowel pin 90, insert 60, and cover 80 are in a first position. FIG. 10 shows the hook assembly 30 in the same relative orientation as FIG. 9 when the hook 32 is engaged with the underride guard 92. When the tooth 50 is engaged with the underride guard 92, the hook 32 cannot be rotated downwardly away from the vehicle due to the inferring interaction of guard 92 with tooth 50. In accordance with the present disclosure, in order to disengage the hook tooth 50 from the underride guard 92, hook assembly 30 moves in a generally forward lateral direction relative to guard 92. That is, rotation of insert 60 and cover 80 relative to outer rim 36 of hook 32, due to the eccentric association therebetween and the rotational translation associated with grooves or slots 72, 88 and pin 90, accommodates generally lateral translation of body 39, including hook 32, during rotation of the drive shaft associated with pivot hole 70.

Figure 12:
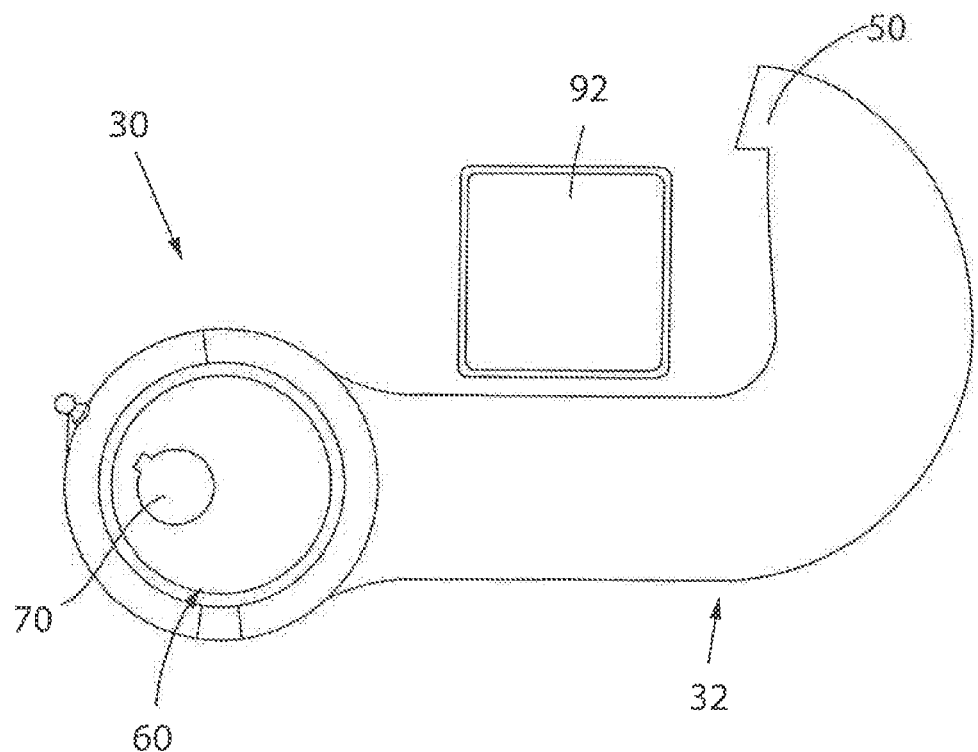
FIG. 12 is a view similar to FIG. 10 with the restraint oriented in a second or intermediate orientation relative to the underride guard of a vehicle guard during engagement and disengagement translation of the restraint relative thereto.

When dowel pin 90 interacts with end of slots 72, 88, continued rotation of the shaft associated with pivot hole 70 effectuates rotation of body 39 (and associated hook 32) in respective clockwise and counterclockwise directions. This rotates hook 32 into and out of an orientation where the hook interferes with or allows lateral translation of a vehicle guard relative thereto. Continued rotation of insert 60 and cover 80 in a clockwise direction from the position shown in FIG. 9 to the position shown in FIG. 11, as indicated by the orientation of slot 72, results in forward lateral movement of the hook 32 as a result of the eccentric association between insert 60, cover 80, and hook body 39. This is best seen in FIG. 12, which shows the hook assembly oriented at a generally forward orientation relative to vehicle guard 92 when insert 60, cover 80, and body 39 are in the orientations shown in FIG. 11 as evidenced by the forwarded oriented position of the eccentric lobe defined by insert 60 with respect to the axis of rotation associated with keyed drive shaft or pivot hole 70. As hook 32 traverses toward the forward position shown in FIG. 12, tooth 50 achieves an orientation wherein tooth 50 clears the underride guard 92, and hook assembly 30 can be rotated downwardly away from the vehicle in response to continued clockwise rotation of the drive shaft associated with pivot hole 70. Such continued rotation allows tooth 50 and crown side surface 46 to rotate to an orientation out of interference with guard 92 such that a vehicle associated with guard 92 can be removed or disengaged from the vehicle restraint system associated with hook 32.

Figure 13:
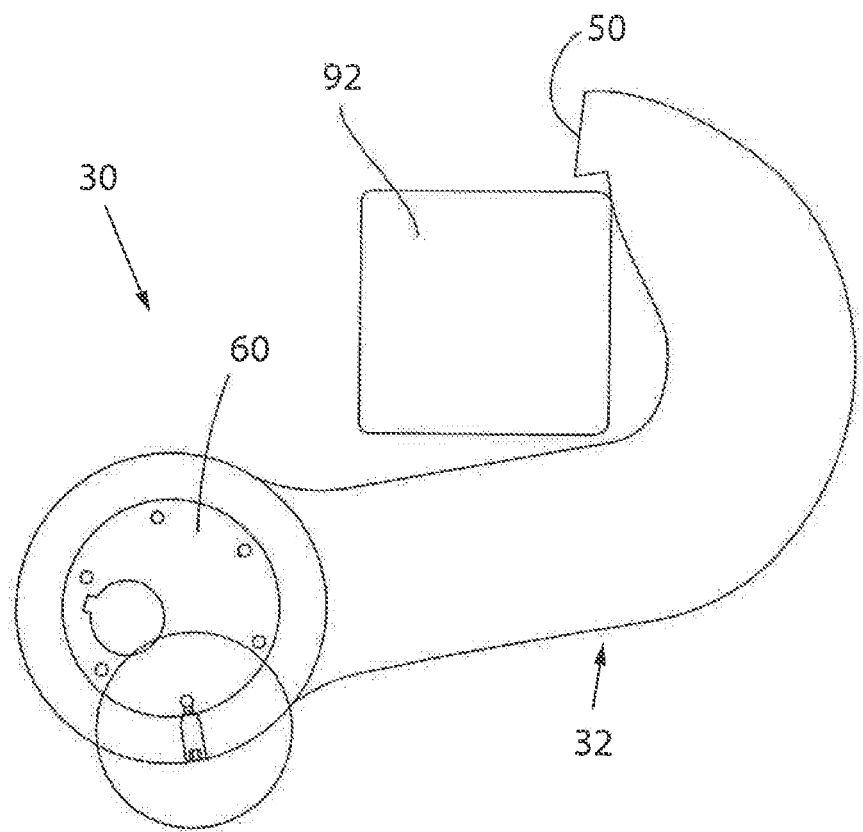
FIG. 13 is a side elevation view of the restraint and insert assembly oriented in an engaged orientation relative to an underride guard associated therewith.
Figure 14:
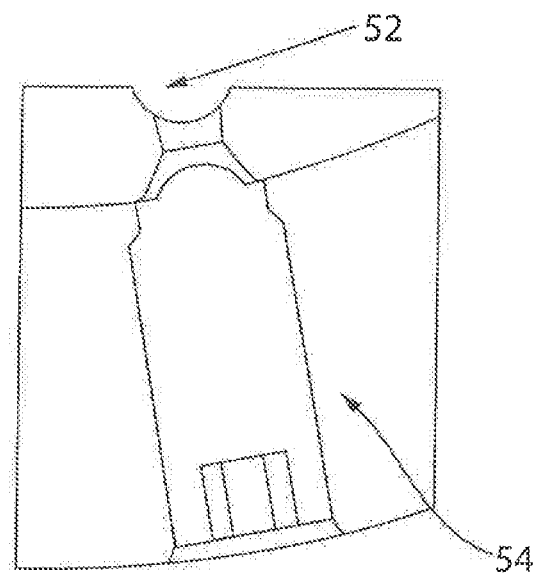
FIG. 14 is an elevation detail cross section view of the restraint, insert, and cover assembly taken along line 14-14 shown in FIG. 13.

It is appreciated that additional and/or alternate components and/or arrangements may be used to facilitate the eccentric movement of insert 60 and cover 80 about opening 38 defined by hook 32. For instance, as shown in FIGS. 13 and 14, in an alternate embodiment, hook assembly 30 can be provided with a ball 54 and detent 52 arrangement configured to retain hook 32 in an extended position until it contacts the underride guard 92. Once the underride guard 92 is contacted, the force associated with the initial contact unseats ball 54 from a ball detent 52 defined by insert 60 such that insert 60 can continue to rotate and bias the underride guard 92 toward the dock. The ball 54 and opening or detent 52 are shown in more detail in FIG. 14. When the operator wishes to detach the hook assembly 30 from the underride guard 92, the insert 60 and cover 80 can again be rotated from the position shown in FIG. 9 to the position shown in FIG. 11 so that the hook tooth 50 clears the underride guard 92, and the hook 32 can be rotated in a generally downward direction so that the vehicle can be disengaged from the retaining system.

It should be noted that although the above description contemplates limited rotation of the insert and cover by using a dowel pin and corresponding slots or a dowel pin and detent, rotational movement and restriction thereof could be achieved in other ways as would be known to one skilled in the art.

Figure 15:
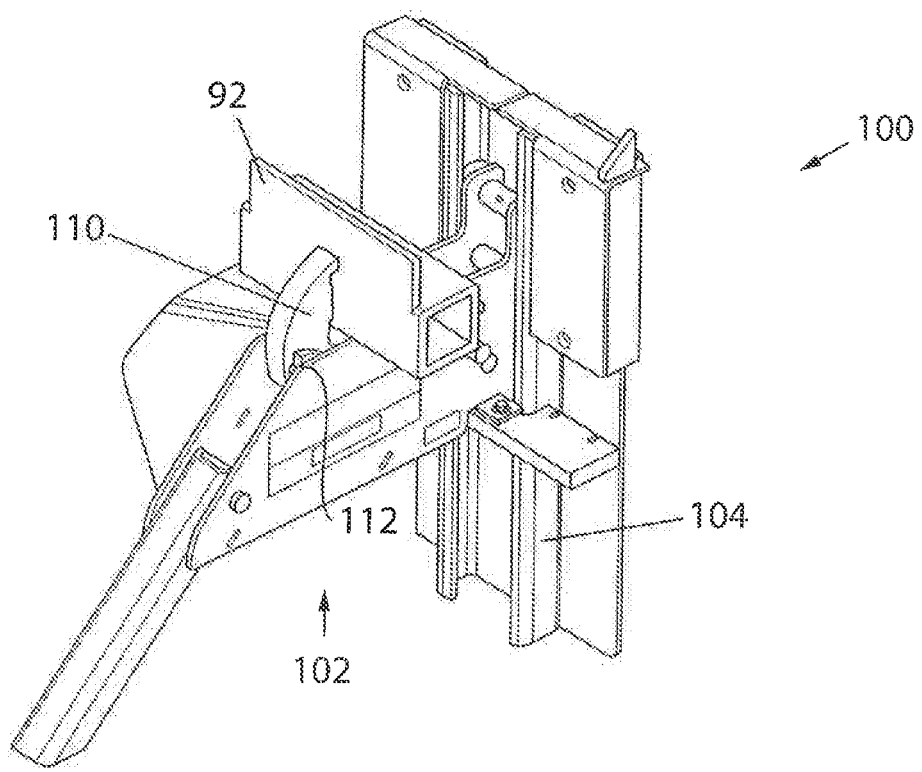
FIG. 15 is a perspective view of the restraint shown in FIGS. 10-13 supported by a carriage associated with a vehicle restraint assembly according to the present disclosure with a vehicle underride guard associated therewith.
Figure 16:
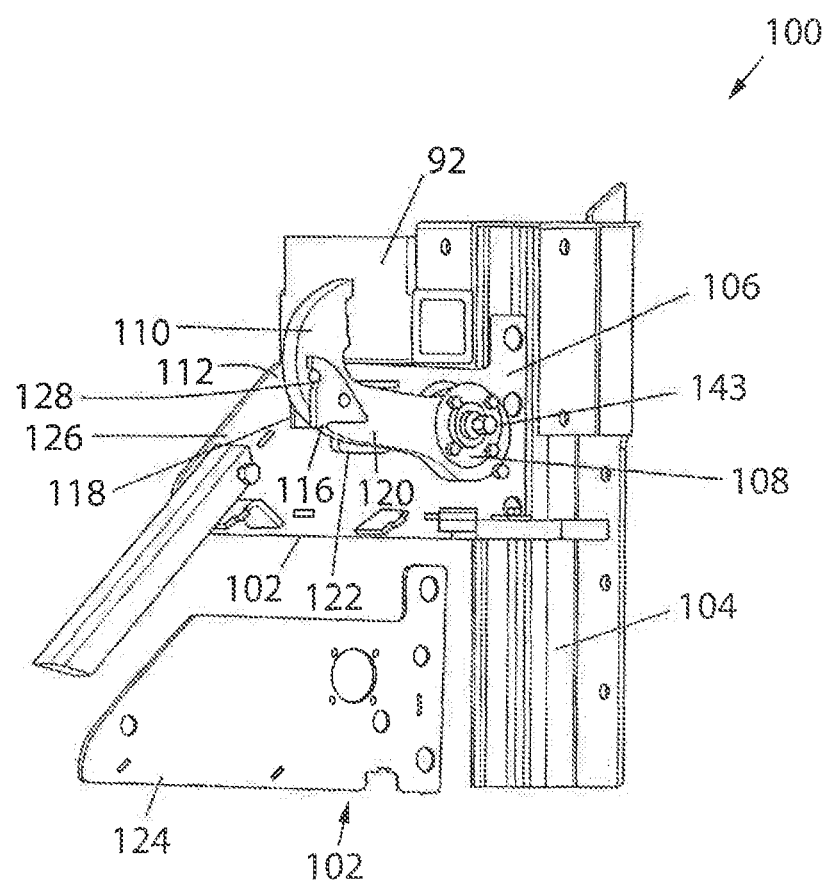
FIG. 16 is a view similar to FIG. 15 with a side panel of the carriage exploded from the vehicle restraint assembly.
Figure 17:
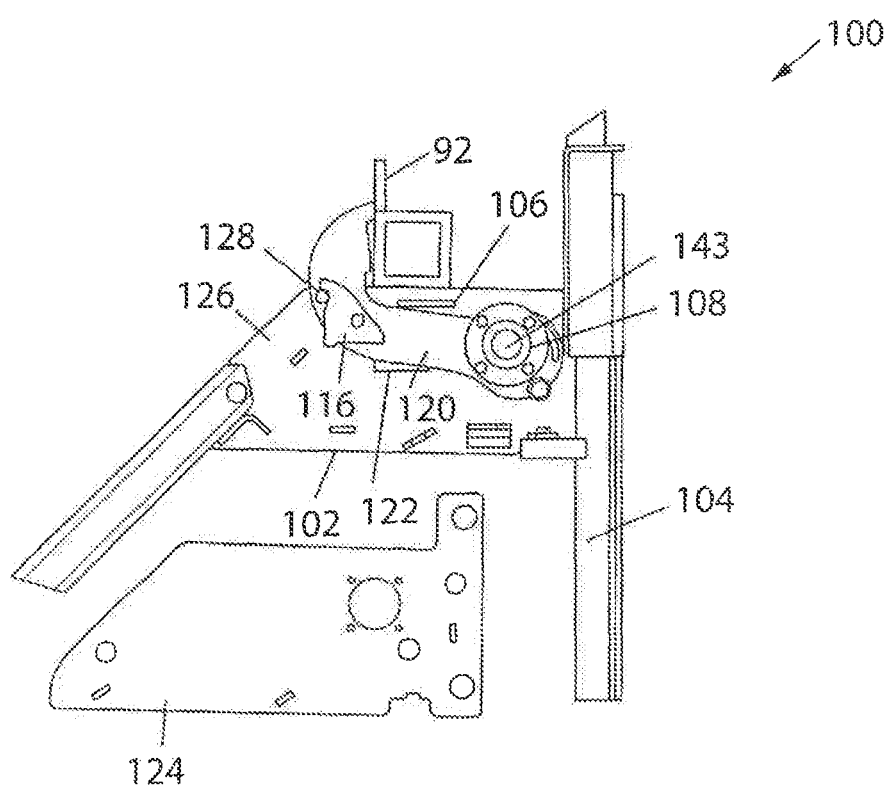
FIG. 17 is a side elevation view of the assembly shown in FIG. 16.

FIGS. 15-29 show various views of a vehicle restraint system 100 according to another embodiment. Vehicle restraint system 100 includes a carriage or carriage assembly 102 that slideably cooperates with a rail 104 that is configured to be secured to a generally vertical support structure, such as a wall, oriented generally below a discrete loading dock area. Vehicle restraint system 100 includes a restraint or hook assembly 106 that is movable or rotatable relative to the carriage assembly 102 in a manner similar to that described above with respect to hook assembly 30. That is to say, hook assembly 106 is secured to carriage assembly 102 via an eccentric pivot assembly or eccentric pivot 108 similar to that described above with respect to the hook assembly 30 to include an insert and a cover so that hook portion 110 of hook assembly 106 is movable between a disengaged or retracted position and an extended or engaged position as shown in FIGS. 15 and 16 to allow selective securing or release of an underride guard 92 relative to vehicle restraint system 100. It should be appreciated that hook assembly 30 described above is constructed to cooperate with carriage assembly 102 so as to be operable with respect to engagement and disengagement with a vehicle frame member in the manner described above and as described below.

It should be appreciated that when retracted, hook portion 110 of hook assembly 106 is disposed generally below upper surface 112 of carriage assembly 102 such that the hook assembly 106 does not otherwise interfere with the longitudinal translation of a vehicle underride guard relative to the vehicle restraint system 100. When engaged or oriented in an extended position relative to carriage assembly 102, hook portion 110 extends generally above upper surface 112 of carriage assembly 102 so as to selectively interfere with outward longitudinal translation of underride guard 92 relative to restraint system 100 in a manner similar to that described above with respect to hook assembly 30.

As shown in FIGS. 16-29, unlike hook assembly 30, vehicle restraint system 100 includes a hook position securing system that mitigates undesired translation of the hook assembly relative to the carriage assembly during certain situations associated with engagement of the hook assembly 106 with a respective underride guard 92. Vehicle restraint system 100 includes a first latch 116 and a second latch 118 that are each rotationally supported along generally opposite lateral sides of a hook 120 of hook assembly 106. As disclosed further below, each latch 116, 118 is oriented and constructed to cooperate with a respective stop 122 associated with the respective side panel 124, 126 of carriage assembly 102. Each latch 116, 118 is also constructed to selectively cooperate with a respective catch 128 that extends in an outward lateral direction relative to hook 120. As disclosed further below, respective latches 116, 118; stops 122; and catches 128 are constructed and oriented to cooperate with the eccentric motion of hook 120 relative to carriage assembly 102 to achieve the desired selectively securable interaction of hook 120 with underride guard 92 and to selectively maintain hook 120 in the extended orientation relative to carriage assembly 102 when desired.

Figure 29:
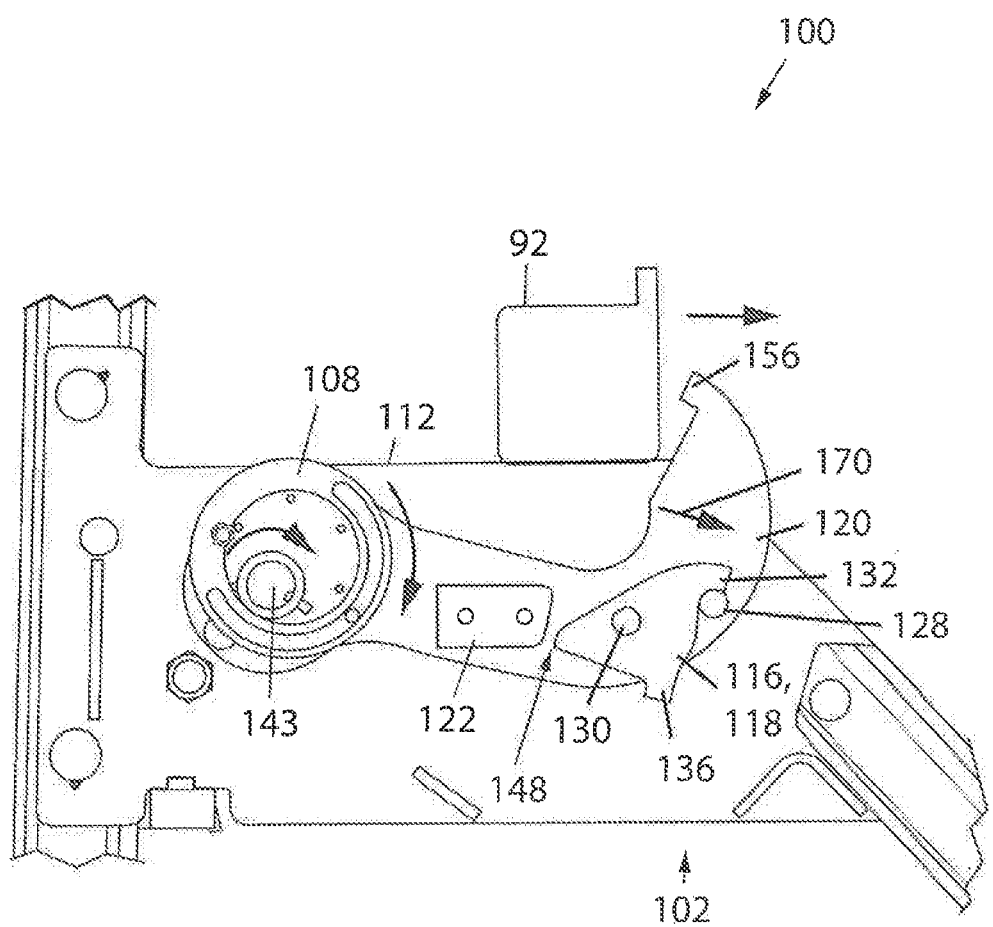
FIG. 29 is a view similar to FIGS. 18-26 and shows the latch and catch operationally dissociated to facilitate translation of the vehicle restraint toward a retracted or stowed position relative to the carriage such that the restraint does not interfere with translation of the vehicle in a disengage direction relative to the vehicle restraint system.
Figure 29A:
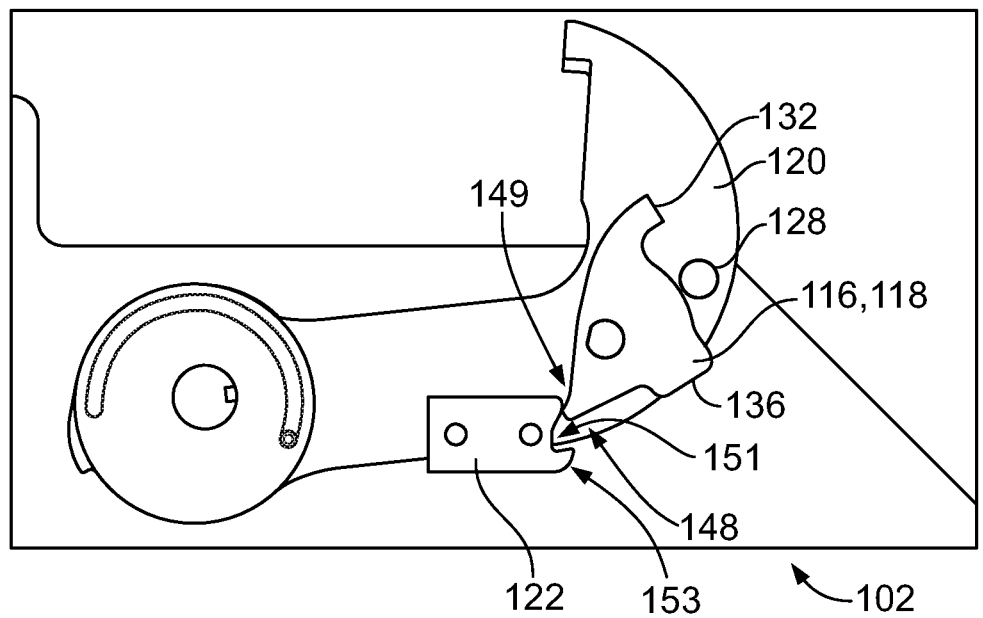
FIGS. 29A and 29B show a view similar to FIG. 29 of a latch and catch construction according to an alternate embodiment.
Figure 29B:
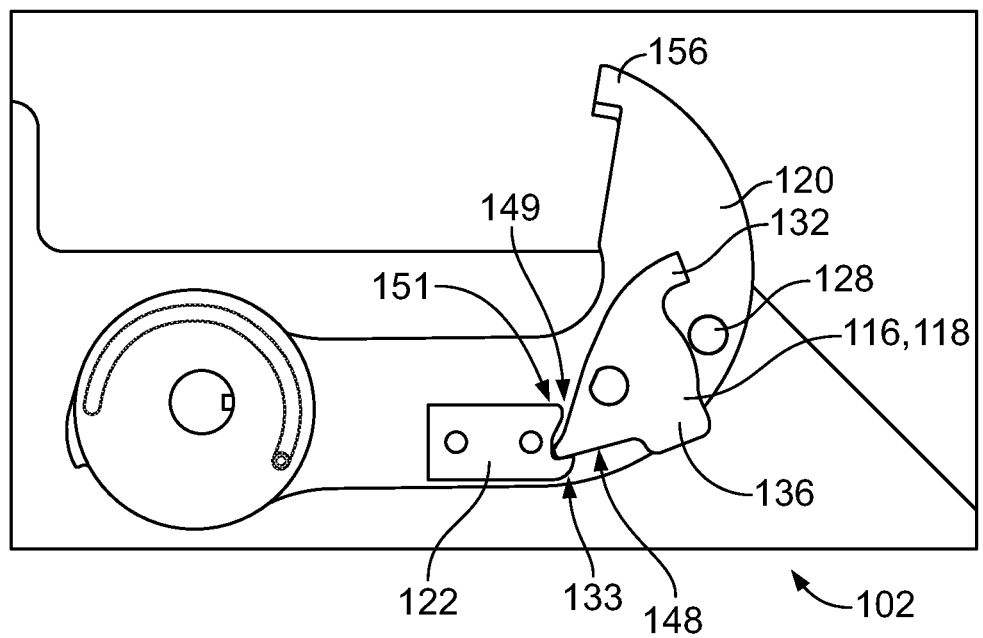

Referring to FIGS. 29A, 29B, in alternate embodiment, rear portion 148 of respective latches 116, 118 includes a cutout 149 configured to cooperate with a recess 151 formed in a forward-facing face 153 associated with respective stops 122. As disclosed further below with respect to the operation of the hook status and motion control system, an indication can be provided to operators and adjacent personal indicating the desired restraint of the vehicle when the respective hooks are positively engaged with the underlying stop. In the event hook 120 does not rotate a sufficient distance to achieve an interfering interaction between latches 116, 118 and corresponding stops 122, cutouts 149 and recess 151 cooperate with one another in a manner wherein forward or upward rotation of hook 120 is required to effectuate the desired translation of the respective latches 116, 118 relative to the respective stops 122 to effectuate disengagement therebetween to allow continued downward rotation of hook 120 relative to carriage assembly 102. That is, the cooperation of rear portion 148 of latches 116, 118 with the recess 151 formed in the forward face of respective stops 122 ensures that hook 120 cannot be biased in a downward rotational direction and provide an indication to adjacent personal that the vehicle is restrained when the respective latches 116, 118 are positively engaged with either of the top surface of the respective stops 120 or the recess 151 associated therewith.

Figure 18:
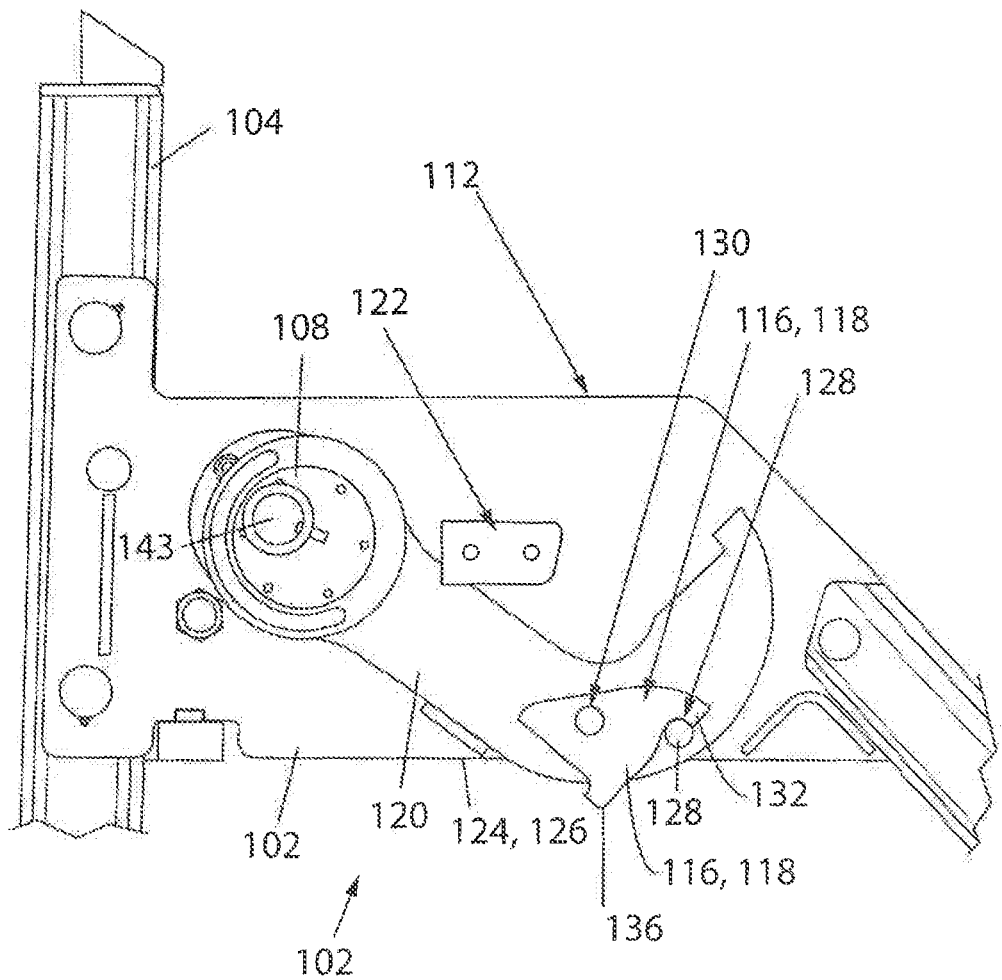
FIGS. 18, 19, 20, 21, 22, 23, 24 and 25 are various side elevation views of a portion of the vehicle restraint assembly shown in FIG. 16 with an opposite side panel of the carriage removed therefrom and the restraint moving sequentially through a retracted or disengaged orientation relative to the carriage toward an engaged orientation relative to the carriage and an underride guard.

Regardless of the specific configuration of the latches 116, 118 and respective stops 120 and referring to FIG. 18, when retracted, hook 120 is disposed generally between panels 124, 126 of carriage assembly 102. Latches 116, 118 are preferably freely rotatable relative to pivot 130 such that a projection 132 associated with each latch 116, 118 rests upon a respective catch 128 supported by hook 120. Each latch 116, 118 further includes an optional lobe 136 that is also constructed to cooperate with catch 128 and oriented to prevent over rotation of the respective latches 116, 118 relative to hook 120. Lobes 136 also manipulate the position of the center of gravity associated with latches 116, 118 such that the center of gravity maintains a desired offset or over center orientation of the center of gravity relative to the axis associated with pivot 130 for the reasons described further below with respect to FIGS. 27-28.

Figure 19:
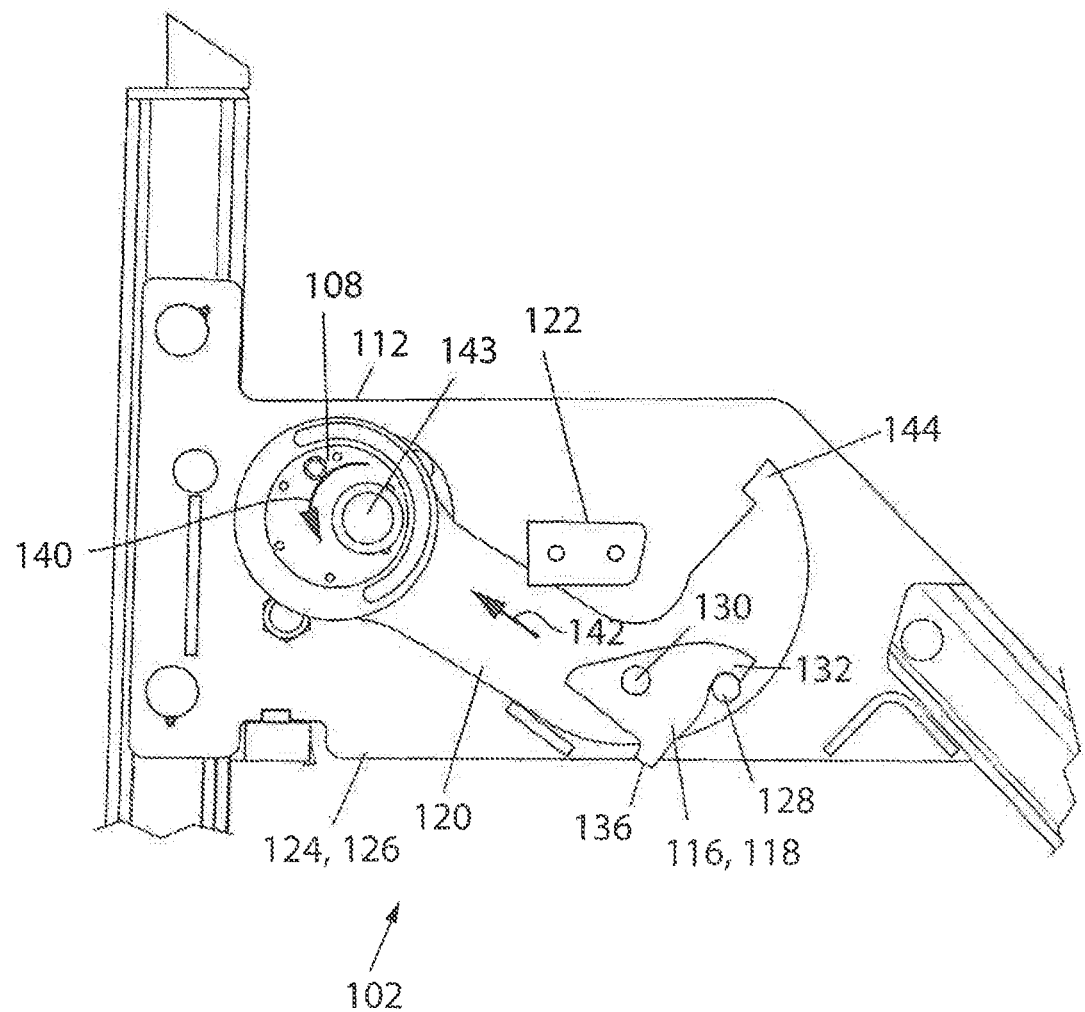
Figure 20:
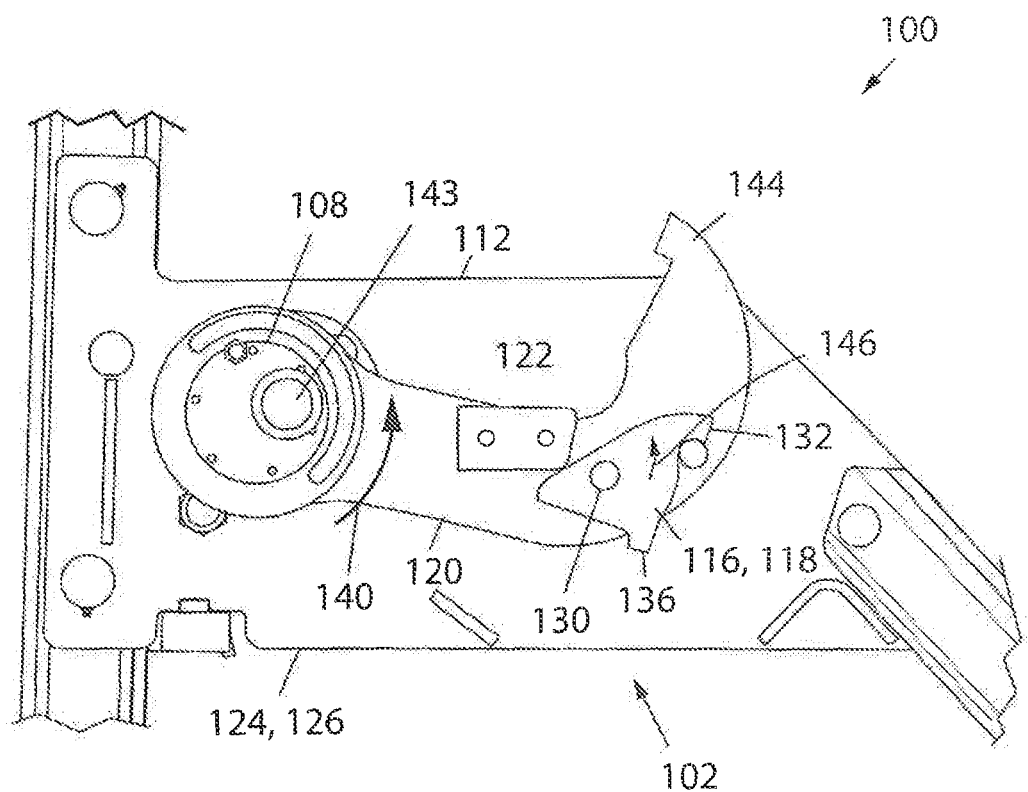
Figure 21:
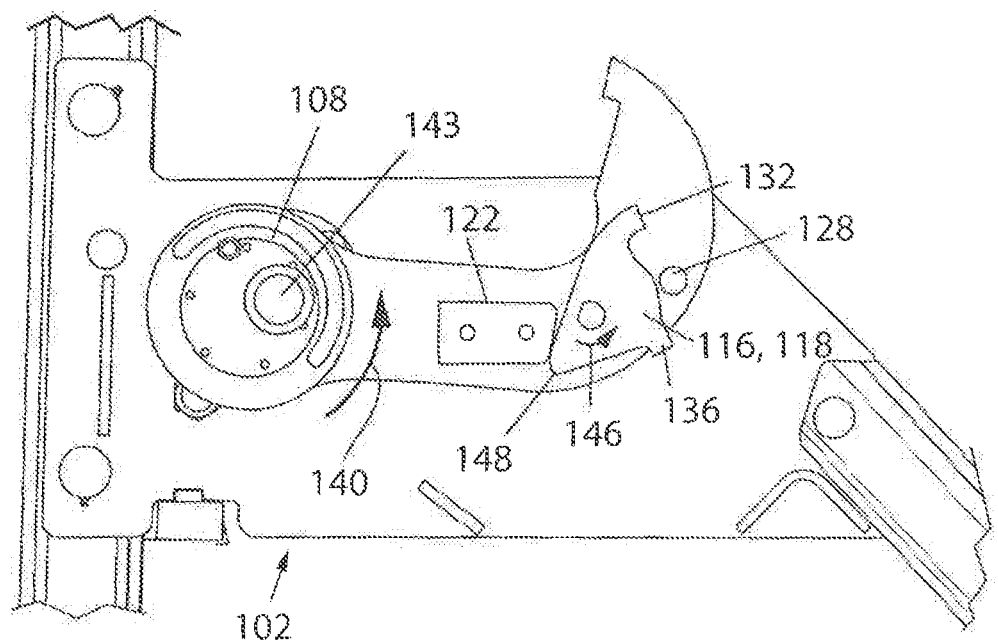
Figure 22:
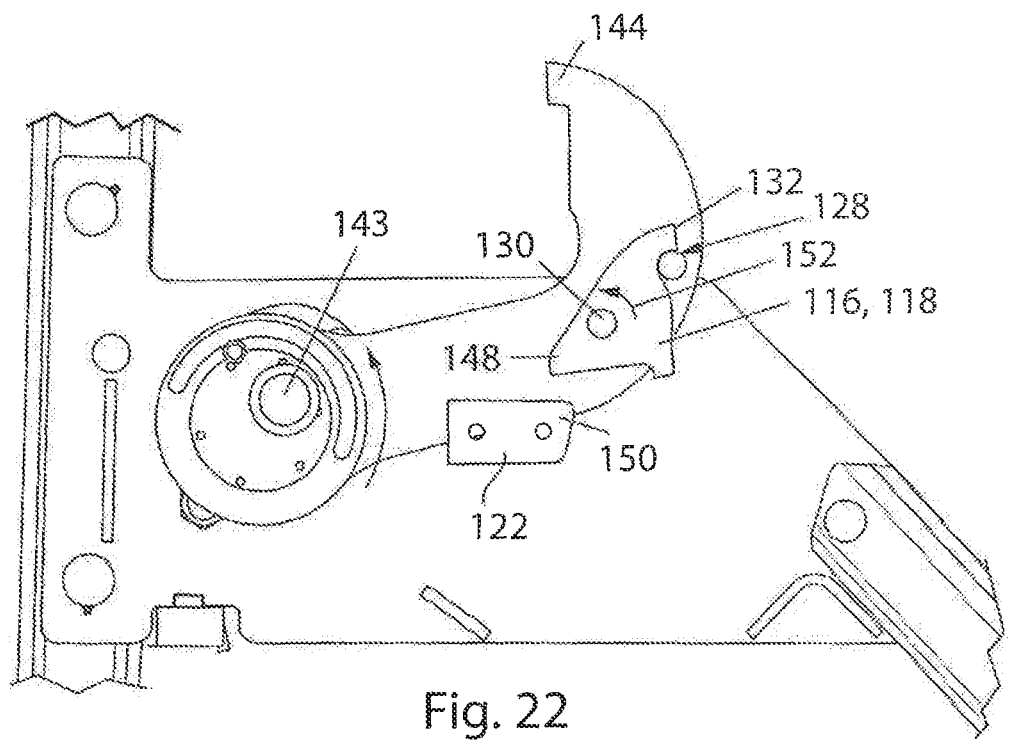

Referring to FIG. 19, when the user wishes to restrain an underride guard 92 associated with upper surface 112 of carriage assembly 102, counterclockwise rotation, indicated by arrow 140, associated with the eccentric insert or pivot 108 initiates upward and rearward translation, indicated by arrow 142, of hook 120 relative to carriage assembly 102. Referring to FIGS. 20-24, as hook 120 progresses towards an extended position in response to rotation of drive shaft 143, a distal end 144 of hook 120 progresses above upper surface 112 of carriage assembly 102 as eccentric pivot 108 continues rotation in direction 140. During actuation of vehicle restraint system 100 toward an engaged orientation, latches 116, 118 impinge upon a surface of stops 122 but are allowed to rotate about pivot 130 in direction 146 such that projection 132 translates away from catch 128 until a rear portion 148 of respective latches 116, 118 clears the respective stops 122, as shown in FIG. 22. It is appreciated that the operation of drive shaft 143 can be provided in various operational modalities such as by electrical means (i.e. a motor or the like), hydraulic means (i.e. a hydraulic pump, motor, or the like), a pressurized flow means (i.e. an air pump, motor or the like), or combinations of one or more such operational modalities to achieve the desired bidirectional rotational operation of drive shaft 143.

Figure 23:
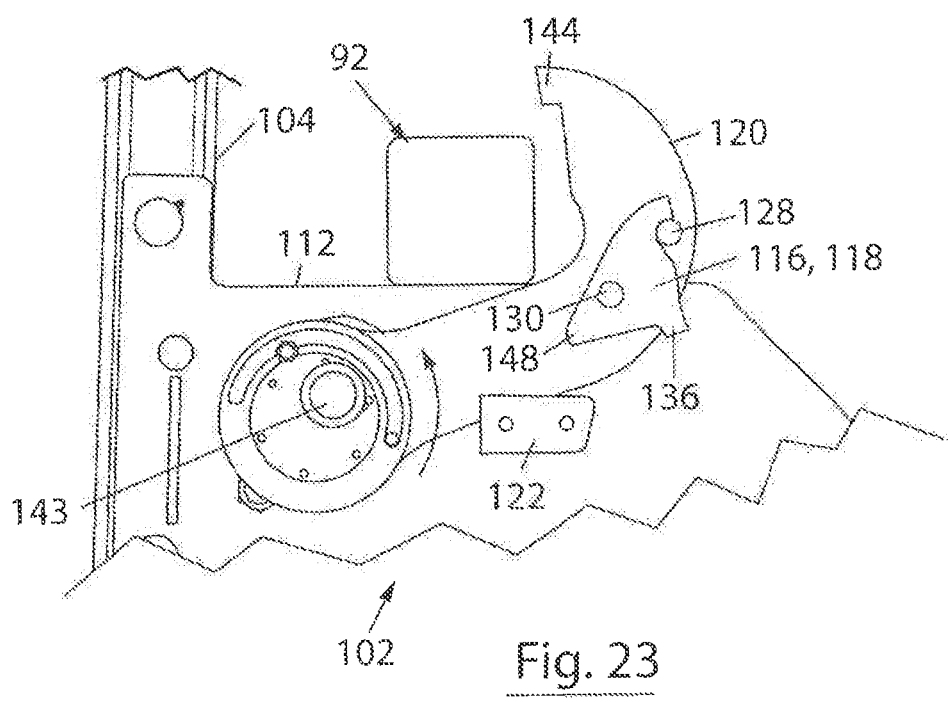
Figure 24:
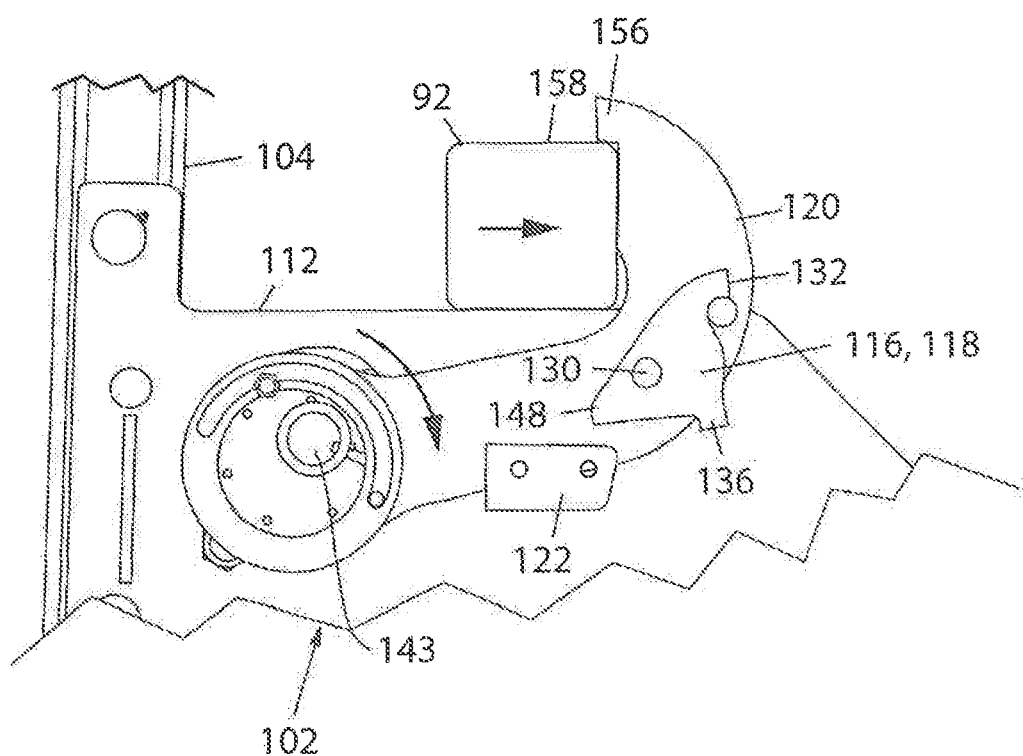

Once rear portion 148 of respective latches 116, 118 clear an upper forward portion 150 of respective stops 122, latches 116, 118 rotate in an opposite direction relative to the direction associated with the latches bypassing of stops 122, as indicated by arrow 152, about respective pivots 130 such that projections 132 come to rest upon catches 128. Referring to FIGS. 23 and 24, underride guard 92 can be effectively retained between hook 120 and rail 104 along upper surface 112 of carriage assembly 102 when hook 120 is extended even though latch 116, 118 may be offset from stop 122. Preferably, when hook 120 is engaged, eccentric pivot 108 achieves and maintains an over-center orientation of the cam shaft associated with the insert and cover associated with eccentric pivot 108 to resist translation of the hook relative to the carriage due to loading of the hook by the underride guard. Preferably, the eccentric pivot assembly maintains an orientation wherein the cam shaft is approximately 30 degrees past center to resist translation of the hook due to loading associated with the underride guard. For those configurations wherein a tooth 156 associated with hook 120 can engage a top or upper surface 158 associated with underride guard 92, the cooperation of tooth 156 with underride guard 92 prevents undesirable or unexpected disengagement of hook 192 from underride guard 92.

Figure 25:
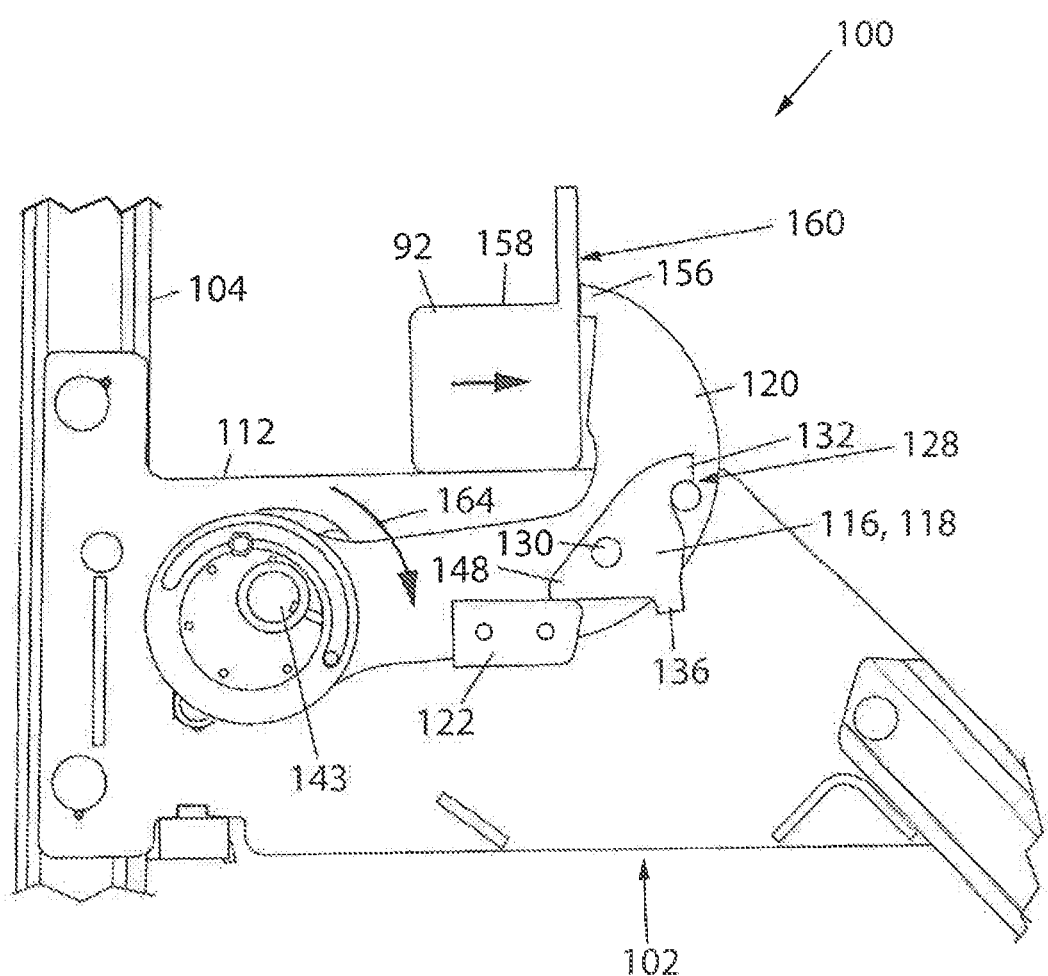
Figure 26:
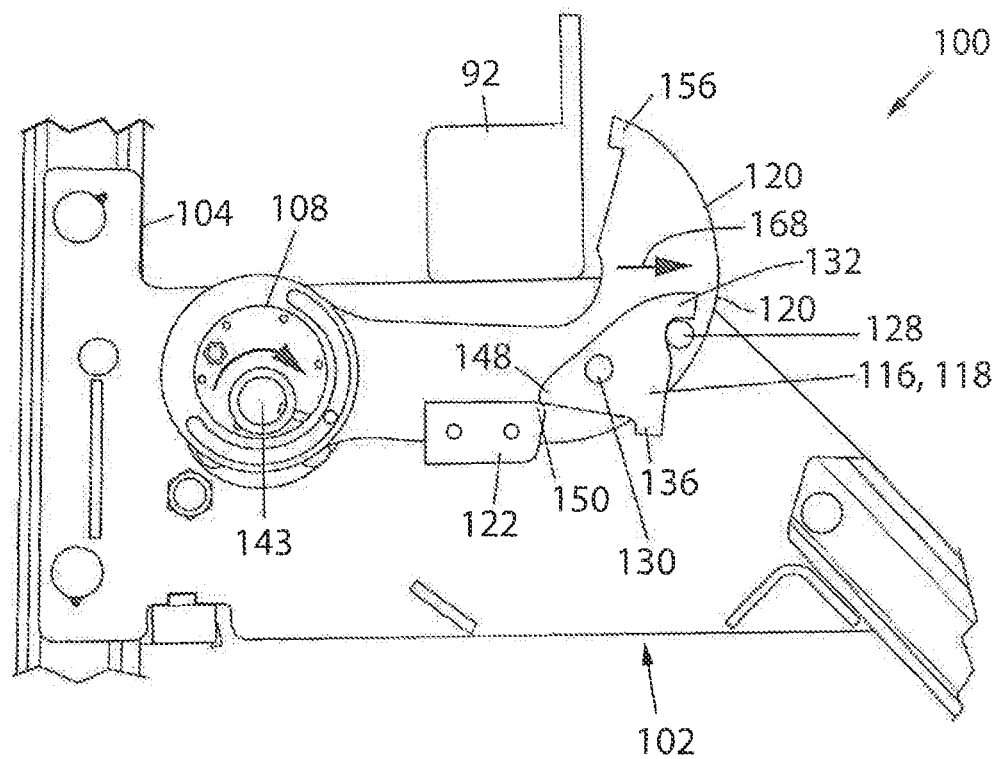
FIG. 26 is a view similar to FIGS. 18-25 and shows the restraint translated away from the engaged position relative to the carriage and translation of a latch and a catch relative to one another to facilitate disengagement of the vehicle underride guard from the vehicle restraint system.

Referring to FIG. 25, in some situations, such as if a plate, brace, or gusset 160 interferes with a secure cooperation of tooth 156 of hook 120 with upper surface 158 of underride guard 92, rear portions 148 of latches 116, 118 impinge upon stops 122 as projections 132 impinge upon catches 128. It should be appreciated from the orientation of latches 116, 118 shown in FIG. 25 and when hook 32 and insert 60 are oriented relative to one another at the over-center orientation as disclosed above, that the cooperation of latches 116, 118 with stops 122 and catches 128 prevents downward rotation, indicated by arrow 164, of hook 120 relative to carriage assembly 102 thereby restraining underride guard 92 between hook 120 and rail 104 along upper surface 112 of carriage assembly 102. When it is desired to allow disengagement of underride guard 92 from vehicle restraint system 100, eccentric pivot assembly 108 operates to facilitate initial generally lateral translation, indicated by arrow 168, of hook 120 relative to carriage assembly 102 as described above. During disengagement operation of the eccentric pivot assembly 108, latches 116, 118 translate in a generally forward direction relative to stops 122 such that rear portion 148 of latches 116, 118 can pass beyond the upward forward portion 150 of respective stops 122. Such translation of hook 120 allows latches 116, 118 to bypass stops 122 such that hook 120 can be translated in a generally forward and downward direction, indicated by arrow 170, during continued operation or rotation of the eccentric pivot 108 associated with hook 120. The continued forward and downward translation of hook 120 relative to carriage assembly 102 allows underride guard 92 to be removed from the vehicle restraint system 100 as hook 120 achieves a fully retracted orientation relative to carriage assembly 102.

Figures 27, 28:
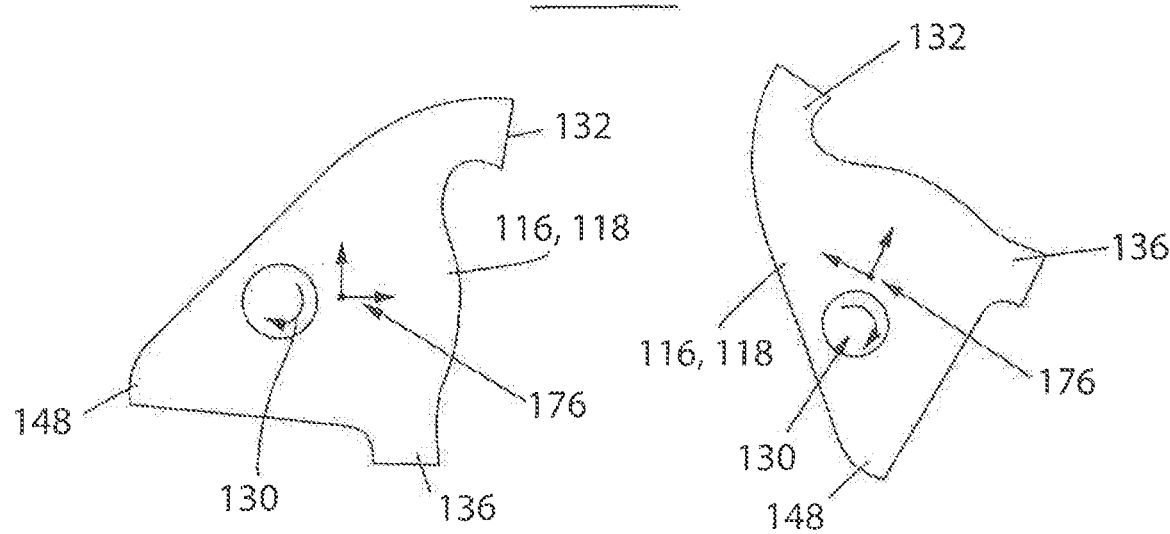
FIGS. 27-28 are elevational views of the latch shown in FIGS. 18-26 and show the gravitational translation of the latch.

As alluded to above and referring to FIGS. 27-28, latches 116, 118 are constructed such that a center of gravity 176 associated with each latch 116, 118 is disposed between the axis associated with pivot 130 and projection 132. Preferably, the center of gravity of latches 116, 118 is maintained at locations forward of the axis associated with pivot 130 throughout the range of motion of hook 120 relative to carriage assembly 102. That is, whether latch 116, 118 is oriented to be engaged with a respective catch 128 or in an orientation wherein the respective latch 116, 118 is bypassing the respective stop 122 during raising of the cantilevered distal end of hook 120 as shown in FIG. 28, center of gravity 176 is maintained generally forward or at an offset or over-center orientation relative to the axis associated with pivot 130 such that latches 116, 118 are gravitationally biased to rotate in a generally clockwise direction relative to the orientation shown in FIGS. 27-28. Such a consideration ensures that latches 116, 118 are oriented for the desired cooperation with stops 122 and catches 128 throughout the range of motion of hook assembly 120 relative to carriage 102 and associated with operation of eccentric pivot 108 and for each engagement/disengagement associated with the cyclic operation of the vehicle restraint system 100. It is further appreciated that a biasing device, such as a spring or the like, could also be provided to maintain latches 116, 118 in the desired position and/or orientation to achieve the selective interference with stops 122 in the manner described above.

It is appreciated that the construction and orientation of latches 116, 118, stops 122, and catches 128 could be provided in other configurations. For example, it is envisioned that stops 122 could be secured to hook 120 rather than carriage assembly 102 and configured to bypass a latch secured to the carriage assembly 102. Although two latch, stop, and catch associations are shown, it is also further appreciated that fewer such associations can be provided. Although shown as generally being enclosed by carriage assembly 102, it is further appreciated that one or more of the structures associated with the operation of hook, latch, catch, and/or stop could be external thereto. Such modifications are considered encompassed by the appending claims.

Figure 30:
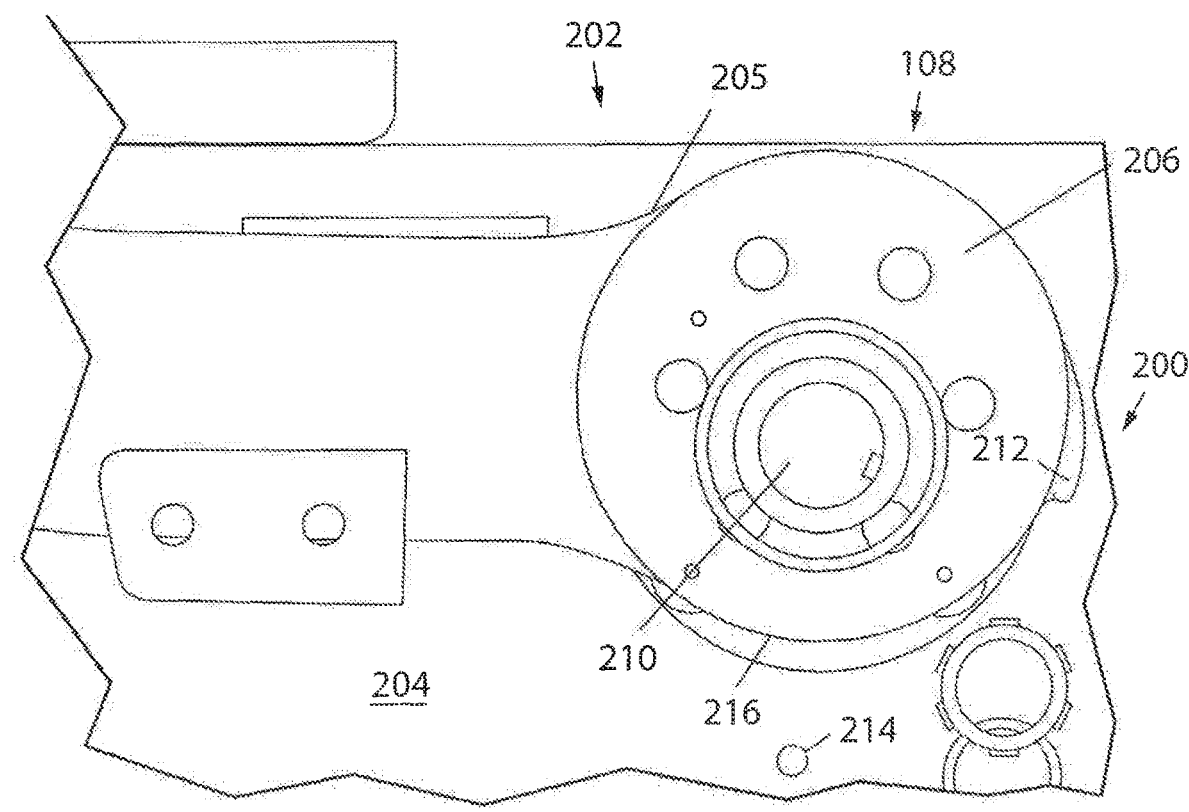
FIGS. 30 and 31 are an elevation and perspective view, respectively, of a portion of a restraint and a carriage according to another embodiment and constructed to prevent over rotation of the restraint relative to the carriage.
Figure 31:
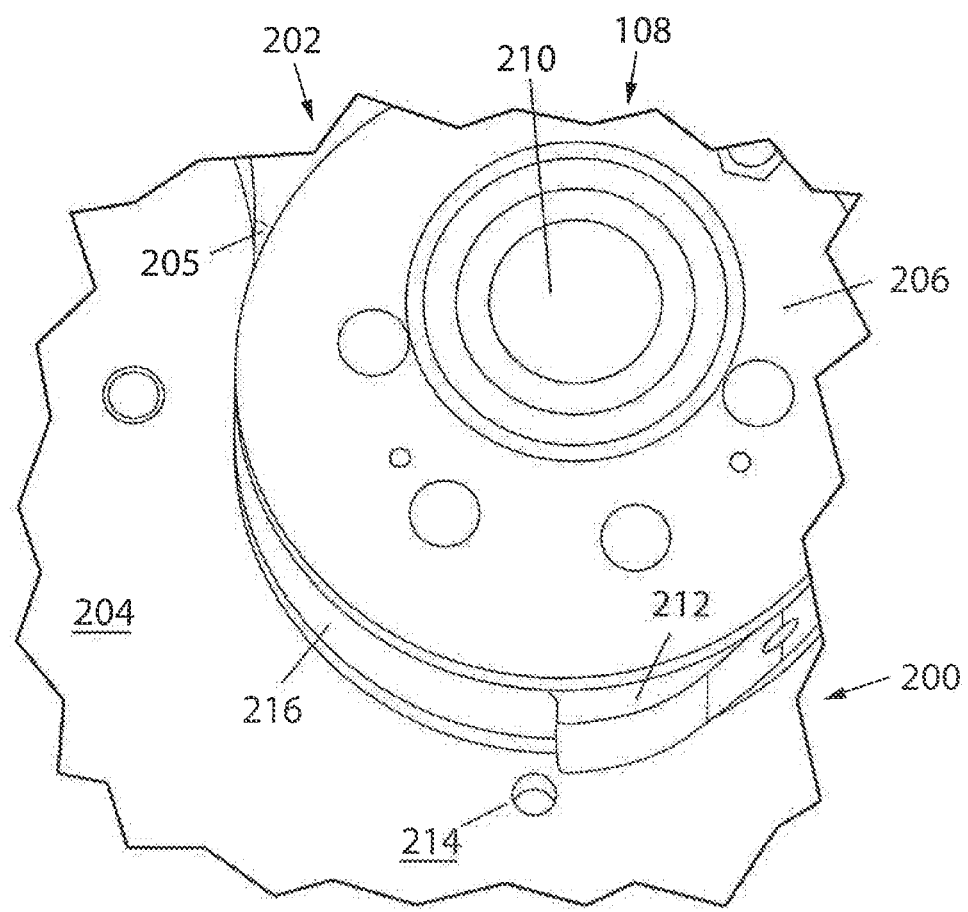

FIGS. 30 and 31 show views of an optional stop assembly 200 that can be included in either of hook assembly 30 and/or hook assembly 106 of restraint system 100 and is constructed to prevent rotation of an eccentrically mounted restraint, hook, or hook assembly 202 relative to a carriage 204 beyond a desired threshold. Like hook assemblies 30, 106, hook assembly 202 includes a base portion 205 that is configured to cooperate with an insert 206 to effectuate eccentric motion of hook assembly 202 relative to a carriage 204 in response to rotation of a drive shaft 210 as disclosed above. Unlike hook assemblies 30, 106, hook assembly 202 includes a stop or lobe 212 that extends in a generally outward radial direction from base portion 205 of hook assembly 202. Lobe 212 is circumferentially oriented relative to base portion 205 of hook assembly 202 to selectively impinge upon a projection or a post (not shown) that traverses the cavity defined by carriage 204. The position of the post is represented in FIGS. 30 and 31 as a hole or opening 214 formed in respective side panels associated with carriage 204. Preferably, each side panel associated with carriage 204 includes an opening 214 that is aligned with a corresponding opening formed in the opposite side panel such that that a bolt or a pin can be associated with each of the respective openings 214. It should be appreciated from the orientation shown in FIGS. 30 and 31 that the post would extend in a direction generally normal to the view shown in FIGS. 30 and 31.

Upon rotation of hook assembly 202 toward a fully extended position relative to carriage 204, lobe 212 associated with hook assembly 202 impinges upon the post thereby preventing further rotation of the hook assembly 202 relative to carriage 204. From a comparison of FIGS. 30 and 31, it should be appreciated that the eccentric operation associated with eccentric pivot 108 associated with the cooperation of hook assembly 202 and carriage 204 results an outer radial surface 216 of hook assembly 202 appearing closer to the post or opening 214 as hook assembly 202 rotates relative to carriage 204. That is, as shown in FIG. 30, opening 214 is further from surface 216 of hook assembly 202 and in response to the eccentric motion of hook assembly 202 relative to carriage 204 during clockwise rotation of drive shaft 210, with respect to the orientation shown in FIGS. 30 and 31, surface 216 gradually approaches opening 214 as lobe 212 nears interference with the post associated with opening 214. Such a construction provides a robust impediment for preventing rotation of hook assembly 202 relative to carriage 204 beyond a desired rotational position associated with engagement of hook assembly 202 with a respective vehicle structure. Lobe 212 and the post associated with opening 214 improve the service life associated with the cyclic operation of a vehicle restraining system having such a construction.

As alluded to above, it is appreciated that operation of drive shaft 143 can be effectuated according to a number of methodologies including for example electric drive systems such as motors or the like, electro-mechanical drive system, hydraulic systems, hydro-electric, and/or hydro-mechanical drive arrangements. It is further appreciated that the drive system associated with operation drive shaft 143 can be oriented in various alignments relative thereto. For instance, as described above, when provided as a motor drive arrangement, the axis of operation associated with the rotatable element of such a motor can be generally aligned with the longitudinal axis of the motor or oriented at a crossing orientation relative thereto.

Figure 32:
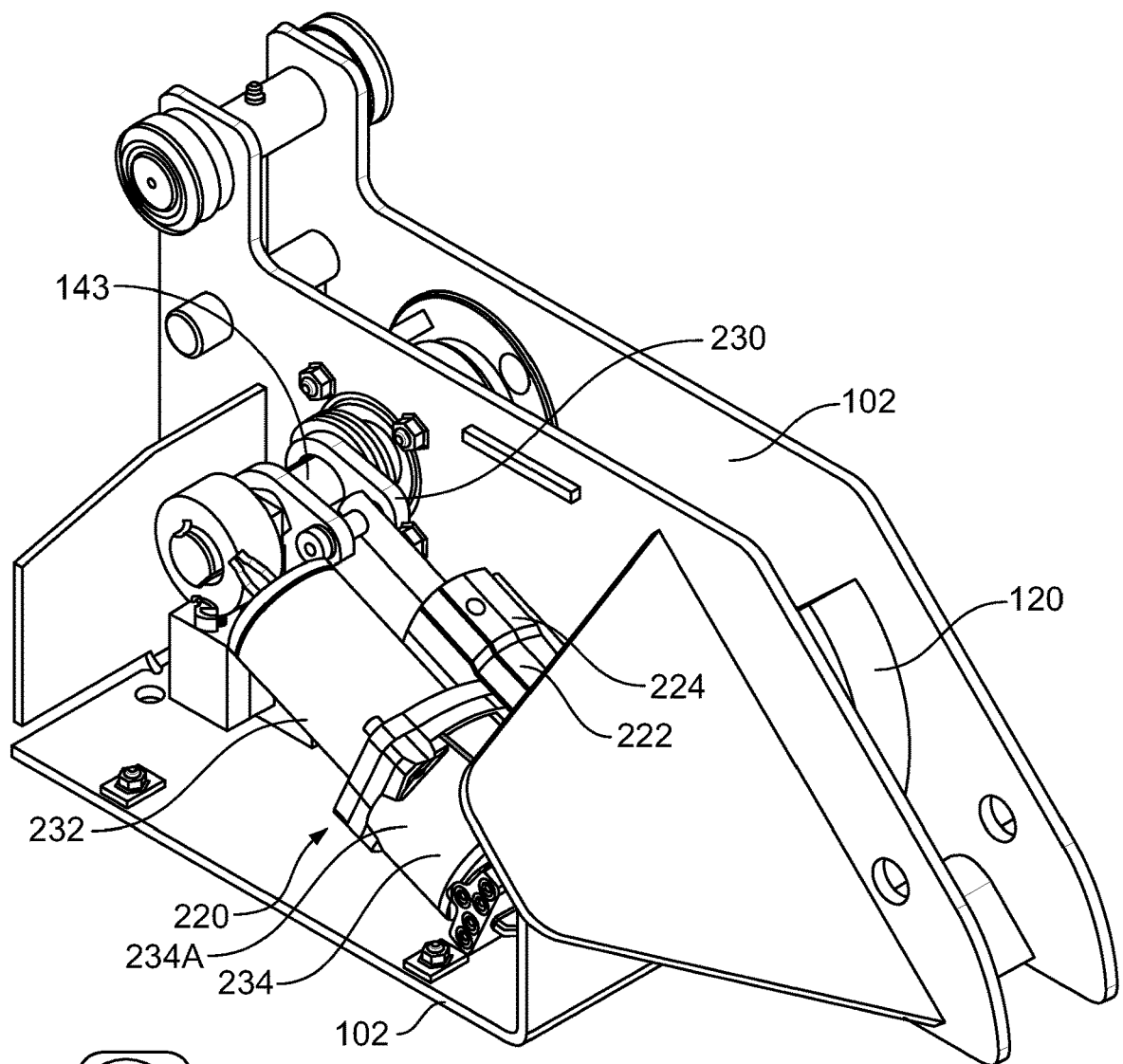
FIG. 32 is a perspective view of a vehicle restraint system having a non-axial drive arrangement in accordance with another embodiment.
Figure 33:
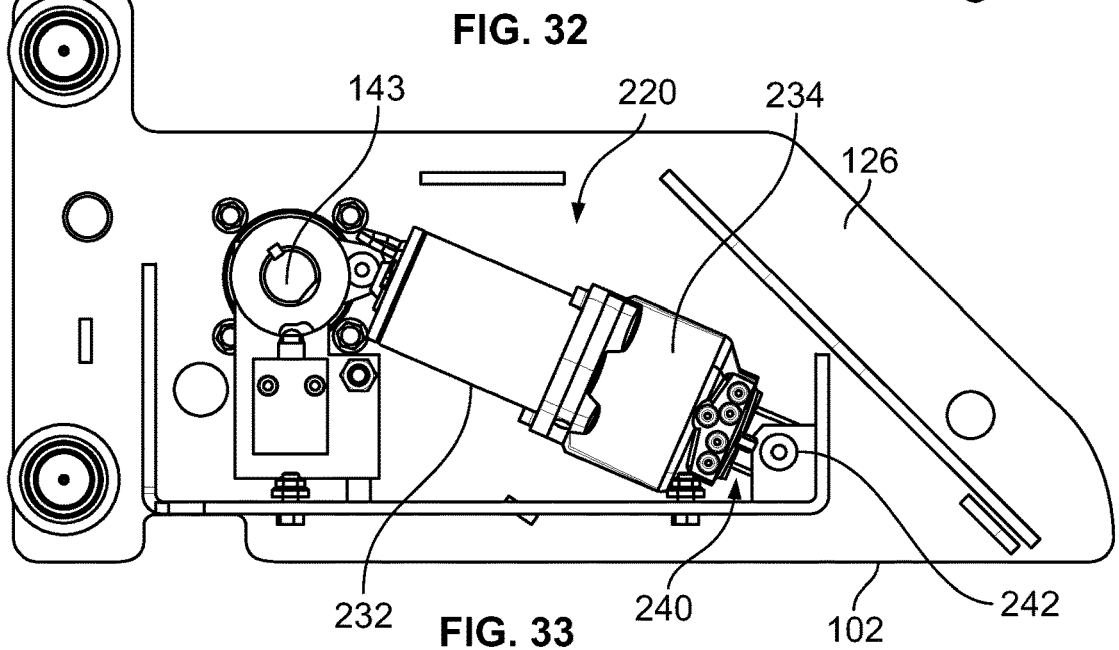
FIG. 33 is a side elevation view of vehicle restraint system shown in FIG. 32.

FIGS. 32 and 33 show a drive arrangement 220 configured to generate the desired operation of drive shaft 143 to effectuate the desired translation of hook 120 relative to carriage 102 according to another embodiment. As shown in FIGS. 32 and 33, rather than an axially aligned drive arrangement as disclosed above, drive arrangement 220 includes a linear actuator 222 that is generally defined by a housing 224 and includes a telescopic member 226 that is movably associated therewith. Telescopic member 226 includes a distal end 228 that is constructed to be connected to a crank arm 230 that is operationally connected to drive shaft 143. Extension or retraction of telescopic member 226 relative to housing 224 effectuates the desired rotation of drive shaft 143 and thereby the translation of hook 120 relative to carriage 102 as described above. It should be appreciated that the axis of operation of linear actuator 222 is oriented at a crossing and preferably transverse orientation relative to the axis of rotation associated with drive shaft 143. Such a consideration provides restraint system a compact foot print relative to the lateral axis defined by the axis of rotation of drive shaft 143.

Drive arrangement 220 includes a motor 232 of a fluid pump 234 and whose operation is configured to manipulate the position of telescopic member 226 relative to housing 224 of linear actuator 222. Motor 232 is operationally connected to a control system as described further below to effectuate the desired operation of the motor 232 and the desired operation of linear actuator 222. In a preferred embodiment, motor 232 is provided as a 12 volt direct current motor although other configurations are envisioned such as motors operable at other direct current or alternating current voltages. The pump 234 contains a reservoir 234A for hydraulic fluid. The motor 232 is operated to cause the telescopic member 226 to extend or retract and is coordinated with other components of the fluid pump 234 such as check valve(s) to control the movement of hydraulic fluid. The pump 234 is a self-contained electro-hydraulic actuator. The drive arrangement 220 thereby does not require one or more hydraulic lines running from the carriage to a reservoir installed away from the vehicle restraint assembly. In one embodiment, the pump 234 is a compact electro-hydraulic actuator (EHA) offered for sale by Parker Hannifin Corporation of New Hope, Minn.

Regardless of the methodology associated with operation of drive arrangement 220, a lower end 240 of drive arrangement 220 is connected to carriage 102 via a pin 242 such that drive arrangement 220 can rotate relative to carriage 102 in response to operation of linear actuator 222 and the orientation of crank arm 230 relative to the axis associated with drive shaft 143. In a preferred embodiment, the fluid circuit associated with operation of pump 234 and linear actuator 222 includes one or more check valves that are oriented and configured to prevent fluid exchange between linear actuator 222 and pump 234, and/or the opposite operational sides associated with a piston associated with linear actuator 222 during non-operation of pump 234 and/or motor 232. Such a consideration ensures that the orientation of distal end 228 of telescopic member 226 of linear actuator 222 maintains a desired position relative to housing 224, and thereby the orientation of hook 120 relative to carriage 102, until movement of hook 120 relative to carriage 102 is desired or otherwise instructed via user interaction with a control arrangement or system associated therewith as disclosed further below. Alternatively, it is further appreciated that an "open" or "closed" condition associated with a respective fluid check valve could be manipulated in response to signals provided by a control arrangement to effectuate a desired translation of hook 120 or system depressurization to effectuate some translations of hook 120 relative to carriage 102 during certain circumstances.

Figure 33A:
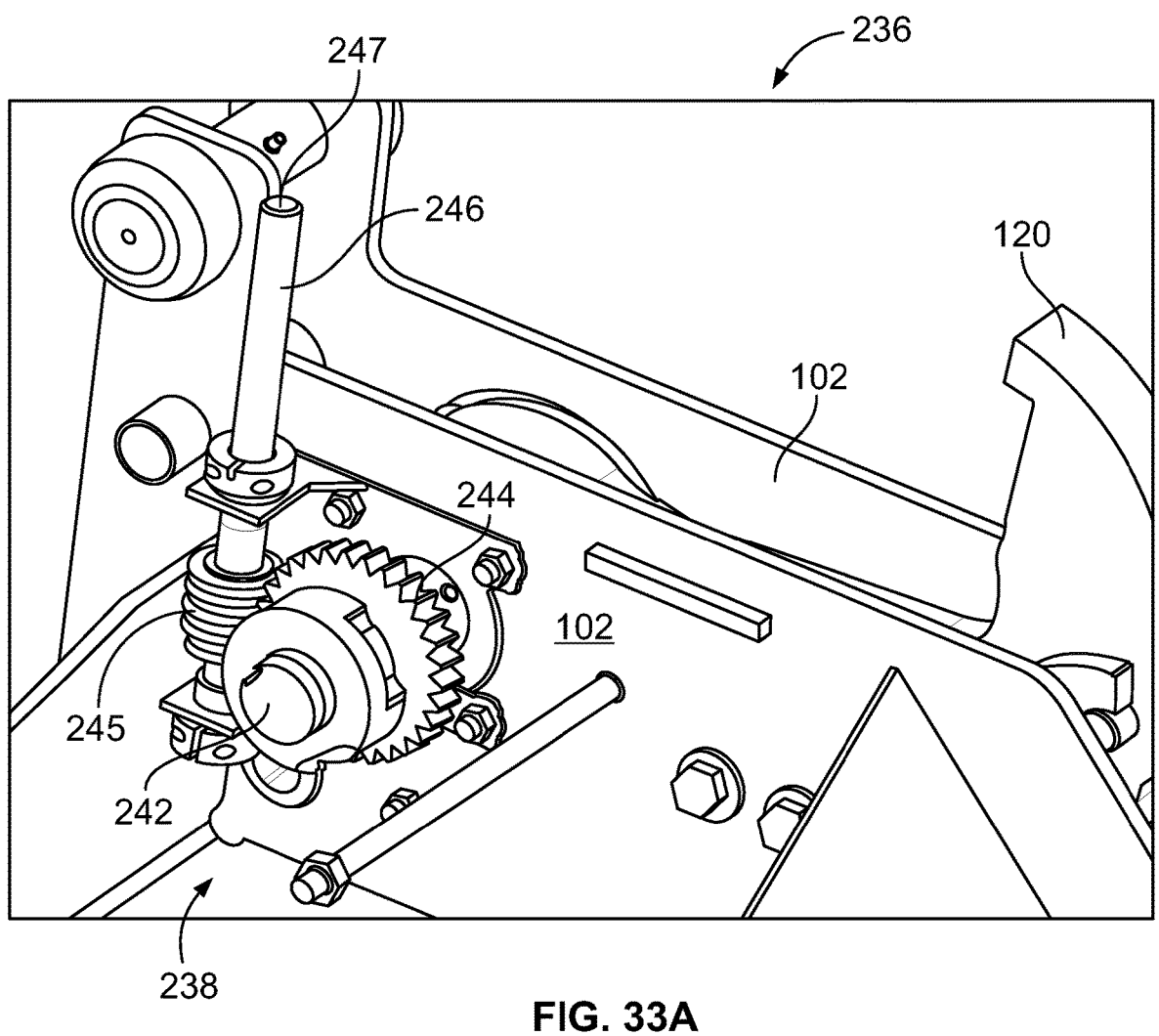
FIG. 33A is a view similar to FIG. 32 of a portion of a vehicle restraint system having a non-axial manually operable drive arrangement according to another embodiment.

FIG. 33A is a perspective view of restraint system 236 having a drive arrangement 238 according to another embodiment. Drive arrangement 238 includes a gear or wheel 244 that is secured to drive shaft 143 such that rotation of wheel 244 effectuates rotation of hook 120 relative to carriage 102. A worm gear 245 is secured to a shaft 246 that extends in a crossing direction relative to drive shaft 143. Rotation of shaft 246 rotates worm gear 245 which in turn rotates wheel 244 effectuating rotation of drive shaft 143 and rotation of hook 120 relative to carriage 102. It is appreciated that the geared interaction associated with the worm gear drive arrangement 238 as shown in FIG. 33A is merely exemplary of one such geared drive arrangement. It is appreciated that other drive arrangements, such as other geared drive arrangements or arrangements including other mechanical rotational linkages such as pulleys or the like are envisioned and within the scope of the present disclosure.

Although shown as extending in a generally vertical direction, it is further appreciated that shaft 246 can be oriented in any crossing orientation relative to the axis associated with drive shaft 143. A distal end 247 of shaft 246 is constructed to slideably cooperate with the drive mechanism to effectuate rotation of shaft 246 relative to carriage 102. Shaft 246 can be constructed to cooperate with the power drive source or a manual drive source such as a crank handle or the like to effectuate manual translation of hook 120 relative to carriage 102.

Although shaft 246 is shown as having a generally circular cross-sectional shape with a corresponding keyway, it is further appreciated that distal end 247 could be constructed to cooperate with powered or manual drive arrangements, such as drills, impact drivers, or ¼, ⅜, or ½ inch ratchet drive hand tools or the like to effectuate the desired rotation thereof. It is further appreciated that distal end 247 of shaft 246 and/or a crank associated therewith can be constructed to include or cooperate with a swivel or universal joint to accommodate offsetting rotational operation of the manual or hand power tool associated therewith relative to the longitudinal axis of shaft 246. Such considerations improve the convenience with which users can interact with shaft 246 when a vehicle is engaged with restraint system 236 to effectuate manual engagement or disengagement of hook 120 from the vehicle associated therewith.

Figure 34:
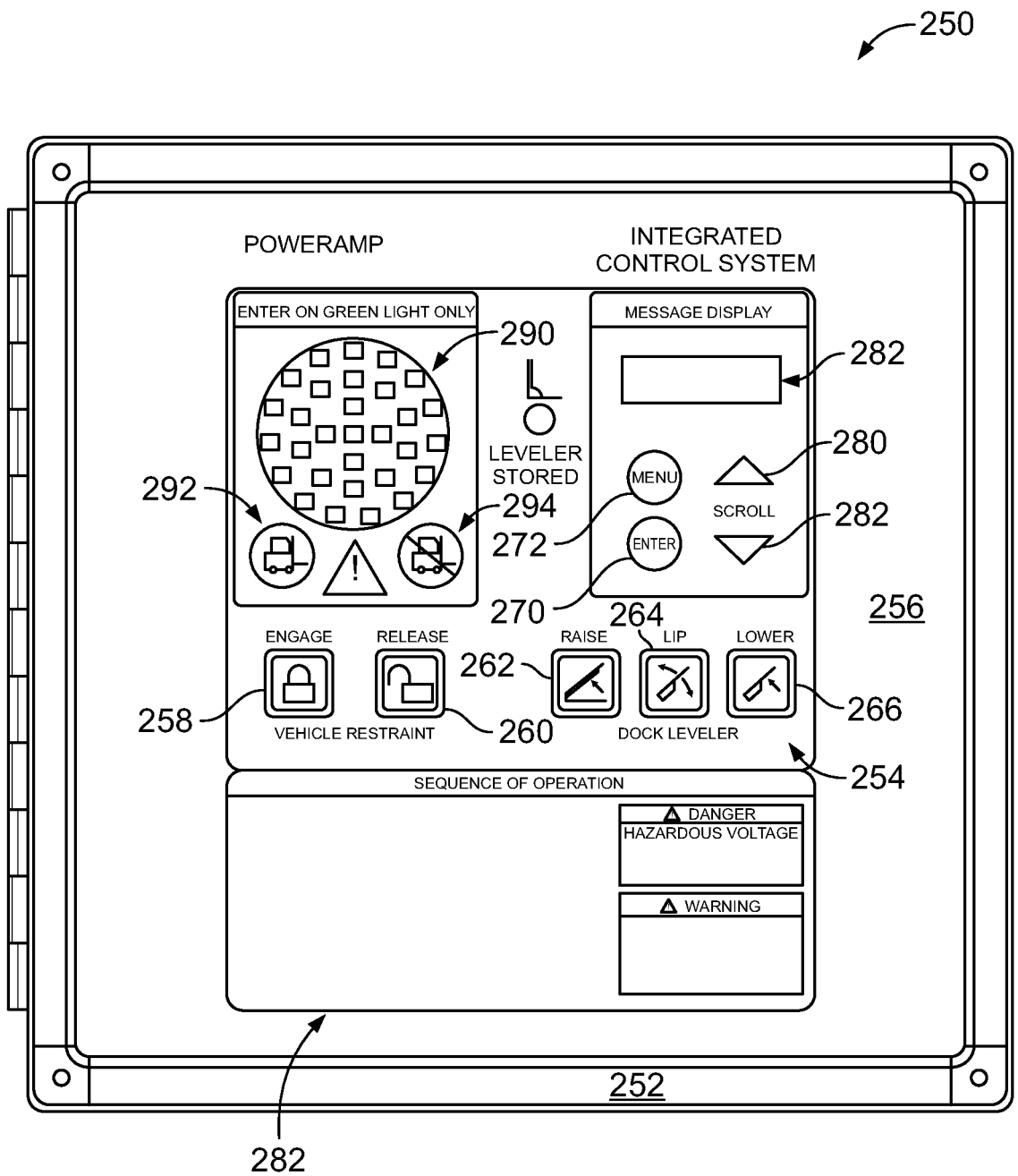
FIG. 34 is a perspective view of a control system associated with operation of the vehicle restraint systems shown in the preceding figures.
Figure 35:
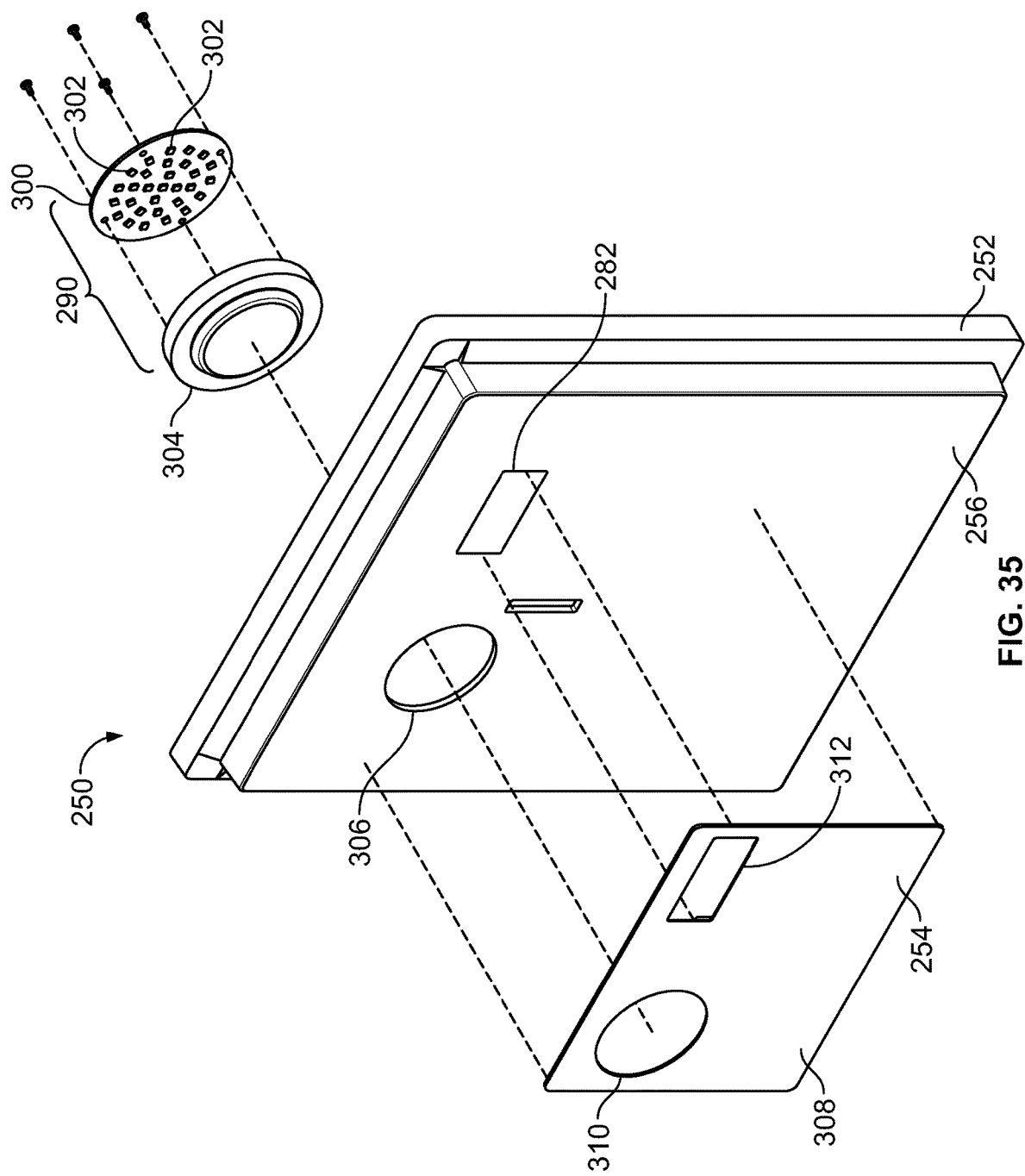
FIG. 35 is an exploded perspective view of the control system shown in FIG. 34.

FIGS. 34-38 show various views and schematic illustrations of a control system 250 associated with effectuating the desired operation of the vehicle restraint systems disclosed above. It is further appreciated that, in addition to the vehicle restraint systems disclosed herein, control system 250 can be configured to control other systems and/or devices associated with vehicle loading operations such as ancillary lighting systems, overhead door systems, barrier systems, etc. Referring to FIGS. 34 and 35, control system 250 includes an enclosure 252 that includes a control area 254 associated with a front surface 256 thereof. Front surface 256 further includes optional indicia 282 such as signage, graphics, and/or text associated with communicating operating instructions associated with interaction with control system 250 and the control of the various discrete systems associated therewith. Such information is particularly beneficial for new users or users otherwise unfamiliar with the control and operation of the systems controlled thereby.

With respect inputs 258, 260, 262, 264, 266, the text and/or graphics associated therewith can communicate to the user the intended operation of the restraint, dock plate, etc. relative thereto and associated with the discrete inputs associated therewith. For example, interaction with input 258 initiates an engage or secure instruction associated with operation of the vehicle restraint, such as hook 120, whereas interaction with release input 260 effectuates the disengagement instruction associated with the orientation of hook 120 relative to an underlying vehicle. When configured for operation with a movable dock leveler or plate system, control system 250 can include inputs 262, 264, 266 associated with operation of the dock leveler system. Input 264 manipulates operation of an extendable lip associated with the underlying dock plate whereas inputs 262, 266 effectuate the respective raising and/or lowering of the respective dock plate relative to the underlying vehicle and/or translation of the dock plate system to a stored position.

Control system 250 can include an optional display 282 associated with communicating information indicative of the condition of any of the systems associated therewith, such as the dock plate, the vehicle restraint, lighting systems, barriers, doors, and/or operating condition information associated with control system 252 to the user. Inputs 270, 272 280, 282 allow the user to toggle through respective menus and/or information and facilitate access to more discrete portions of the respective menus and the systems associated therewith. As disclosed further below, control system 250 further includes a single status indicia or indicator 290 that is configured to communicate multiple conditions associated with the orientation of restraint system 100 relative to a respective underlying vehicle as being secured or otherwise not satisfactorily secured. It should be appreciated that, as compared to known systems, the characteristics associated with the output associated with operation of indicator 290 are configured to denote or otherwise indicate to the user that the restraint is configured to accommodate loading of the vehicle 292 or an alternate characteristic 294 wherein the restraint system is less than suitably engaged with an underlying vehicle. When non-suitably engaged, the output characteristic associated with operation of indicator 290 denotes that the same should be resolved prior to effectuating loading and unloading operations associated with the respective vehicle.

Referring to FIG. 35, indicator 290 includes a printed circuit board (PCB) 300 and a plurality of light emitting elements or diodes (LED's) 302 that are dispersed thereabout. Each of LED's 302 is preferably configured to emit more than one characteristic output, such as more than one color of light, during energization thereof. It is further appreciated that the characteristic associated with operation of each of LED's 302 can also be configured to generate multiple intensities associated with operation of indicator 290. Alternatively, it is appreciated that the intensity associated with illumination of indicator 290 can be configured to generate multiple light output intensities, in multiple color spectrums, by energization of one, discrete groups of, or all of the discrete LED's 302 associated with indicator 290.

As disclosed further below, manipulating a characteristic associated with operation of indicator 290, such as a color output and/or intensity associated with the operation of LED's 302 of indicator 290, provides the desired information or indicia to a user and/or personnel proximate thereto, as to the status and/or condition associated with one or more of the operational conditions associated with one or more of an associated vehicle restraint, the dock leveler, etc. Preferably, each of LED's 302 is configured to generate a light color output in more than one of the red spectrum, a green spectrum, an amber spectrum, and/or a yellow spectrum. Understandably other color output and/or illumination intensities associated with operation of LED's 302 associated with operation of indicator 290 are envisioned.

Still referring to FIG. 35, a lens 304 generally overlies PCB 300 and the plurality of LED's 302 associated therewith. Lens 304 is received or otherwise aligned with a cavity 306 associated with surface 256 such that operation of the LED's 302 disposed therebehind are visible to users proximate the panel associated with control system 250. In a preferred embodiment, PCB 300 can be attached to lens 304 via a potting material, one or more fasteners, or other connection methodologies and lens 304 is supported or otherwise secured to surface 256 via an adhesive, mechanical connectors, etc. Understandably other suitable fastening means are envisioned. Plurality of inputs 258-280 are supported by a pushbutton membrane 308 which includes an opening 310 configured this generally overlie lens 304. Another opening 312 is formed in membrane 312 and generally overlies display 282.

It is appreciated that the output associated with the operation of indicator 290 could be provided in a manner wherein the operation of the. LED's 302 associated with indicator 290 are visible from locations internal and/or external to the structures generally surrounding the loading area. Alternatively, and referring to FIG. 36, at additional indicator or indicator arrangement 330 can be provided at a location that is conveniently capable of inspection by persons associated with the loading area and generally opposite the vicinity associated with indicator 290. Indicator arrangement 330 is configured and connected to control system 250 so as to mimic or replicate the output characteristic associated with indicator 290 thereby providing a status associated with operation of at least the vehicle restraint at locations internal and external to a respective facility and proximate the loading area.

Figure 36:
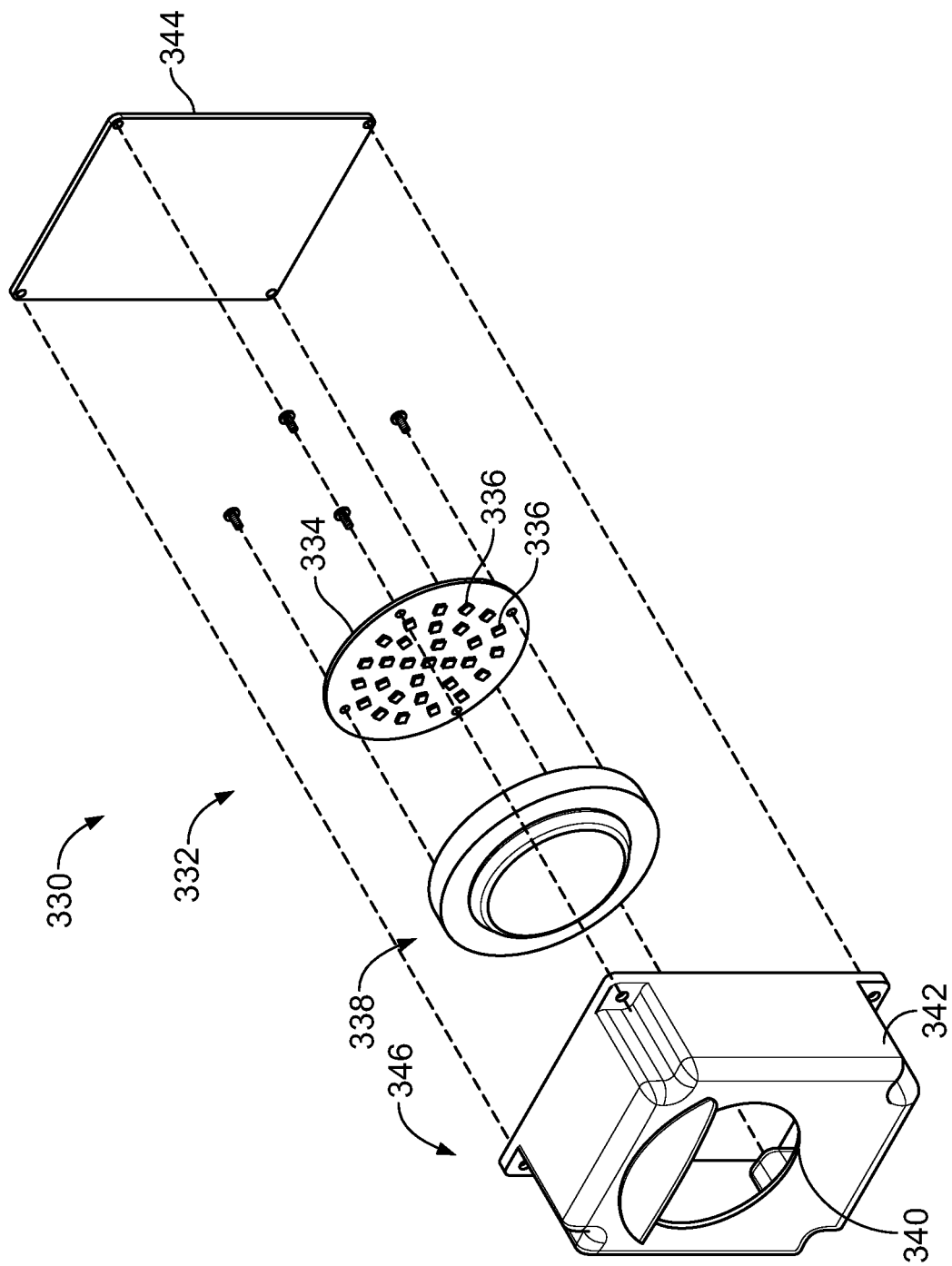
FIG. 36 is an exploded perspective view of an additional restraint status indicator system useable with the control system shown in FIG. 35.

As shown in FIG. 36, indicator arrangement 330 includes an illumination device 332 that includes a printed circuit board 334 having a plurality of illumination devices or light emitting diodes (LED's) 336 whose construction and operation is the same as LED's 302 as described above. PCB 334 is secured to a lens 338 and is constructed to be received in a cavity 340 associated with a housing 342. A base 344 cooperates with a rearward facing side 346 of housing 342 so as to define a generally weathertight and/or securable enclosure associated therewith. It is appreciated that the operational instructions and/or the characteristics associated with control system 250 and the indicator 290 thereof can be communicated to indicator arrangement 330 via wired and/or wireless connectivity methodologies.

Figure 37:
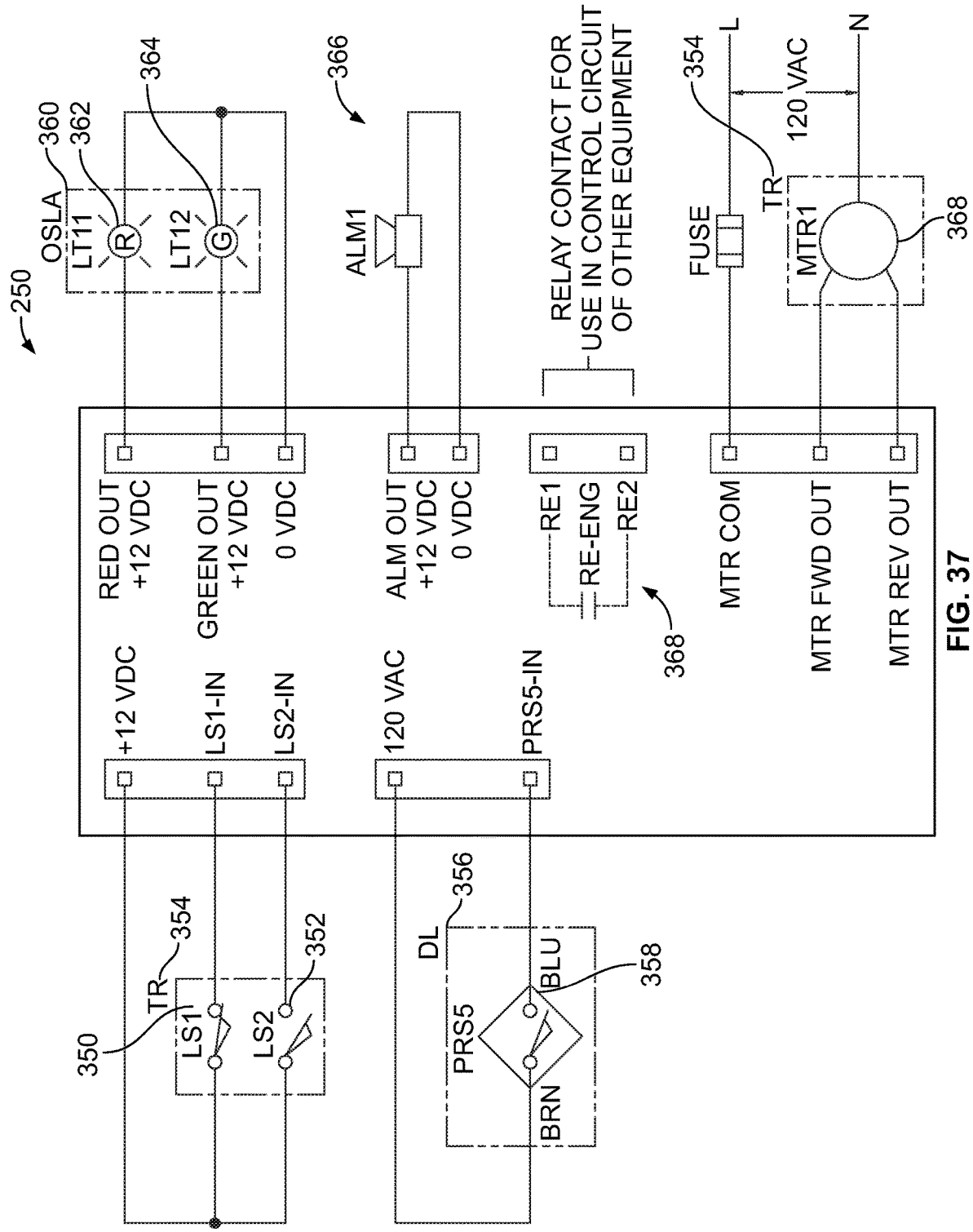
FIG. 37 is a schematic representation of a first embodiment of the control system shown in FIG. 34.
Figure 38A:
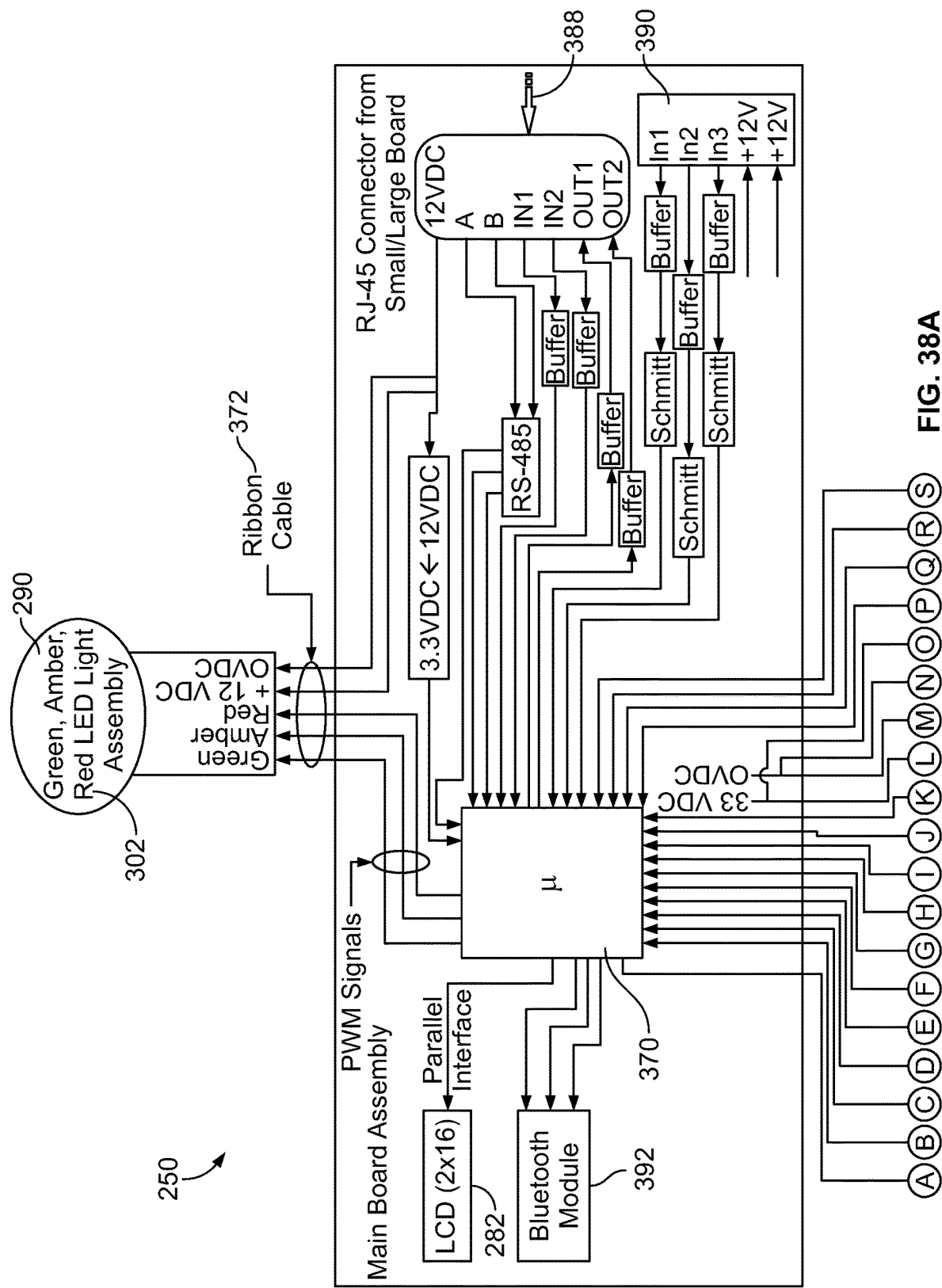
FIGS. 38A and 38B are portions of a schematic representation of the control system shown in FIG. 34 according to an alternate embodiment.
Figure 38B:
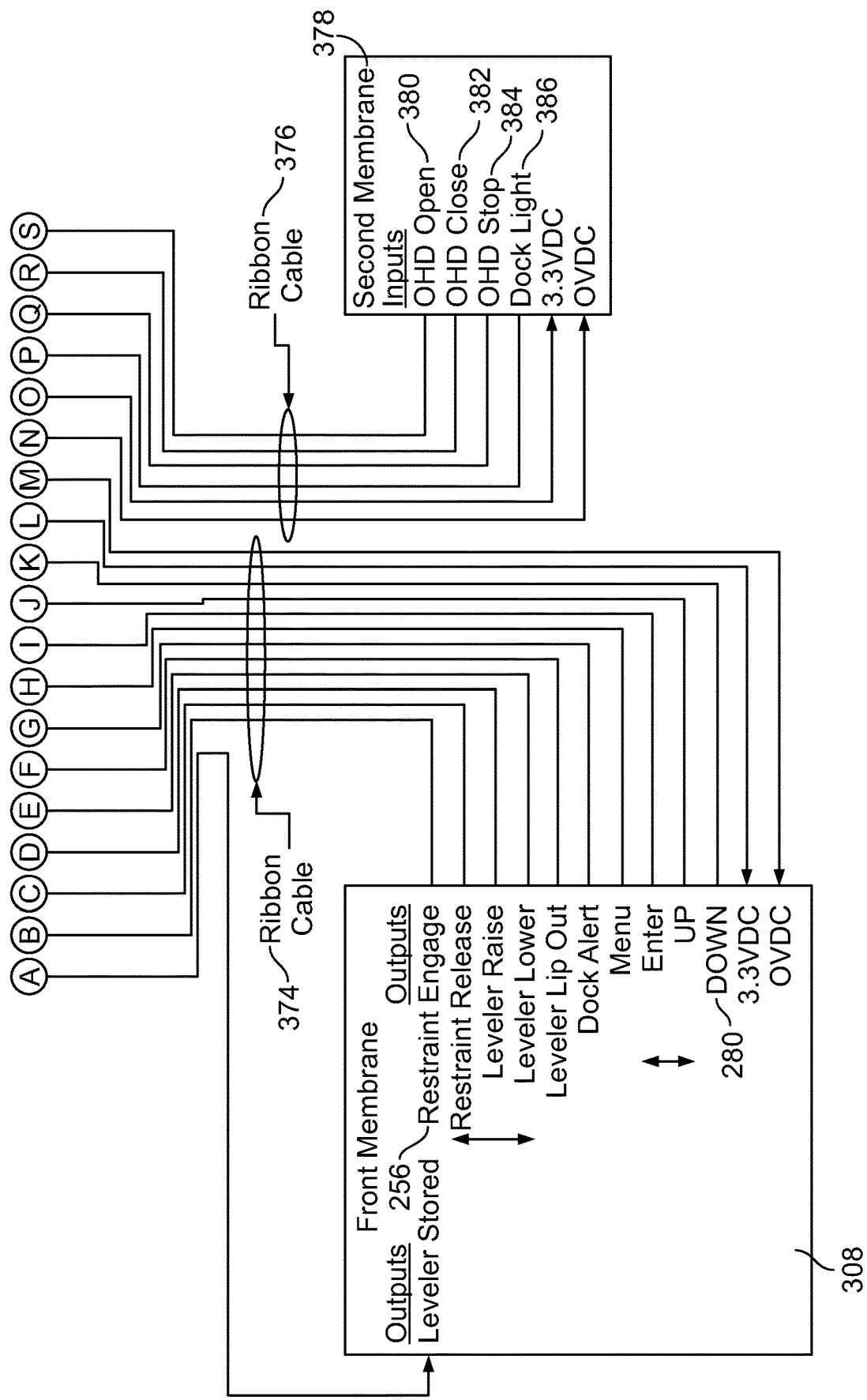

FIGS. 37 and 38 show exemplary schematic representations of control system 250 being associated with exemplary loading and vehicle restraint systems. Referring to FIG. 37, control system 250 is configured to receive a signal associated with operation of one or more limit switches 350, 352 associated with vehicle restraint 354. When configured for communication with the dock leveler 356, control system 250 is configured to assess the position of the dock plate via a proximity switch 358 or other such device. In the exemplary configuration shown in FIG. 37, the external facility restraint status indicator arrangement 360 includes a first output 362 associated with an unrestrained vehicle condition and a second output 364 indicative of a restraint vehicle indicator status. It should be appreciated that external restraint status indicator arrangement 360 can be conveniently replaced with indicator arrangement 330 as shown in FIG. 36 having a single indicia or indicator that provided multiple output characteristics and whose output characteristics are controlled by control system 250 so as to indicate the desired restraint or non-suitably restrained vehicle condition. System 250 further includes an optional alarm 366 that provides an audible indication as to the status associated with any of the desired orientation of the vehicle restraint, the dock leveler, or other associated assemblies. System 250 further includes an optional relay or other contact arrangement 368 associated with facilitating controlled operation of other ancillary systems such as dock lights, doors, barriers, etc. Control system 250 is further configured to communicate operational power to the drive arrangement 368 associated with the vehicle restraint 354 connected thereto.

Referring to FIG. 38, indicator 290 of control system 250 is connected to a processor 370 by a ribbon cable 372 or the like to effectuate the desired operation of the plurality of LED's 302 associated therewith to generate the discrete output characteristic indicative of a condition associated with the restraint being desirably engaged or non-desirably engaged or retracted relative to an underlying vehicle. Another ribbon cable 374 extends to membrane 308 and the various discrete inputs 258-280 associated therewith. An additional ribbon cable 376 extends between processor 370 and an additional membrane 378 associated with any ancillary or loading area associated equipment such as overhead door instructions 380, 382, 384 and/or dock area light controls 386. Control system 252 is preferably configured to receive one or more input signals 388, 390 associated with the operation of each of the discrete systems associated therewith. Processor 370 assesses the status associated with the operational systems and communicates the desired output characteristic signal to indicator 290 indicative of the status of the respective system components connected thereto. Control system 250 preferably includes an optional Bluetooth module 392 or other wireless communication methodology associated with facilitating wireless communication between processor 370, the ancillary or auxiliary systems connected thereto and/or other analytical and/or system operating status and/or update appliance systems.

Control system 250, and the variable output characteristic associated with operation of indicator 290 as disclosed above provides a compact, conveniently and economically manufacturable, and serviceable vehicle restraint and loading dock facility equipment control and condition status indicator system. Furthermore, system 250 and the indicator 290 associated therewith can be readily configured should the construction and/or operational methodology associated with the underlying systems of the vehicle restraint, dock leveler, barriers, lighting systems, etc. change or be reconfigured or implemented in alternate facilities during the operating life of restraint control system 250.

Turning to FIGS. 39-51, a portion of a vehicle restraint system 400 is shown that is similar in many respects to the vehicle restraint system 100 discussed above with respect to FIG. 15 such that differences between the systems will be highlighted. The vehicle restraint system 400 includes a restraint, such as a hook 402, movably connected to a carriage 404. The vehicle restraint system 400 includes an eccentric pivot, such as an eccentric mount 408, that is similar to the eccentric mounts discussed above. The eccentric mount 408 is driven by a drive shaft of the vehicle restraint system 400. The drive shaft is the same as drive shaft 143 discussed above with respect to FIG. 16. The drive shaft turns in a first direction through a range of motion to shift the hook 402 from a retracted position to an extended position. The eccentric mount 408 causes lateral movement of the hook 402 in a first portion of the drive shaft range of motion and the eccentric mount 408 causes rotational movement of the hook 402 in a second portion of the drive shaft range of motion. To shift the hook 402 from the extended position to the retracted position, the drive shaft turns in a second direction opposite the first direction. The eccentric mount 408 causes rotational movement of the hook 402 in a third portion of the drive shaft range of motion as the drive shaft turns in the second direction and the eccentric mount causes lateral movement of the hook 402 in a fourth portion of drive shaft the range of motion as the drive shaft turns in the second direction.

The vehicle restraint system 400 includes a hook portion securing system 410 that includes at least one stop 412 mounted to at least one of the side panels 414 of the carriage assembly 404. The hook portion securing system 410 further includes at least one latch 416 that engage at least one stop 412 and resists movement of the hook 402 from an extended position toward a retracted position when the hook 402 is urged downward by a vehicle underride guard attempting to pull away from the vehicle restraint system 400 before a user or an automated system lowers the hook 402. In one embodiment, the hook portion securing system 410 includes a pair of stops 412 and a pair of latches 416. The following discussion refers to the operation of one of the latches 416 and one of the stops 412 although the other latch 416 and the associated stop 412 operate in an identical manner.

The latches 416 are rotatably supported on the hook 402, such as via a pivot pin 418 of the hook 402 extending through an opening 420 of the latch 416. The hook 402 includes a catch 424 that may include a pin and extends laterally outward from the hook 402. In another embodiment, the catch 424 may include a plate. The latch 416 includes a front upper projection 430 and a front lower projection 432 that may contact the catch 424 during movement of the hook 402 to limit pivoting of the latch 416 to a predetermined range of motion. This keeps the latch 416 in position to contact the stop 412 and further keeps the latch 416 from flipping over and interfering with movement of the hook 402.

In FIG. 39, the hook 402 is shown in a stored or retracted position. Turning to FIG. 40, a vehicle has approached the vehicle restraint system 400 and an underride guard 440 of the vehicle is positioned above an upper surface 442 of the carriage assembly 404. The vehicle restraint system 400 has been activated by a user or an automated system, which causes a drive shaft of the eccentric mount to 408 to turn in direction 444. As the drive shaft turns in direction 444, the hook 402 initially shifts laterally in direction 446 without rotational movement of the hook 402.

Figure 41:
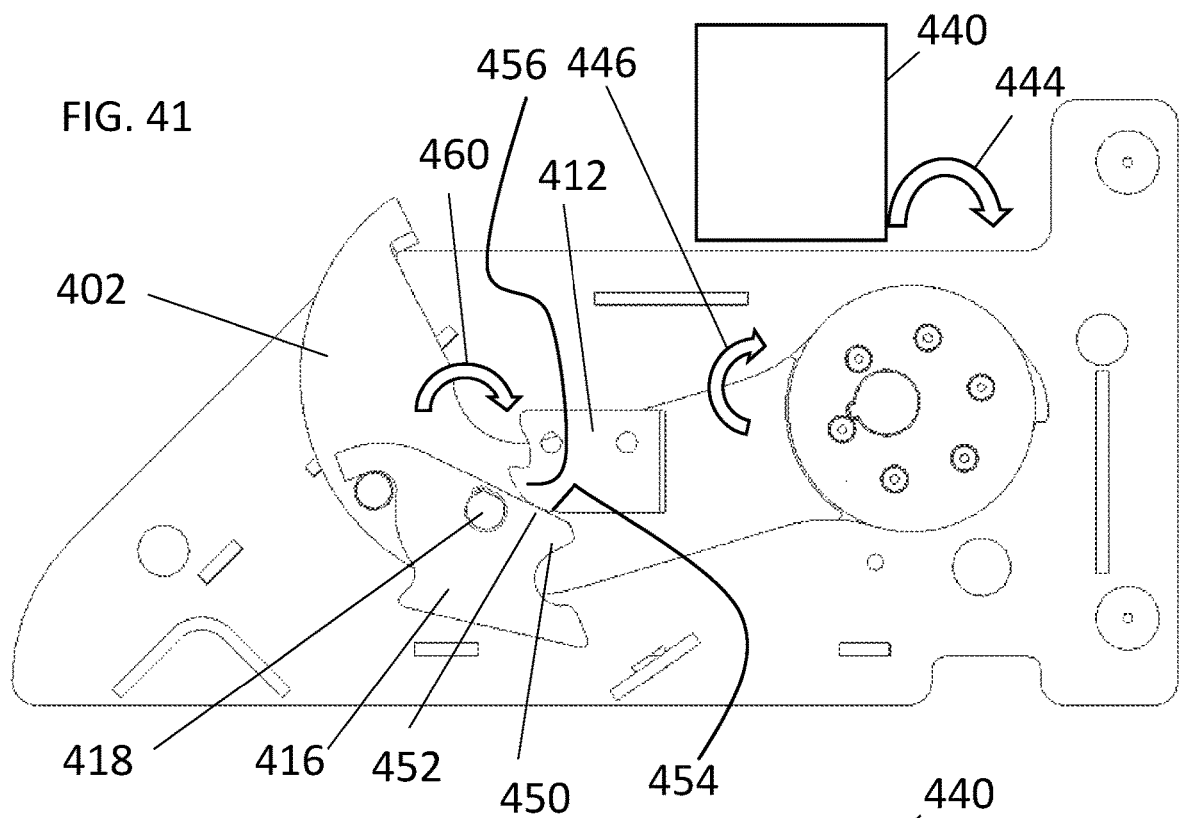
FIG. 41 is a view similar to FIG. 40 showing the hook rotating upward and a latch carried on the hook contacting a stop of the carriage.
Figure 42:
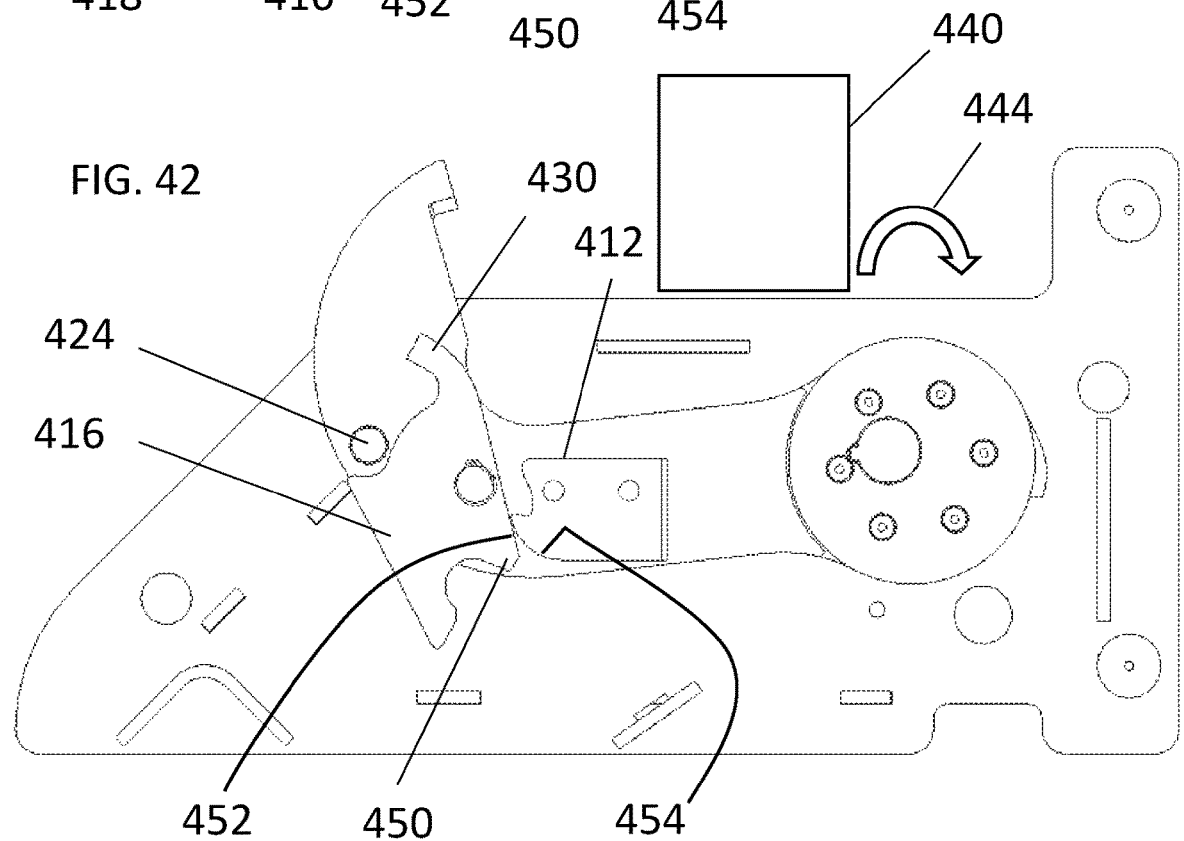
FIG. 42 is a view similar to FIG. 41 showing the latch having rotated to bypass the stop.

Regarding FIG. 41, continued rotation of the drive shaft in direction 444 causes the eccentric mount 408 to contact an internal limit to stop the lateral movement and start rotating the hook 402 upward in direction 444. In one embodiment, the internal limit includes a pin of the eccentric mount 408 that contacts the end of an elongated slot of the eccentric mount 408. The latch 416 has a rear upper projection 450 with an upper surface 452 that contacts a lower surface 454 of a front lower projection 456 of the stop 412. As the hook 402 rotates upward, the contact between the surfaces 452, 454 causes the latch 416 to rotate in direction 460 about the pivot pin 418 and lifts the front upper projection 430 off the catch 424 as shown in FIG. 42. The rotation of the latch 416 permits the latch 416 to bypass the stop 412. As shown in FIG. 42, the engaged surfaces 454, 452 maintain the latch 416 in upright orientation to guide the latch 416 past the stop 412.

Figure 43:
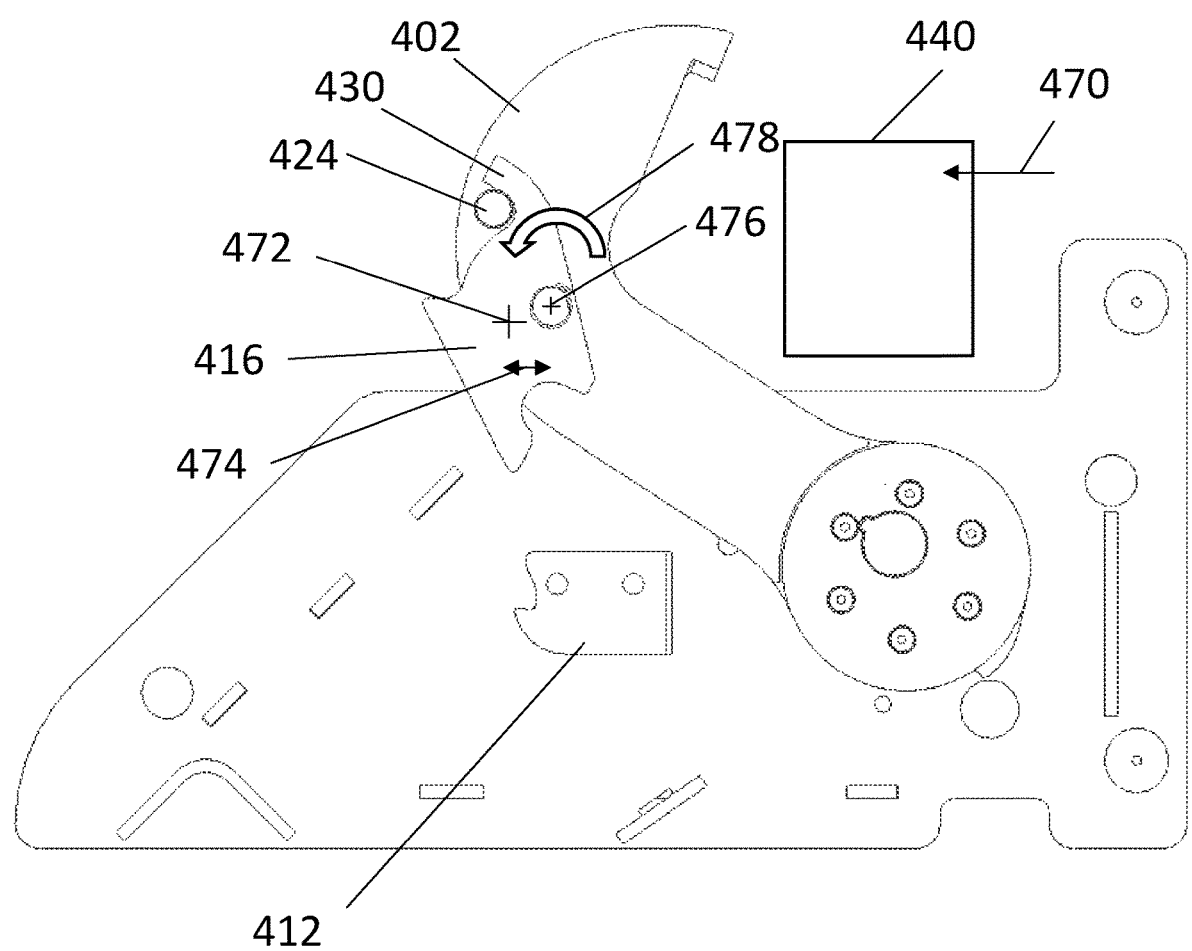
FIG. 43 is a view similar to FIG. 42 showing the hook having rotated toward an extended position to retain an underride guard relative to the vehicle restraint assembly.

Regarding FIG. 43, the hook 402 has reached the extended position thereof so that the hook 402 is positioned to prevent movement of the underride guard 440 leaving the vehicle restraint system 400 in direction 470. With the hook 402 in the extended position, the center of gravity 472 of the latch 416 is offset a distance 474 from a pivot axis 476 defined by the pivot pin 418. This offset 474 of the center of gravity 472 from pivot axis 476 causes the latch 416 to rotate in direction 478 such that the front upper projection 430 rests against the catch 424. This orientation positions the catch 424 to engage the stop 412 and limit unintended lowering of the hook 402 if the vehicle pulls away from the loading dock associated with the vehicle restraint system 400.

Figure 44:
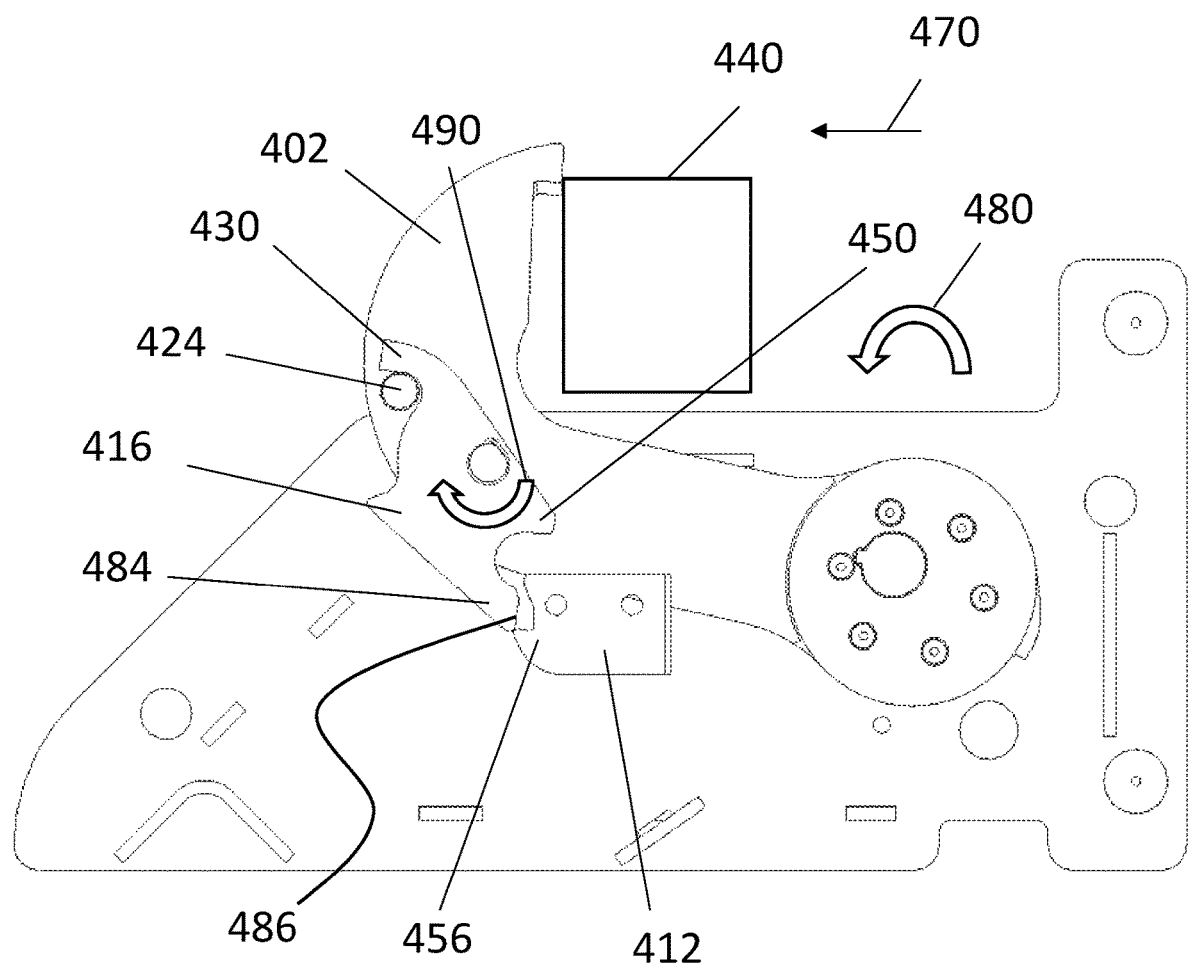
FIG. 44 is a view similar to FIG. 43 showing the underride guard beginning to pull outward against the hook and the latch beginning to contact the stop.
Figure 50:
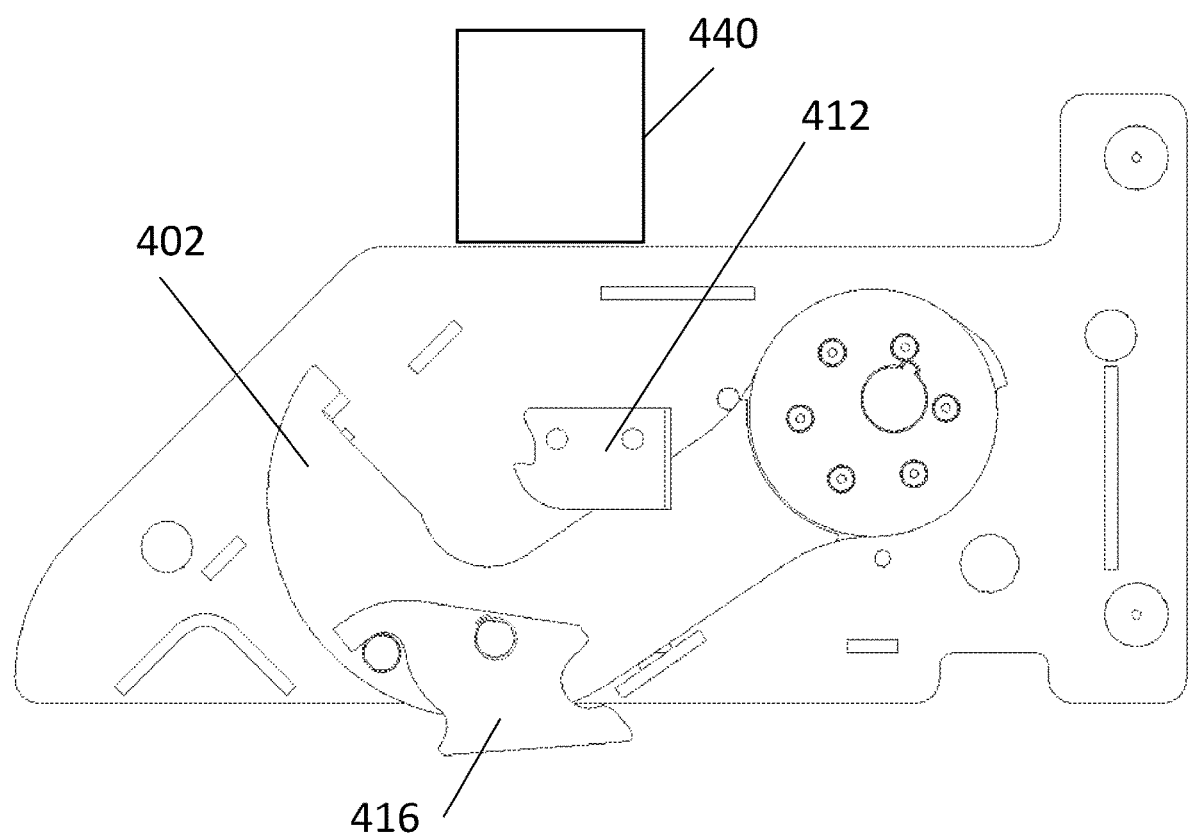
FIG. 50 is a view similar to FIG. 49 showing the hook rotated down to the retracted position.
Figure 51A:
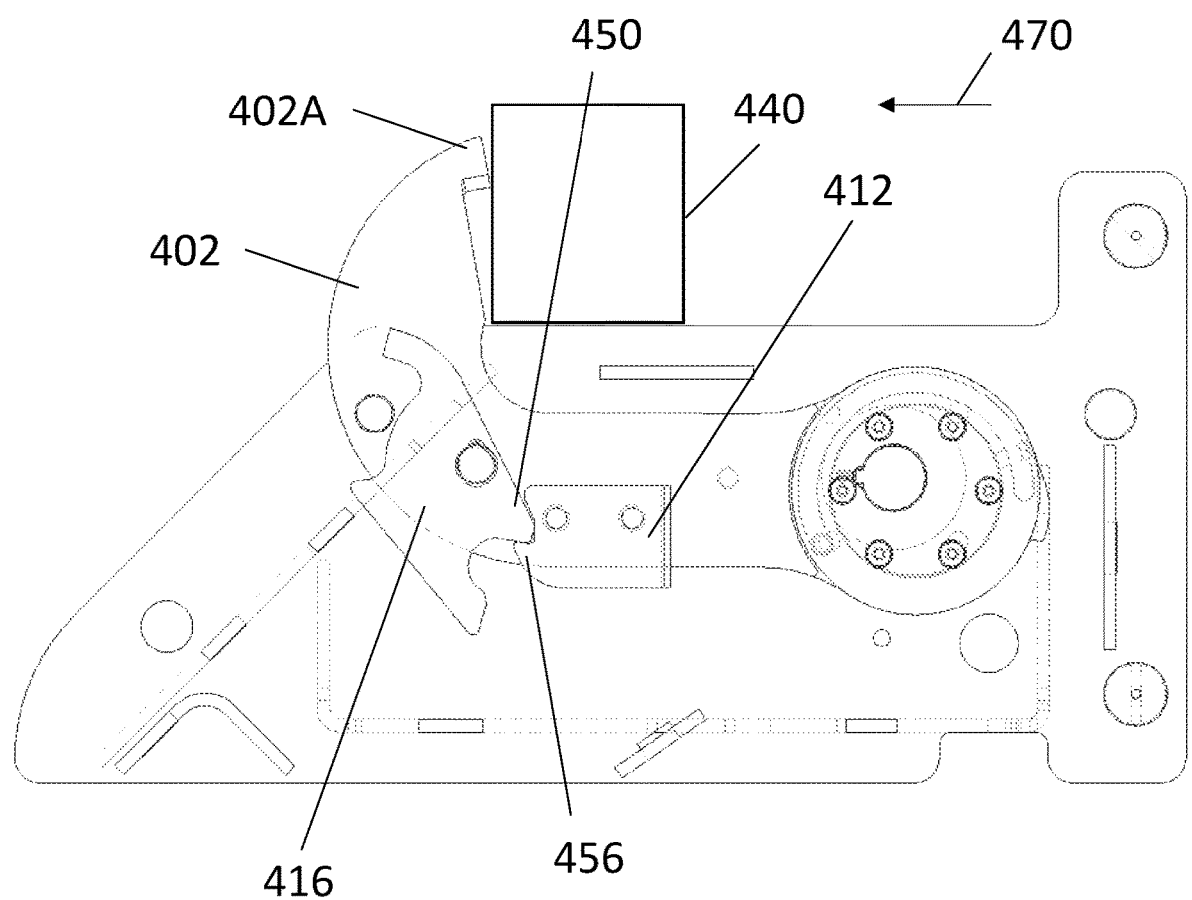
FIG. 51A is a view similar to FIG. 39 showing the hook raised short of the extended position due to the underride guard not being completely within the vehicle restraint assembly and 51B is an enlarged portion of FIG. 51A showing a pair of spaced-apart surfaces of the latch engaged with surfaces of the stop to resist the hook from lowering if the vehicle attempts to pull away from the vehicle restraint assembly.
Figure 51B:
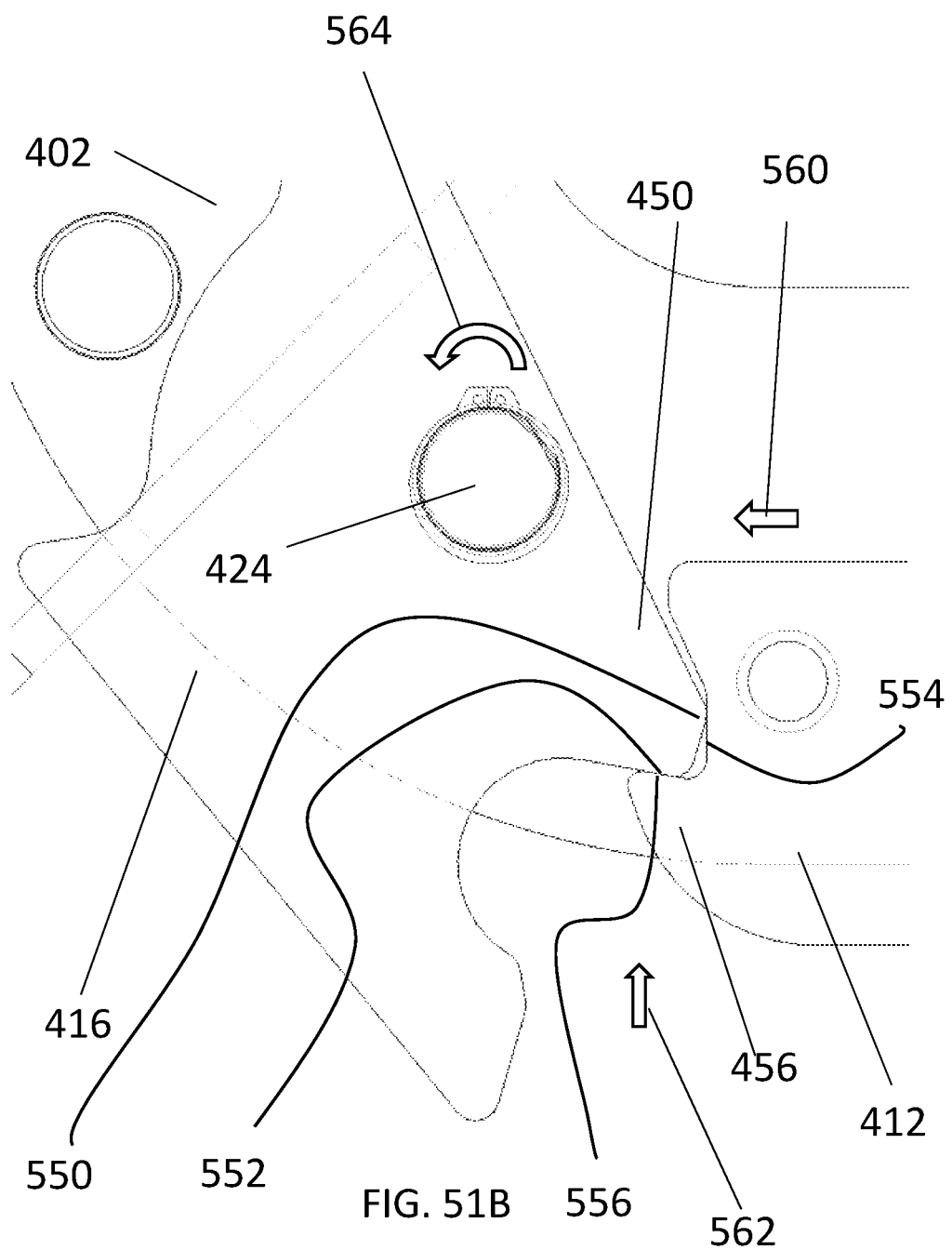

With reference to FIG. 44, the vehicle has started to pull away from the loading dock without a user or an automated system operating the vehicle restraint system 400 to lower the hook 402. The underride guard 440 has moved in direction 470 against the hook 402 and has begun to turn the hook 402 downward in direction 480. As the hook 402 turns downward in direction 480, the rear lower projection 484 of the latch 416 contacts the front lower projection 456 of the stop 412. The rear lower projection 484 of the latch 416 may include an inclined surface 486 that cams against the front lower projection 456 of the stop 412 and rotates the latch 416 in direction 490 to orient the latch 416 to engage the stop 412 with further downward rotation of the hook 402.

Regarding FIGS. 44 and 45, the underride guard 440 has continued to pull away in direction 470 and has continued to turn the hook 402 downward in direction 480. The contact between the inclined surface 486 of the rear lower projection 484 of the latch 416 and the front lower projection 456 of the stop 412 causes the latch 416 to rotate farther in direction 490 so that there is a gap 494 between the front upper projection 430 of the latch 416 and the catch 424. This also positions the rear upper projection 450 of the latch 416 above the stop 412 and in overlapping relation therewith.

Regarding FIG. 46, the underride guard 440 has shifted far enough outward in direction 470 to cause the hook 402 to pivot downwardly in direction 480 until a lower surface 500 of the rear upper projection 450 of the latch 416 seats against an upper surface 502 of the stop 412. Further, the rear lower projection 484 of the latch 416 has a stop surface 506 that abuts the surface 454 of the front lower projection 456 of the stop 412. The rear lower projection 484 and the rear upper projection 450 of the latch 416 are thereby engaged, respectively, with a front upper projection 530 and the front lower projection 456 of the stop 412. In this manner, further loading applied by the underride guard 440 to the hook 402 in direction 470 causes the stop 412 to apply reaction forces against the latch 416 generally in upward direction 510 and an outward direction 512. The reaction forces in directions 510, 512 are transferred through the latch 416, to the pivot pin 418, and to the hook 402 and resist further rotation of the hook 402 in direction 480. The vehicle underride guard 440 is thereby retained in the vehicle restraint system 400 until manually by a user or automated system causes the drive shaft of the eccentric mount 408 to rotate in the direction 480 and intentionally lower the hook 402. The latch 416, hook 402, and the stop 412 are made of a metallic material, such as steel, to resist the loading of the underride guard 440 applied to the hook 402. It is noted that the front upper projection 430 of the latch 416 is spaced from the catch 424 by the gap 494 when the rear upper projection 450 and rear lower projection 484 of latch 416 are engaged with the front upper projection 530 and front lower projection 456 of stop 412.

With reference to FIG. 47, a user or automated system has caused the drive shaft of the eccentric mount 408 to rotate in direction 480 which initially causes the hook 402 and latch 416 thereon to shift laterally in direction 522. Regarding FIGS. 48 and 49, the hook 402 continues to shift laterally in direction 522 until rear upper projection 450 of latch 416 is able to slide off the front upper projection 530 of the stop 412 to allow the hook 402 to begin to rotate downward in direction 480 with continued rotation of the drive shaft in direction 480. It is noted that the hook 402 does not need to rotate upward in order to disengage the latch 416 from the stop 412. Rather, the eccentric mount 408 operates to shift the latch 416 off of the stop 412 to disengage the latch 416 from the stop 412.

Turning to FIG. 49, the continued rotation of the drive shaft of the eccentric pivot 408 in direction 480 has laterally shifted the hook 402 in direction 522 far enough that the latch 416 is in clearance with the stop 412. The drive shaft continues to rotate in direction 480 and causes the eccentric mount 408 to rotate the hook 402 to the retracted position shown in FIG. 50. The latch 416 is positioned to again contact the stop 412 and rotate about the pivot pin 418 the next time manually operated by the user or the automated system operates the vehicle restraint system 400. In one embodiment, the hook 402 and the latch 416 follow the path of movement shown in FIGS. 39-51 when the hook 402 is forced downwardly by the vehicle underride guard 440, manually by a user, or an automated system.

The vehicle may not back up far enough such that the underride guard 440 inhibits the hook 402 from rotating upward to the extended position. For example, the hook 402 would upward rotate from the lower position of FIG. 42 and to the position of FIG. 51A wherein the hook 402 contacts the underride guard 440. The underride guard 440 is positioned to inhibit a tip 402A of the hook 402 from properly hooking the underride guard 440. Despite the hook 402 not being fully extended, the latch 416 may still engage the stop 412 and prevent the underride guard 440 from pulling away from the vehicle restraint system 400. More specifically, the rear upper projection 450 of the latch 416 will contact the front lower projection 456 of the stop 412. Regarding FIG. 51B, the rear upper projection 450 has a pair of spaced surface portions 550, 552 extending transverse to each other, such as perpendicular, that contact spaced surface portions 554, 556 of the stop 412. If the vehicle attempts the pull away from the vehicle restraint system 400 in direction 470, the underride guard 440 urges the hook 402 downward and the stop 412 applies reaction forces generally in directions 560, 562. The reaction forces inhibit the latch 416 from turning in direction 564. The latch 416 thereby resists lowering of the hook 402. In order to release the hook 402 from the underride guard 440, the user or an automatic system would start rotation of the drive shaft of the eccentric mount 408 in direction 480 which causes the hook 402 and latch 416 thereon to first shift laterally in direction 522 and then rotates downward to the retracted position.

The present invention has been described in terms of the preferred embodiments, the embodiments disclosed herein are directed to the assembly as generally shown in the drawings. It is recognized that equivalents, alternatives, and modifications, aside from those expressly stated, to the embodiments summarized, or the embodiments shown in the drawings, are possible and within the scope of the appending claims. The appending claims cover all such alternatives and equivalents.

What is claimed is:

1. A loading dock vehicle restraint system for engaging an underride guard of a vehicle, the loading dock vehicle restraint system comprising:
   a rail for being connected to a loading dock;
   a carriage assembly slidably coupled to the rail and shiftable along the rail;
   a restraint movable between a retracted position for receiving an underride guard of a vehicle and an extended position for restricting movement of the underride guard;
   an eccentric mount connecting the restraint and the carriage assembly, the eccentric mount configured to provide lateral translation of the restraint relative to the carriage assembly and rotation of the restraint relative to the carriage assembly as the restraint moves between the retracted and the extended positions;
   a stop of the carriage assembly, the stop including a front upper projection and a front lower projection; and
   a latch pivotally connected to the restraint and having at least one rear projection configured to contact at least one of the front upper and front lower projections of the stop and resist movement of the restraint toward the retracted position caused by a vehicle retained by the restraint pulling away from the carriage assembly;
   wherein the restraint includes a catch and the latch includes a front upper projection configured to contact the catch and limit rotation of the latch relative to the restraint in a first direction; and
   wherein the latch includes a front lower projection configured to contact the catch and limit rotation of the latch relative to the restraint in a second direction opposite to the first direction.

2. The loading dock vehicle restraint system of claim 1 wherein the latch, with the at least one rear projection contacting the at least one of the front upper and front lower projections of the stop, limits movement of the restraint beyond an intermediate position; and
   the eccentric mount is configured to lower the restraint from the intermediate position to the retracted position including laterally translating the restraint relative to the carriage assembly and shifting the at least one rear projection of the latch out of contact with the at least one of the front upper and front lower projections of the stop.

3. The loading dock vehicle restraint system of claim 1 wherein the stop includes a recess between the front upper projection and the front lower projection, the recess sized to receive a portion of the at least one rear projection of the latch as the restraint moves from the retracted position to the extended position thereof.

4. The loading dock vehicle restraint system of claim 1 wherein the front lower projection of the stop includes a lower surface and the latch includes an upper surface configured to contact the lower surface of the front lower projection of the stop and cause the latch to turn relative to the restraint as the restraint moves from the retracted position to the extended position.

5. The loading dock vehicle restraint system of claim 1 wherein the stop includes a pair of stops on opposite sides of the restraint and the latch includes a pair of latches pivotally connected to opposite sides of the restraint.

6. The loading dock vehicle restraint system of claim 1 wherein the at least one rear projection of the latch includes a rear upper projection and a rear lower projection.

7. The loading dock vehicle restraint system of claim 6 wherein the rear upper projection of the latch is configured to contact the front upper projection of the stop and the rear lower projection of the latch is configured to contact the front lower projection of the stop and resist movement of the restraint toward the retracted position caused by a vehicle engaged by the restraint pulling away from the carriage assembly.

8. The loading dock vehicle restraint system of claim 7 wherein the latch rear upper projection has a lower surface configured to contact an upper surface of the stop front upper projection and the latch rear lower projection has a side surface configured to contact a side surface of the stop front lower projection.

9. The loading dock vehicle restraint system of claim 6 wherein the stop includes a recess between the front upper projection and the front lower projection; and the latch includes a recess between the rear upper projection and the rear lower projection, the recess of the latch being in communication with the recess of the stop upon the latch resisting movement of the restraint toward the retracted position.

10. A loading dock vehicle restraint system for engaging an underride guard of a vehicle, the loading dock vehicle restraint system comprising:
- a rail for being connected to a loading dock;
- a carriage assembly slidably coupled to the rail and shiftable along the rail;
- a restraint movable between a retracted position for receiving an underride guard of a vehicle and an extended position for restricting movement of the underride guard;
- an eccentric mount connecting the restraint and the carriage assembly, the eccentric mount configured to provide lateral translation of the restraint relative to the carriage assembly and rotation of the restraint relative to the carriage assembly as the restraint moves between the retracted and the extended positions;
- a stop of the carriage assembly, the stop including a front upper projection and a front lower projection; and
- a latch pivotally connected to the restraint and having at least one rear projection configured to contact at least one of the front upper and front lower projections of the stop and resist movement of the restraint toward the retracted position caused by a vehicle retained by the restraint pulling away from the carriage assembly;
- wherein the restraint includes a catch, the latch includes a front upper projection configured to contact the catch and limit rotation of the latch relative to the restraint, and the front upper projection is spaced from the catch upon the at least one rear projection of the latch contacting the at least one of the front upper and front lower projections of the stop.

11. The loading dock vehicle restraint system of claim 1 wherein the latch is configured to be spaced from the catch upon the at least one rear projection of the latch contacting the at least one of the projections of the stop and resisting movement of the restraint toward the retracted position.

12. The loading dock vehicle restraint system of claim 1 wherein the eccentric mount is configured to cause the at least one rear projection of the latch to sequentially contact the stop front upper projection and the stop front lower projection as the restraint moves from the extended position to the retracted position.

13. The loading dock vehicle restraint system of claim 1 wherein the eccentric mount is configured to cause the restraint to translate laterally to shift the latch out of contact with the stop and lower the restraint to the retracted position.

14. A loading dock vehicle restraint system for engaging an underride guard of a vehicle, the loading dock vehicle restraint system comprising:
- a rail for being connected to a loading dock;
- a carriage assembly slidably coupled to the rail and shiftable along the rail;
- a restraint movable between a retracted position for receiving an underride guard of a vehicle and an extended position for restricting movement of the underride guard;
- an eccentric mount connecting the restraint and the carriage assembly, the eccentric mount configured to provide lateral translation of the restraint relative to the carriage assembly and rotation of the restraint relative to the carriage assembly as the restraint moves between the retracted and the extended positions;
- a stop of the carriage assembly, the stop including a front upper projection and a front lower projection; and
- a latch pivotally connected to the restraint and having at least one rear projection configured to contact at least one of the front upper and front lower projections of the stop and resist movement of the restraint toward the retracted position caused by a vehicle retained by the restraint pulling away from the carriage assembly, wherein the at least one rear projection of the latch includes a rear upper projection and a rear lower projection, and
- wherein the rear upper projection of the latch is configured to contact the front upper projection of the stop and the rear lower projection of the latch is configured to contact the front lower projection of the stop and resist movement of the restraint toward the retracted position caused by the vehicle engaged by the restraint pulling away from the carriage assembly.

15. The loading dock vehicle restraint system of claim 14 wherein the latch, with the rear upper and rear lower projections of the latch contacting the at least one of the front upper and front lower projections of the stop, limits movement of the restraint beyond an intermediate position; and
- the eccentric mount is configured to lower the restraint from the intermediate position to the retracted position including laterally translating the restraint relative to the carriage assembly and shifting the rear upper and rear lower projections of the latch out of contact with the front upper and front lower projections of the stop.

16. The loading dock vehicle restraint system of claim 14 wherein the stop includes a recess between the front upper projection and the front lower projection, the recess sized to receive a portion of the rear upper and rear lower projections of the latch as the restraint moves from the retracted position to the extended position thereof.

17. The loading dock vehicle restraint system of claim 14 wherein the front lower projection of the stop includes a lower surface and the latch includes an upper surface configured to contact the lower surface of the front lower projection of the stop and cause the latch to turn relative to the restraint as the restraint moves from the retracted position to the extended position.

18. The loading dock vehicle restraint system of claim 14 wherein the stop includes a pair of stops on opposite sides of the restraint and the latch includes a pair of latches pivotally connected to opposite sides of the restraint.

19. The loading dock vehicle restraint system of claim 14 wherein the restraint includes a catch and the latch includes a front upper projection configured to contact the catch and limit rotation of the latch relative to the restraint in a first direction.

20. The loading dock vehicle restraint system of claim 19 wherein the latch includes a front lower projection configured to contact the catch and limit rotation of the latch relative to the restraint in a second direction opposite to the first direction.

21. The loading dock vehicle restraint system of claim 14 wherein the latch rear upper projection has a lower surface configured to contact an upper surface of the stop front upper projection and the latch rear lower projection has a side surface configured to contact a side surface of the stop front lower projection.

22. The loading dock vehicle restraint system of claim 14 wherein the stop includes a recess between the front upper projection and the front lower projection; and the latch includes a recess between the rear upper projection and the rear lower projection, the recess of the latch being in communication with the recess of the stop upon the latch resisting movement of the restraint toward the retracted position.

23. The loading dock vehicle restraint system of claim 14 wherein the restraint includes a catch, the latch includes a front upper projection configured to contact the catch and limit rotation of the latch relative to the restraint, and the front upper projection is spaced from the catch upon the rear upper and rear lower projections of the latch contacting the front upper and front lower projections of the stop.

24. The loading dock vehicle restraint system of claim 14 wherein the restraint includes a catch configured to limit pivoting of the latch and the latch is configured to be spaced from the catch upon the rear upper and rear lower projections of the latch contacting the front upper and front lower projections of the stop and resisting movement of the restraint toward the retracted position.

25. The loading dock vehicle restraint system of claim 14 wherein the eccentric mount is configured to cause at least one of the rear upper and rear lower projections of the latch to sequentially contact the stop front upper projection and the stop front lower projection as the restraint moves from the extended position to the retracted position.

26. The loading dock vehicle restraint system of claim 14 wherein the eccentric mount is configured to cause the restraint to translate laterally to shift the latch out of contact with the stop and lower the restraint to the retracted position.

27. A loading dock vehicle restraint system for engaging an underride guard of a vehicle, the loading dock vehicle restraint system comprising:
a rail for being connected to a loading dock;
a carriage assembly slidably coupled to the rail and shiftable along the rail;
a restraint movable between a retracted position for receiving an underride guard of a vehicle and an extended position for restricting movement of the underride guard;
an eccentric mount connecting the restraint and the carriage assembly, the eccentric mount configured to provide lateral translation of the restraint relative to the carriage assembly and rotation of the restraint relative to the carriage assembly as the restraint moves between the retracted and the extended positions;
a stop of the carriage assembly, the stop including a front upper projection, a front lower projection, and a recess between the front upper projection and the front lower projection; and
a latch pivotally connected to the restraint and having at least one rear projection configured to contact at least one of the front upper and front lower projections of the stop and resist movement of the restraint toward the retracted position caused by a vehicle retained by the restraint pulling away from the carriage assembly,
wherein the at least one rear projection of the latch includes a rear upper projection and a rear lower projection, and
the latch further includes a recess between the rear upper projection and the rear lower projection, the recess of the latch being in communication with the recess of the stop upon the latch resisting movement of the restraint toward the retracted position.

28. The loading dock vehicle restraint system of claim 27 wherein the latch, with the at least one rear projection contacting the at least one of the front upper and front lower projections of the stop, limits movement of the restraint beyond an intermediate position; and
the eccentric mount is configured to lower the restraint from the intermediate position to the retracted position including laterally translating the restraint relative to the carriage assembly and shifting the at least one rear projection of the latch out of contact with the at least one of the front upper and front lower projections of the stop.

29. The loading dock vehicle restraint system of claim 27 wherein the recess of the stop is sized to receive a portion of the at least one rear projection of the latch as the restraint moves from the retracted position to the extended position thereof.

30. The loading dock vehicle restraint system of claim 27 wherein the front lower projection of the stop includes a lower surface and the latch includes an upper surface configured to contact the lower surface of the front lower projection of the stop and cause the latch to turn relative to the restraint as the restraint moves from the retracted position to the extended position.

31. The loading dock vehicle restraint system of claim 27 wherein the stop includes a pair of stops on opposite sides of the restraint and the latch includes a pair of latches pivotally connected to opposite sides of the restraint.

32. The loading dock vehicle restraint system of claim 27 wherein the restraint includes a catch and the latch includes a front upper projection configured to contact the catch and limit rotation of the latch relative to the restraint in a first direction.

33. The loading dock vehicle restraint system of claim 32 wherein the latch includes a front lower projection configured to contact the catch and limit rotation of the latch relative to the restraint in a second direction opposite to the first direction.

34. The loading dock vehicle restraint system of claim 27 wherein the rear upper projection of the latch is configured to contact the front upper projection of the stop and the rear lower projection of the latch is configured to contact the front lower projection of the stop and resist movement of the restraint toward the retracted position caused by a vehicle engaged by the restraint pulling away from the carriage assembly.

35. The loading dock vehicle restraint system of claim 27 wherein the latch rear upper projection has a lower surface configured to contact an upper surface of the stop front upper projection and the latch rear lower projection has a side surface configured to contact a side surface of the stop front lower projection.

36. The loading dock vehicle restraint system of claim 27 wherein the restraint includes a catch, the latch includes a front upper projection configured to contact the catch and limit rotation of the latch relative to the restraint, and the front upper projection is spaced from the catch upon the at least one rear projection of the latch contacting the at least one of the front upper and front lower projections of the stop.

37. The loading dock vehicle restraint system of claim 27 wherein the restraint includes a catch configured to limit pivoting of the latch and the latch is configured to be spaced from the catch upon the at least one rear projection of the latch contacting the at least one of the front upper and front lower projections of the stop and resisting movement of the restraint toward the retracted position.

38. The loading dock vehicle restraint system of claim 27 wherein the eccentric mount is configured to cause the at least one rear projection of the latch to sequentially contact the stop front upper projection and the stop front lower projection as the restraint moves from the extended position to the retracted position.

39. The loading dock vehicle restraint system of claim 27 wherein the eccentric mount is configured to cause the restraint to translate laterally to shift the latch out of contact with the stop and lower the restraint to the retracted position.

40. The loading dock vehicle restraint system of claim 1, wherein the front upper projection of the latch is spaced from the catch upon the at least one rear projection of the latch contacting the at least one of the front upper and front lower projections of the stop.

\* \* \* \* \*